(12) United States Patent
Anderson et al.

(10) Patent No.: US 12,265,615 B2
(45) Date of Patent: Apr. 1, 2025

(54) SYSTEMS AND METHODS FOR BINARY CODE ANALYSIS

(71) Applicant: Battelle Energy Alliance, LLC, Idaho Falls, ID (US)

(72) Inventors: Matthew W Anderson, Idaho Falls, ID (US); Matthew R Sgambati, Rigby, ID (US); Brandon S Biggs, Idaho Falls, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 703 days.

(21) Appl. No.: 17/308,006

(22) Filed: May 4, 2021

(65) Prior Publication Data

US 2022/0358214 A1     Nov. 10, 2022

(51) Int. Cl.
*G06F 21/56* (2013.01)
*G06N 20/00* (2019.01)

(52) U.S. Cl.
CPC ............. *G06F 21/56* (2013.01); *G06N 20/00* (2019.01); *G06F 2221/034* (2013.01)

(58) Field of Classification Search
None
See application file for complete search history.

(56) References Cited

U.S. PATENT DOCUMENTS

| | | | |
|---|---|---|---|
| 6,154,844 A | 11/2000 | Touboul et al. | |
| 6,965,968 B1 | 11/2005 | Touboul et al. | |
| 9,530,016 B1 * | 12/2016 | Pomerantz | G06F 21/566 |
| 9,846,776 B1 | 12/2017 | Paithane et al. | |
| 10,089,460 B2 | 10/2018 | Moon et al. | |
| 10,282,368 B2 | 5/2019 | Larsen et al. | |
| 10,929,532 B1 | 2/2021 | Margaritelli | |
| 2011/0138370 A1 | 6/2011 | Albert et al. | |
| 2011/0191755 A1 * | 8/2011 | Guenthner | G06F 8/49 |
| | | | 717/140 |
| 2015/0067657 A1 * | 3/2015 | Girouard | G06F 3/1273 |
| | | | 717/140 |
| 2021/0211291 A1 | 7/2021 | Jindal et al. | |
| 2021/0263841 A1 * | 8/2021 | Mo | G06F 11/3688 |

(Continued)

OTHER PUBLICATIONS

F. Artuso, G. Di Luna, L. Massarelli, L. Querzoni. "In Nomine Function: Naming Functions in Stripped Binaries with Neural Networks" arXiv preprint arXiv:1912.07946 (Dec. 17, 2019).

(Continued)

*Primary Examiner* — Sanchit K Sarker
(74) *Attorney, Agent, or Firm* — Joseph J. Hawkins

(57) ABSTRACT

Human-readable (HR) code may be derived from a binary. The HR code may be configured to have statistical properties suitable for machine-learned (ML) translation. The HR code may comprise source code, intermediate code, assembly code, or the like. A machine-learned translator may be configured to translate the HR code into labels comprising semantic information pertaining to respective functions of the binary, such as a function name, role, or the like. Execution of the binary may be blocked in response to translating the HR code to a label associated with malware, such as cryptocurrency mining malware or the like. Conversely, the binary may be permitted to proceed to execution in response to determining that the translation is free from labels indicative of malware.

23 Claims, 19 Drawing Sheets

(56) References Cited

U.S. PATENT DOCUMENTS

| | | | |
|---|---|---|---|
| 2022/0121429 A1 | 4/2022 | Haile et al. | |
| 2022/0358214 A1* | 11/2022 | Anderson | G06F 21/52 |
| 2023/0306112 A1* | 9/2023 | Jung | G06F 16/28 |

OTHER PUBLICATIONS

P. Haridas, G. Chennupati, N. Santhi, p. Romero and S. Eidenbenz, "Code Characterization With Graph Convolutions and Capsule Networks," in IEEE Access, vol. 8, pp. 136307-136315, 2020, doi: 10.1109/ACCESS.2020.3011909.

Nal Kalchbrenner and Phil Blunsom. 2013. "Recurrent Continuous Translation Models. In Proceedings of the 2013 Conference on Empirical Methods in Natural Language Processing," pp. 1700-1709, Seattle, Washington, USA. Association for Computational Linguistics.

Popel, M., Tomkova, M., Tomek, J. et al. "Transforming machine translation: a deep learning system reaches news translation quality comparable to human professionals." Nat Commun 11, 4381 (2020). https://doi.org/10.1038/s41467-020-18073-9.

Denny Britz et al, "Massive Exploration of Neural Machine Translation Architectures," arXiv:1703.03906 (Mar. 11, 2017).

Liu, Zhiyuan & Han, Xianpei. (2018). Deep Learning in Knowledge Graph. 10.1007/978-981-10-5209-5_5; Deep Learning in Natural Language Processing (pp. 117-145) (2018).

Liu, Zhiyuan & Han, Xianpei. (2018). Deep Learning in Machine Translation. 10.1007/978-981-10-5209-5_5; Deep earning in Natural Language Processing (pp. 147-183) (2018).

Luong, Thang, Hieu Pham and Christopher D. Manning. "Effective Approaches to Attention-based Neural Machine Translation." EMNLP (2015).

Hwang et al., "Platform-Independent Malware Analysis Applicable to Windows and Linux Environments," MDPI Electronics, May 12, 2020, 18pg. (Year: 2020).

Losche et al., "A Platform Independent Malware Analysis Framework," IEEE, 2015, 5pg. (Year: 2015).

Namani et al., "Symbolic execution based feature extraction for detection of malware," IEEE, Oct. 16, 2020, 6pg. (Year: 2020).

Naz et al., "Review of Machine Learning Methods for Windows Malware Detection," IEEE, 2019, 6pg. (Year: 2019).

Meemulla Kandi, Shabeel. (2018). "Language Modelling for Handling Out-of-Vocabulary Words in Natural Language Processing." 10.13140/RG.2.2.32252.08329.

Babii, H., Janes, A., & Robbes, R. (2019). "Modeling Vocabulary for Big Code Machine Learning." ArXiv, abs/1904.01873.

Ashish Vaswani et al. "Attention is all you need." NIPS'17: Proceedings of the 31st International Conference on Neural Information Processing Systems, Dec. 2017 pp. 6000-6010.

* cited by examiner

SYSTEMS AND METHODS FOR BINARY CODE ANALYSIS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

BACKGROUND

Unless otherwise indicated herein, the approaches described in this section are not prior art to the claims in this disclosure and are not admitted to be prior art by inclusion in this section.

An administrator may grant users permission to execute binaries on a high-performance computer or high-performance computing system (HPC), such as a supercomputer or the like. Resources of the HPC may be susceptible to misappropriation. For instance, a user may submit a binary for execution that is configured to implement unauthorized functionality, such as cryptocurrency mining. It can be difficult to detect unauthorized functionality in binary code. Approaches that rely on signatures, for example, can be bypassed through obfuscation or other techniques. Although behavior-based analysis has been performed in limited contexts, these approaches often rely on information captured during execution (and/or emulated execution), which can impose significant overhead, may delay execution, and so on. Moreover, runtime techniques may only be capable of detecting unauthorized functionality after resource misappropriation has occurred (and/or resource availability has been impacted). More detailed or manual analysis of binary code may not be feasible prior to execution due to, inter alia, latency considerations.

The technology described herein provides technical solutions for efficient binary code analysis and/or classification. The systems, devices, methods, and computer-readable storage media disclosed herein may improve the functionality of a computing system by enabling binaries to be quickly analyzed for unauthorized functionality prior to execution, thereby preventing misappropriation of HPC resources without the need for monitoring while minimizing impacts on execution latency.

BRIEF DESCRIPTION OF THE DRAWINGS

The details of one or more implementations of techniques for binary code classification are set forth in the accompanying figures and the detailed description below.

DETAILED DESCRIPTION

Figure 1A:
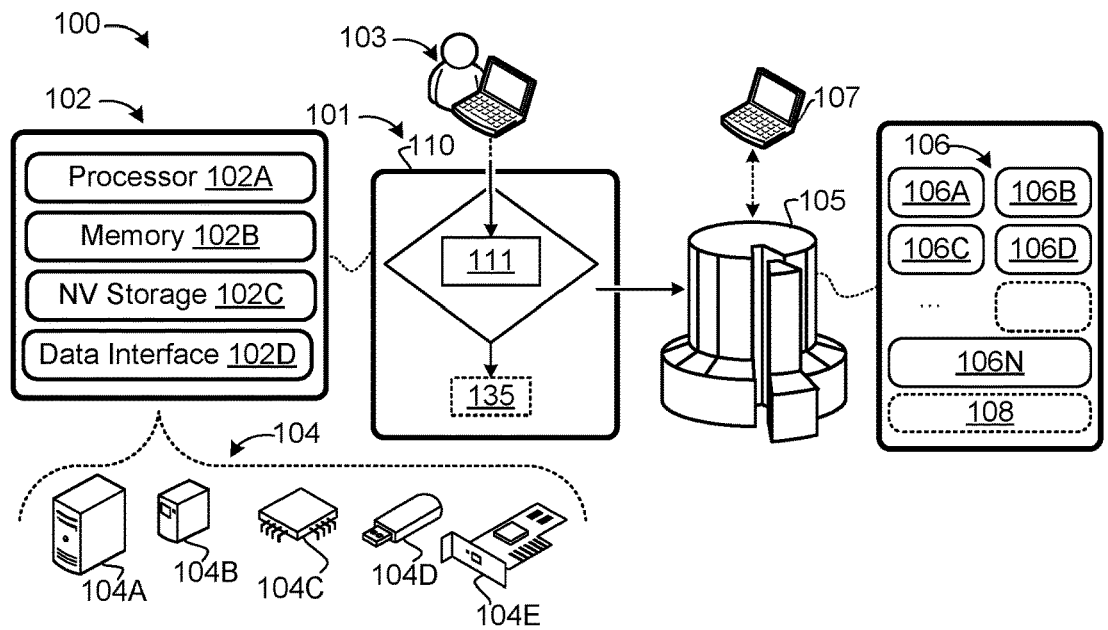
FIG. 1A illustrates an example of an operating environment for binary code analysis.

The costs involved in provisioning an HPC can be significant. An HPC may comprise many cutting-edge components, such as general-purpose or application-specific processors, memories, non-volatile (NV) storage, interconnects, data interfaces, and/or the like. An HPC may consume a significant amount of power during operation, particularly while implementing complex tasks. Furthermore, maintenance and administration of an HPC may involve a sizable staff of highly specialized personnel. However, the benefits yielded by efficient utilization of HPC can outweigh these challenges. An HPC may enable users to efficiently complete highly complex tasks that would be impossible (or impractical) with standard, off-the-shelf computing systems.

An HPC may be shared between a plurality of users. The users may be authorized to submit binaries for execution on the HPC. A user may attempt to leverage the resources of the HPC to execute unauthorized functionality. For example, a user may attempt to "cryptojack" the HPC by, inter alia, submitting a binary for execution that is configured to implement cryptocurrency mining functionality. The user may reap massive benefits through misappropriation of HPC resources at the expense of, inter alia, increased power consumption, higher operating temperature, decreased availability, and so on. In some cases, cryptojacking may slow down processing of other tasks or even prevent execution of binaries submitted by other users.

Detecting unauthorized functionality in binary programs can be difficult and error prone. Techniques that rely on patterns or signatures derived from raw binary data may only be capable of detecting previously encountered malware (or malware in previously flagged binaries). These techniques can often be thwarted by minor changes, which may not impact functionality or even require any source-level modifications, such as compiler settings, optimizations, static versus dynamic linking, compilation on different architectures, obfuscation, and/or the like. Furthermore, features extracted from binary programs may not adequately express code functionality and, as such, may not be suitable for use with more sophisticated analysis techniques, such as machine learning or machine-learned approaches.

In some cases, unauthorized functionality, such as cryptojacking, may be detected during execution (e.g., during runtime). For example, the HPC may be monitored for activity characteristic of unauthorized functionality, such as particular function or system calls, network accesses, network access patterns, resource usage patterns, and/or the like. Processes determined to be implementing unauthorized functionality may be suspended or even terminated. Runtime, behavior-based detection, however, can have significant disadvantages. For example, these techniques can impose significant overhead and may be susceptible to obfuscation (e.g., rename function calls, access network resources through proxies or virtual private networks, and/or the like). Moreover, even if unauthorized the functionality is eventually detected, these techniques may allow some degree of resource misappropriation to occur; malware may exploit these weaknesses by running intermittently and/or by distributing unauthorized functionality between a plurality of different binaries.

This disclosure describes technology for efficient, low-overhead detection of unauthorized binary code (binary code configured to implement unauthorized functionality). The disclosed systems, devices, methods, and computer-readable storage media may be used to, inter alia, control execution of binaries on an HPC. A binary may be analyzed for unauthorized functionality prior to execution. If unauthorized functionality is detected, the binary may be blocked from execution. The disclosed technology may, therefore, enable computing systems to identify and block execution of binaries comprising unauthorized functionality before resource misappropriation occurs while minimizing increases to execution latency (if any) and avoiding the complexity and overhead of run-time monitoring. As disclosed in further detail herein, binaries may be analyzed through static analysis techniques which may not involve execution (or emulated execution) of the binaries.

In some embodiments, human-readable code may be derived from a binary. The binary may be configured for execution on an HPC. The human-readable code may be configured to have statistical properties suitable for ML translation (e.g., may be configured to exhibit statistical properties that are similar to and/or compatible with natural language corpora). The human-readable code may comprise source code, intermediate code, assembly code, or the like. An MLT model may be configured to translate the human-readable code generated for the binary into a classification language. The translation may comprise one or more labels, each label comprising semantic information pertaining to a respective functional unit (function) of the binary. The labels may be configured to capture the semantics and/or role of respective functions of the binary. Execution of the binary on the HPC may be blocked in response to determining that the translation comprises a label associated with malware, such as cryptocurrency mining or the like. Conversely, the binary may be permitted to proceed to execution on the HPC in response to determining that the translation is free from labels indicative of malware.

The MLT model may be trained on a dataset comprising a plurality of training binaries, each training binary comprising a respective set of functions. The training binaries may comprise semantic information pertaining to the functions implemented thereby, such as debugging symbols or the like. The dataset may include training binaries comprising functions configured to implement unauthorized functionality (malware functions). For example, the dataset may include training binaries that selectively contain functions characteristic of cryptocurrency mining, such as key creation, encryption calls, block process calls, and/or the like (along with other functions unrelated to cryptocurrency mining). The MLT model may be trained to translate human-readable code derived from respective training binaries to labels that accurately characterize the semantics and/or role of the functions implemented by the respective training binaries. More specifically, the MLT model may be trained to translate instruction sequences derived from executable code of respective functions to labels that accurately characterize the functionality of such functions (e.g., distinguish functions characteristic of malware from other functions that are not indicative of malware).

The following discussion of FIG. 1 describes aspects of an example of an operating environment, techniques that may be employed in the operating environment, and a system 100 in which components of the operating environment can be embodied. In the context of the present disclosure, reference is made to the operating environment by way of example only.

As illustrated, the operating environment may comprise a system 100 for binary code analysis. The system 100 may comprise a device or apparatus 101 configured to implement aspects of binary code analysis (a code analysis (CA) apparatus 101, or simply apparatus 101). The apparatus 101 may be configured to be operatively and/or communicatively coupled to one or more users 103 of an HPC 105, the HPC 105 and/or one or more administrators 107 of the HPC 105. The administrators 107 may be configured to, inter alia, manage operation of the HPC 105. The administrators 107 may include, but are not limited to personnel (e.g., administrator users), administrative devices, such as automated systems, management systems, security systems, monitoring systems, and/or the like. As illustrated in FIG. 1, an administrator 107 may authorize users 103 to submit programs for execution on the HPC 105. The programs may be embodied by binaries 111 comprising machine and/or computer-readable code.

The apparatus 101 may comprise and/or implement code analysis (CA) module 110. The CA module 110 may comprise logic configured to identify binaries 111 that comprise machine-readable code configured to implement unauthorized functionality. The binaries 111 may be analyzed prior to execution on the HPC 105. Binaries 111 determined to comprise such machine-readable code may be blocked from execution on the HPC 105.

The CA module 110 may comprise and/or be implemented by computing resources 102, which may include, but are not limited to processing resources 102A, memory resources 102B, non-volatile (NV) storage resources 102C, a data interface 102D, and/or the like. The processing resources 102A may include any suitable processing means, such as one or more processing units and/or processor cores. The processing resources 102A may include, but are not limited to, logic circuitry, processing circuitry, computation circuitry, a processing unit, central processing unit (CPU), a processor core, an Arithmetic Logic Unit (ALU), a general-purpose processor, an integrated circuit (IC), an application-specific integrated circuit (ASIC), a programmable processor, programmable array logic (PAL), a programmable gate array, a Field Programmable Gate Array (FPGA), programmable logic, a Field Programmable Logic Array (FPLA), and/or the like. The processing resources 102A may comprise one or more processing cores capable of independently decoding and executing computer-readable instructions.

The memory resources 102B may include any suitable memory means and/or resource. The memory resources 102B may include, but are not limited to, system memory, cache memory, a memory hierarchy, volatile memory, non-volatile memory, random access memory (RAM), dynamic RAM (DRAM), synchronous DRAM (SDRAM), static RAM (SRAM), a memory module, a Single In-Line Memory Module (SIMM), a Dual In-Line Memory Module (DIMM), a Single Data Rate (SDR) memory module, a Dual Data Rate (DDR) memory module, DDR SDRAM, Low-Power DDR (LPDDR), solid-state memory, a solid-state memory module, Flash memory, a Flash memory module, and/or the like.

The NV storage resources 102C may include any suitable means for non-transitory, persistent, and/or NV storage. The NV storage resources 102C may include, but not limited to a non-transitory storage device, a non-transitory storage medium, an NV storage device, an NV storage medium, a persistent storage device, an internal storage device, an external storage device, a remote storage device, Network Attached Storage (NAS) resources, a magnetic disk drive, a hard disk drive (HDD), solid-state memory, a solid-state storage device (SSD), Flash memory, a Flash memory device, and/or the like.

The data interface 102D may be configured to communicatively and/or operably couple the computing resources 102. The data interface 102D may be further configured to couple the computing resources 102 to other devices and/or services, such as a bus, a peripheral device, a human-machine interface (HMI) component (e.g., a keyboard, mouse, display, or the like), an input/output (I/O) device, an electronic communication network, and/or the like. The data interface 102D may comprise any suitable I/O means, including, but not limited to, hardware, software, firmware, a driver, a front-side bus (FSB), a back-side bus, a host bridge, a Northbridge, a Southbridge, a system bus, an Accelerated Graphics Port (AGP) channel, an I/O controller, an I/O bus, a peripheral component interconnect (PCI) bus, a PCI Express bus (PCIe), a Serial Advanced Technology Attachment (serial ATA) bus, a universal serial bus (USB) controller, an Institute of Electrical and Electronics Engineers (IEEE) 1394 bus, a network interface, a network driver, and/or the like.

In some embodiments, aspects of the CA module 110 may be implemented and/or embodied by computing resources 106 of the HPC 105 (e.g., by high-performance computing (HPC) resources 106 of the HPC 105). For example, the HPC resources 106 may be configured to implement and/or embody at least a portion of the CA module 110 (and/or computing resources 102 of the CA module 110). Alternatively, or in addition, at least a portion of the computing resources 102 may be implemented and/or embodied by a one or more hardware (HW) component(s) 104, which may be separate and/or distinct from the HPC 105. A HW component 104 may comprise any suitable means for implementing aspects of the CA module 110 (and/or computing resources 102 of the CA module 110) including, but not limited to, a computing device 104A, an appliance 104B, an embedded device 104C, a peripheral device, and/or the like.

In some embodiments, aspects of the CA module 110 may be implemented and/or embodied by a computing device 104A. The computing device 104A may comprise any suitable computing means including, but not limited to, an electronic device, a terminal, a computer, a personal computer, a desktop computer, a portable computer, a server computer, a general-purpose computing device, an application-specific computing device, a laptop, a tablet, a smartphone, a virtual machine, a virtual computing system, a virtual computing environment, and/or the like.

In some embodiments, aspects of the CA module 110 may be implemented and/or embodied by an appliance 104B, such as an application-specific device, a headless device, a component device, an FPGA, an FPGA device, an FPGA card, a System on Chip (SoC), and/or the like.

In some embodiments, aspects of the CA module 110 may be implemented and/or embodied by an embedded device 104C, such as a chip, logic chip, package, printed circuit board (PCB), and/or the like. The embedded device 104C may be configured to be coupled to and/or embedded within an electronic device, such as a computing device 104A, appliance 104B, HPC 105, terminal, administration device, and/or the like.

In some implementations, aspects of the CA module 110 may be implemented and/or embodied by a peripheral device. The peripheral device may be configured to be coupled to an electronic device, such as a computing device 104A, appliance 104B, HPC 105, terminal, administration device, and/or the like. The HW component(s) 104 of the CA module 110 may comprise any suitable type of peripheral device, including, but not limited to, a USB device 104D, an interface or expansion card 104E, and/or the like.

In some embodiments, aspects of the CA module 110 may comprise and/or be embodied by machine and/or computer-readable instructions stored on a non-transitory storage medium. For example, the instructions may be stored on and/or within non-transitory storage media of the NV storage resources 102C. The instructions may be configured to cause the processing resources 102A to implement aspects of binary code analysis, as disclosed herein. Alternatively, or in addition, aspects of the CA module 110 may be implemented and/or embodied in hardware, such as logic, logic circuitry, application-specific circuitry, an ASIC, programmable circuitry, an FPGA, and/or the like.

As disclosed herein, the HPC 105 may implement and/or embody HPC resources 106, which may comprise any suitable means for implementing processing and/or computing tasks. The HPC resources 106 may include, but are not limited to, HPC processing resources 106A, HPC memory resources 106B, HPC storage resources 106C, an HPC data interface 106D, and on. The HPC processing resources 106A may comprise any suitable processing means, as disclosed herein. The HPC processing resources 106A may, for example, comprise one or more processors, processing units, and/or processing cores, which may include, but are not limited to, an HPC processor, a quantum processor, Single Instruction Multiple Data (SIMD) processor, Multiple Instruction Multiple Data (MIMD) processor, a Graphics Processing Unit (GPU), a compute node, a plurality of processors, a multi-processor system, a plurality of parallel processors, a plurality of grid processors, a plurality of distributed processors, a plurality of distributed compute nodes, a compute cluster, and/or the like.

The HPC memory resources 106B may comprise any suitable memory means, as disclosed herein. The HPC memory resources 106B may comprise distributed memory resources, which may include, but are not limited to, Distributed Shared Memory (DSM), distributed memory with shared-memory nodes, a Distributed Global Address Space (DGAS), a partitioned global address space, a memory cluster, ScratchPad Memory (SPM), a Uniform Memory Access (UMA) architecture, a Non-Uniform Memory Access (NUMA) architecture, a Cache Only Memory Architecture (COMA), and/or the like.

The HPC storage resources 106C may comprise any suitable NV, persistent, and/or non-transitory storage means, as disclosed herein.

The HPC data interface 106D may comprise any suitable means for operably and/or communicatively coupling the HPC 105 (and/or HPC resources 106) to one or more other devices and/or services, as disclosed herein. In some embodiments, the HPC 105 (and/or HPC data interface 106D) may further comprise a high-performance computing (HPC) interconnect 106N. The HPC interconnect 106N may be configured to communicatively couple components and/or HPC resources 106 of the HPC 105. The HPC interconnect 106N may comprise any suitable electronic communication means including, but not limited to: a Small Computer Software Interconnect (SCSI), a Serial Attached SCSI (SAS), an iSCSI network, a Direct Memory Access (DMA) channel, a Remote DMA (RDMA) network, an Ethernet network, a fiber-optic network, a Transmission Control Protocol/Internet Protocol (TCP/IP) network, an Infiniband network, a Local Area Network (LAN), a Wide Area Network (WAN), a Virtual Private Network (VPN), a Storage Area Network (SAN), and/or the like.

The HPC 105 and/or HPC resources 106 may implement and/or correspond to a computing architecture 108 (or simply architecture 108). As used herein, the architecture 108 of an HPC 105 may refer the architecture, functionality, and/or organization of HPC resources 106 comprising and/or implemented by the HPC 105. For example, the architecture 108 of an HPC 105 may correspond to the design, microarchitecture, binary format, code format, instruction set architecture (ISA), and/or other characteristics of the HPC processing resources 106A (e.g., may correspond to an ISA supported by processor(s) of the HPC 105). The computing architecture 108 of the HPC 105 may, for example, correspond to one or more of a RISC, CISC, i386, x86, x64, x86-64, ARM, Power ISA, SPARC, amd64, armhf, armel, mips, mipsel, PowerPC and/or other processing and/or ISA architecture. As used herein, a architecture 108 may also refer to communication protocol(s), interface protocol(s), architecture, functionality, organization, and/or other characteristics of other HPC resources 106, such as the HPC memory resources 106B, HPC storage resources 106C, HPC data interface 106D, HPC interconnect 106N, and/or the like. Alternatively, or in addition, the architecture 108 of the HPC 105 may also refer to a computing environment or platform of the HPC 105, such as an operating system (OS), OS interface, Application Programming Interface (API), system API, Hardware Abstraction Layer (HAL) API, database management system, operational technology (OT) system, cyber-physical system, control system, virtual machine, virtual execution environment, sandbox, script execution environment, and/or the like.

As illustrated in FIG. 1, the CA module 110 may be configured to receive a binary 111 and, in response, determine whether to permit the binary 111 to be executed on the HPC 105. The CA module 110 may receive the binary 111 at and/or through the data interface 102D. The binary 111 may be submitted for execution by a user 103 through an electronic device, such as a computer, terminal, portal, kiosk, access node, an administrative device, the HPC 105, or the like. The binary 111 may be received through any suitable means, such as an electronic communication network. In some embodiments, the CA module 110 may be configured to intercept the binaries 111 submitted to the HPC 105. For example, the CA module 110 may be configured to receive and/or intercept the binary 111 before the binary 111 is received and/or executed at the HPC 105. Alternatively, the CA module 110 may be configured to receive binaries 111 from the HPC 105. For example, the HPC 105 may be configured to receive a binary 111 for execution and, in response, transmit the binary 111 to the CA module 110 to determine whether to proceed with execution.

As used herein, a binary 111 may refer to any suitable form of electronic data including, but not limited to, a bit sequence, a byte sequence, a word sequence, a dword sequence, binary data, binary code, machine code, machine-readable code, computer-readable code, machine code instructions, object code, an executable, executable code, an application, application code, a program, a module, a software module, a code module, a loadable module, a library, a shared library, and/or the like. A binary 111 may comprise and/or embody a program configured for execution on the architecture 108 implemented by the HPC resources 106 of the HPC 105. The binary 111 may comprise and/or be embodied by a file. The file may be formatted for execution on the HPC 105 (and/or architecture 108 of the HPC 105), the file format may correspond to one or more of an object code format, a library format, an executable format, a Portable Executable (PE) format, an Executable and Linkable (ELF) format, and/or the like.

Figure 1B:
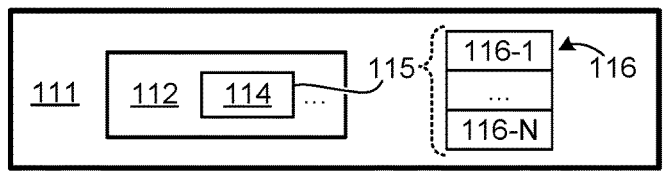
FIG. 1B illustrates an example of a binary.

As illustrated in FIG. 1B, a binary 111 may comprise executable (EX) code 112. The EX code 112 may comprise machine and/or processor executable (EX) instructions 116, such as machine code, byte code, binary code, binary instructions, and/or the like. The EX code 112 may be configured for execution by the HPC processing resources 106A. For example, EX instructions 116 of the EX code 112 may be configured for execution by one or more processors of the HPC 105. Implementation of the EX code 112 by the HPC processing resources 106A may involve other HPC resources 106, such as HPC memory resources 106B, HPC storage resources 106C, the HPC data interface 106D, the HPC interconnect 106N, and/or the like.

A binary 111 may comprise and/or implement one or more functions or functional units. As used herein, a function or functional unit of a binary may be referred to as a binary function 114, a binary FCN 114, an executable (EX) function 114, or simply FCN 114. A binary FCN 114 may comprise and/or be embodied by EX code 112 and/or other data configured to implement a specific task and/or functionality of the binary 111. A binary FCN 114 may include, but is not limited to, a callable unit, a function, a procedure, an object, a method, a routine, a subroutine, a subprogram, a module, a submodule, and/or the like. In some implementations, the EX code 112 and/or other data of a binary FCN 114 may be packaged and/or organized as a unit. A binary FCN 114 may comprise and/or be embodied by an executable (EX) code segment 115, the EX code segment 115 comprising one or more EX instructions 116 (e.g., a list, series, sequence, ordered sequence, and/or other arrangement of EX instructions 116). In FIG. 1B, the EX code segment 115 of the example binary FCN 114 comprises EX instructions 116-1 through 116-N.

Referring back to FIG. 1A, the CA module 110 may determine whether to permit the binary 111 to be executed on the HPC 105. This decision may be based on analysis of the binary 111 by the CA module 110. The analysis may comprise determining whether the binary 111 is configured to implement unauthorized functionality, or whether the binary 111 comprises code 112 configured to implement unauthorized functionality. As used herein, a binary 111 or code 112 configured to implement unauthorized functionality may be referred to as malware 135. A binary 111 determined to comprise malware 135 may be referred to as an unauthorized, trojan, prohibited, or malware binary 111. Conversely, a binary 111 determined to be free from malware 135 by the CA module 110 may be referred to as an authenticated, authorized, validated, or clean binary 111.

The CA module 110 may be configured to a) receive a binary 111 for execution on the HPC 105, b) perform one or more analysis operations pertaining to the binary 111, and c) determine or implement one or more actions pertaining to the binary 111 based, at least in part, on the analysis operations. The analysis operations may include detecting malware 135 within the binary 111 (if any). The analysis operations may, for example, comprise classifying or labeling the binary 111 as a malware binary 111, a clean binary 111, or the like. The actions implemented by the CA module 110 may include blocking or otherwise preventing malware binaries 111 from being executed by the HPC 105, allowing clean binaries 111 to proceed to execution on the HPC 105, and/or the like. Accordingly, in some implementations, the CA module 110 may be configured to a) receive a binary 111 for execution on the HPC 105, b) determine whether the binary 111 comprises malware 135, and c) either permit the binary 111 to proceed to execution on the HPC 105 in response to determining that the binary 111 is free from malware 135, or block the binary 111 from execution on the HPC 105 in response to determining that the binary 111 comprises malware 135.

The binaries 111 analyzed by the CA module 110 may comprise stripped binaries 111. As used herein, a "stripped" binary 111 refers to a binary 111 that has been stripped of extraneous semantic information, such as debug symbols, labels, function names, and the like. The CA module 110 may be configured to a) generate human-readable code from stripped binaries 111 (e.g., by disassembling the stripped binaries 111), b) translate the human-readable code to semantic labels, such as function names or the like (e.g., reconstruct semantic information for the stripped binaries 111), and c) detect malware 135 in response to translating human-readable code derived from the stripped binaries 111 to semantic labels associated with malware 135 (if any). The human-readable code may be translated to semantic labels by a analysis engine. The analysis engine may comprise a first machine-learned translation model configured to translate human-readable code to a sequence of semantic labels (e.g., a sequence of function names). In some implementations, the analysis engine may further comprise rules configured to map the semantic labels to function classifications. The rules may be configured to associate semantic labels (e.g., function names) characteristic of malware 135 with a malware classification (and/or associate semantic labels characteristic of authorized functionality to a clean or authorized classification(s)). Alternatively, or in addition, the CA module 110 may comprise a second machine-learned model configured derive function classifications from the semantic labels.

The CA module 110 may be further configured to minimize overhead imposed on the HPC 105 (and/or users 103). The CA module 110 may be configured to distinguish malware binaries 111 from clean binaries 111 efficiently, such that the execution latency for clean binaries 111 is not increased by more than a threshold (as compared to the execution latency for binaries 111 submitted directly to the HPC 105).

Figure 2:
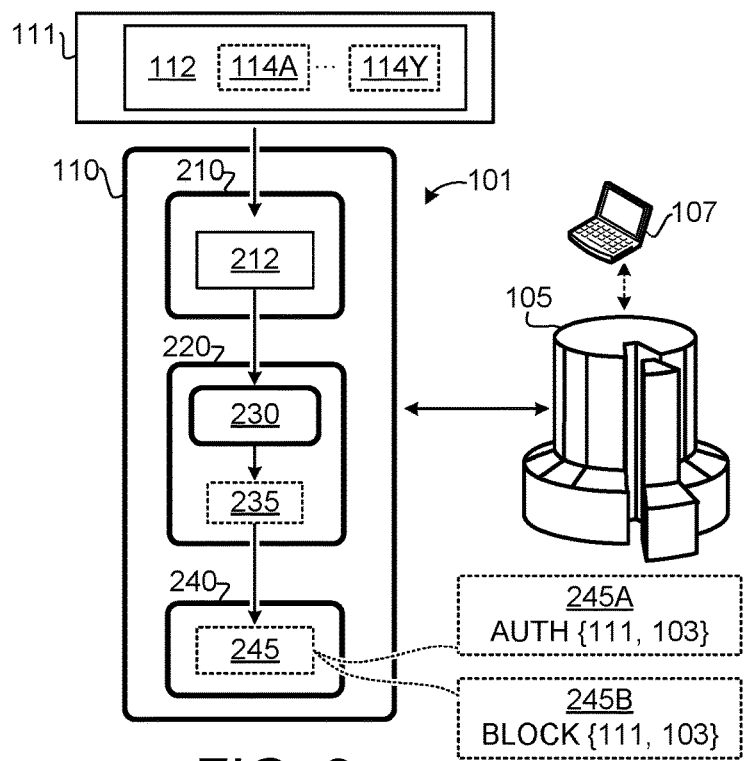
FIG. 2 illustrates an example of a binary code analyzer.

FIG. 2 illustrates an example of a CA module 110. As disclosed in further detail herein, the CA module 110 may be configured to receive a binary 111 and, in response, determine whether to permit the binary 111 to proceed to execution on the HPC 105.

As disclosed herein, it can be difficult to accurately characterize the functionality of binaries 111 based on the raw contents thereof. Many aspects of a binary 111, such as names, formatting, the lexical order of functions, and so on, have no impact on program semantics. These types of "non-determinative, binary-specific" (NDBS) characteristics can vary from build-to-build of a binary 111 without substantial impact on functionality and/or functional behavior. As used herein, an NDBS characteristic may refer to any aspect or characteristic of a binary 111 that can affect the contents of the binary 111 without substantially changing the underlying functionality and/or functional behavior of the binary 111. Due to, inter alia, NDBS characteristics, binaries 111 that implement the same, or substantially similar, functionality may differ from one another. Manipulation of NDBS characteristics may produce differences in binaries 111 built from the same, or substantially similar, source code. NDBS manipulation may, for example, result in differences between binaries 111 that comprise the same, or substantially similar malware 135. NDBS characteristics may include, but are not limited to, the format of the binary 111 (binary format), the arrangement of code 112 within the binary 111, the arrangement of data within the binary 111, symbols utilized within the binary 111, such as debug symbols, variable symbols, constant symbols, function symbols, function parameter symbols, data values, compiler settings, optimizations, link order, static versus dynamic linking, compilation for different architectures 108, obfuscation, and/or the like.

Due to, inter alia, NDBS characteristics, it can be difficult to reliably detect malware 135 within binaries 111. Approaches that attempt to detect malware 135 using patterns, signatures, and/or classifications may be bypassed through obfuscation or other techniques. For example, a first binary 111 may be configured to implement unauthorized functionality (e.g., may comprise cryptocurrency mining malware 135). An administrator 107 may detect resource misappropriation during execution of the first binary 111 and, in response, may ban execution of binaries 111 with matching signatures. The signature may include any suitable means for characterizing the first binary 111 (and/or malware 135 of the first binary 111), such as a digital signature, cryptographic signature, hash code, cryptographic hash code, error correcting code, cyclic redundancy check (CRC), and/or the like. Since the signature of the first binary 111 may incorporate NDBS characteristics, the signature ban may be susceptible to compromise through NDBS manipulation. For example, a second binary 111 comprising substantially the same malware 135 as the first binary 111 may incorporate different NDBS characteristics and, as a result, may not be blocked by the signature ban (e.g., the second binary 111 may be built with different compiler settings, incorporate obfuscation, or the like).

In the example above, the first binary 111 may comprise one or more FCN 114 configured to implement unauthorized functionality, such as cryptocurrency mining or the like (malware FCN 114). The first binary 111 may include other FCN 114 configured to implement authorized functionality (clean FCN 114). A pattern, signature, and/or classification ban covering the first binary 111 (and/or malware FCN 114) may be evaded by modifying an NDBS characteristic of the malware FCN 114 within the second binary 111, without modifying other FCN 114.

NDBS manipulation can be used to evade other, more sophisticated ML approaches, such as ML pattern recognition, ML classification, artificial neural network (ANN) models, and/or the like. For example, the parameters learned by an ML model may incorporate NDBS characteristics and, as such, may be susceptible to compromise through NDBS manipulation. Moreover, binaries 111 may not be suitable for analysis using deep learning or language-based ML techniques, such as recurrent neural networks (RNN), transformers, Long Short-Term Memory (LSTM), machine translation, attention mechanisms, and/or the like. For example, the raw content of binaries 111 may not exhibit characteristics that are compatible natural language on which many deep learning and/or language ML techniques are based.

The CA module 110 may be configured to address these and other limitations. As disclosed in further detail herein, the CA module 110 may be configured to translate, transform, and/or otherwise convert binaries 111 into functional or semantic representations that are suitable for ML analysis. More specifically, the CA module 110 may be configured to generate human-readable code from binaries 111 and translate the human-readable code to labels configured to characterize the functional behavior of the respective binaries 111.

Binaries 111 are typically constructed from code written in a high-level, human-readable programming language, such as C, C++, Objective-C, C#, Java, GO, Rust, Pascal, or the like. This type of human-readable code is a form of human communication that has similar statistical properties to natural language corpora. The CA module 110 may exploit these properties to improve the accuracy and reliability of binary code analysis operations, including malware detection.

In some embodiments, the CA module 110 is configured to derive human-readable (HR) code 212 from binaries 111. As used herein, HR code 212 may refer to any suitable means for modeling, specifying, defining, and/or otherwise representing the functionality and/or functional behavior of a binary 111 and/or executable code 112 thereof. The CA module 110 may be configured to generate HR code 212 in accordance with a language and/or scheme configured to produce HR code 212 having suitable statistical properties. More specifically, the CA module 110 may be configured to generate HR code 212 having statistical properties that are suitable for and/or compatible with ML and/or machine translation analysis (e.g., HR code 212 having statistical properties that are similar, to and/or compatible with, natural or human-language corpora). The HR code 212 generated by the CA module 110 may comprise any suitable means for capturing, expressing, specifying, and/or otherwise representing the functional behavior of a binary 111, including, but not limited to, assembly language (ASM) code, raw ASM, symbolic code, symbolic machine code, intermediate language code, architecture-specific intermediate language code, formal language code, programming language code, low-level programming language code, Low-Level Intermediate Language (LLIL) code, programming language code, source code, a syntax tree, an abstract syntax tree (AST), an abstract semantic graph (ASG), and/or the like.

As disclosed herein, the HR code 212 generated by the CA module 110 may be a form of human communication having similar statistical properties to natural language corpora. In some embodiments, the CA module 110 may apply statistical ML methods to the HR code 212 to, inter alia, determine hypotheses, along with probabilistic confidence values, of functional classifications of respective binaries 111. The CA module 110 may exploit these and other properties of the HR code 212 to improve the accuracy and reliability of binary code analysis operations, including malware detection. For example, in some embodiments, the CA module 110 may be configured to apply deep-learning, natural language processing (NLP) techniques, such as machine translation, transformer, and/or attention architectures to classify the functional behavior of binaries 111.

As illustrated in FIG. 2, the CA module 110 may comprise and/or be coupled to a code generator 210. The code generator 210 may comprise logic configured to derive HR code 212 from binaries 111. The HR code 212 may be configured to exhibit suitable statistical properties, as disclosed herein. In some embodiments, the HR code 212 may be configured to have statistical properties that are suitable for NLP (e.g., statistical properties that are similar to, and/or compatible with, the statistical properties of natural language). The HR code 212 may be further configured to minimize and/or exclude one or more NDBS characteristics. In other words, the HR code 212 produced by the code generator 210 may be configured to characterize the behavior and/or functionality implemented by respective binaries 111 as opposed to the NDBS characteristics of the binaries 111.

Figure 3A:
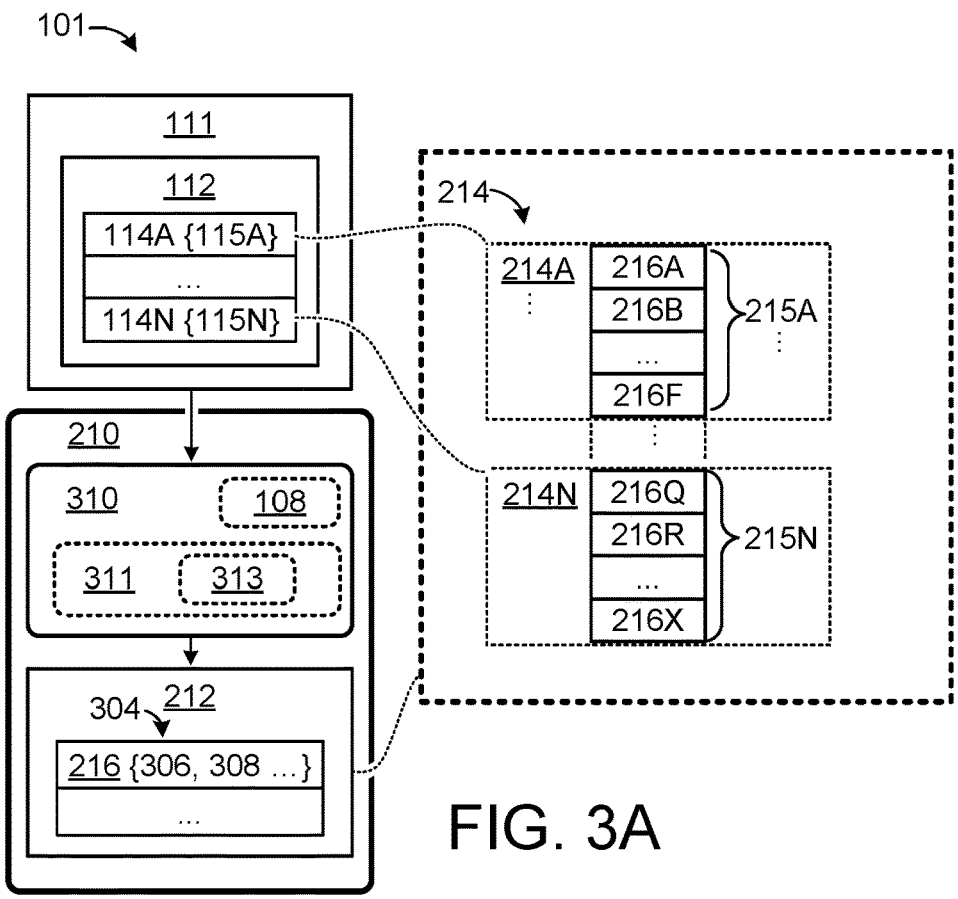
FIG. 3A illustrates an example of a code generator configured to produce a functional representation of a binary.

FIG. 3A illustrates an example of a code generator 210. The code generator 210 may be configured to derive HR code 212 from binaries 111. The code generator 210 may produce the HR code 212 by use of a binary code transformation (BCT) module 310. The BCT module 310 may be configured to derive HR code 212 from binaries 111 configured for execution on and/or within specified computing architecture(s) 108, such as the architecture 108 implemented by the HPC 105. The BCT module 310 may be configured to a) extract executable code 112 from the binary 111 and/or executable code 112 thereof, and b) convert the executable code 112 into HR code 212 (or another intermediate form). In some implementations, the HR code 212 may be produced by disassembling and/or decompiling the binary 111. The BCT module 310 may comprise any suitable means for parsing, interpreting, transforming, and/or otherwise deriving HR code 212 from a binary 111, including, but not limited to, a disassembler, an interactive disassembler, an assembler lifter, a decompiler, a reversing platform, a debugger, and/or the like.

FIG. 3A further illustrates an example of HR code 212 generated for a binary 111. The HR code 212 may comprise a plurality of human-readable (HR) instructions 216 (or simply instructions 216). In the FIG. 3A example, the HR code 212 comprises X HR instructions 216 (e.g., 216A through 216X). The instructions 216 may be organized and/or arranged into a suitable data structure, such as a list, sequence, series, ordered sequence, or the like. The HR code 212 may correspond to an HR language 311. The HR language 311 may comprise and/or correspond to a language specification, syntax, semantics, schema, vocabulary, standard, reference and/or the like. The HR language 311 may define a vocabulary 313 for the HR code 212 produced by the code generator 210. The vocabulary 313 may define the set of tokens 304 utilized within the HR code 212. The HR language 311 may further comprise rules for combining tokens 304 into HR instructions 216. The tokens 304 may include, but are not limited to, operator tokens (OT) 306, operand or argument tokens (AT) 308, and/or the like. In some embodiments, each instruction 216 may comprise an OT 306 and zero or more AT 308. An OT 306 may comprise any suitable means for specifying a computing operation. An OT 306 may include, but is not limited to, a symbol, a mnemonic, an operation code, an opcode, an opstring, an instruction code, an instruction syllable, an instruction parcel, an ASM opcode, and/or the like. An AT 308 may comprise any suitable operand and/or argument, such as a symbol, variable, local variable, global variable, reference, memory address, architecture-specific resource, architecture-specific register, and/or the like.

In some embodiments, the vocabulary 313 of the HR language 311 may correspond to the computing architecture 108 of the HPC 105. For example, the vocabulary 313 may correspond to the ISA of the HPC 105, e.g., the ISA to which the binary 111 is targeted. The vocabulary 313 may be configured to define the set of possible OT 306 of the HR language 311 (may comprise an operator vocabulary), which may correspond to the set of executable or machine code instructions supported by the architecture 108 of the HPC 105. In some embodiments, the vocabulary 313 may be further configured to define the set of possible AT 308 of the HR language 311 (may comprise an argument vocabulary).

The HR language 311 may be configured to provide one-to-M translations between instructions of the code 112 of the binary 111 and instructions 216 of the HR code 212. Accordingly, the HR language 311 may support a set of OT 306 configured to cover the set of possible executable instructions utilized in the binary 111 and/or supported by the architecture 108 of the HPC 105. The HR language 311 may be configured such that each executable instruction of the binary 111 can be translated to one or more instructions 216 of the HR code 212. In some embodiments, the code generator 210 and/or HR language 311 may be further configured to produce at least one instruction 216 for each executable instruction of the binary 111; in other words, each instruction 216 of the HR code 212 may correspond to no more than one instruction of the executable code 112.

The code generator 210 may be further configured to determine and/or capture a logical organization of the binary 111. In some embodiments, the code generator 210 may be configured organize and/or arrange the HR code 212 into functional units, such as human-readable functions (HR FCN) 214. The HR FCN 214 may correspond to respective FCN 114 of the binary 111. The HR FCN 214 may comprise respective human-readable (HR) code segments 215 (or HR instruction sequence 215), each comprising HR instructions 216 derived from EX code 112 of a corresponding FCN 114 of the binary 111 (e.g., a respective EX code segment 115).

In the FIG. 3A example, the binary 111 comprises YFCN 114, each comprising and/or corresponding to a respective EX code segment 115, e.g., FCN 114A-Y, each comprising a respective EX code segment 115A-Y comprising respective EX instructions 116 (EX instructions 116 not shown in FIG. 3A to avoid obscuring details of the illustrated examples). Accordingly, the HR code 212 generated for the binary 111 may comprise Y HR FCN 214, each comprising a HR code segment 215 derived from the EX code segment 115 of a respective one of the binary FCN 114 (e.g., HR FCN 214A-Y comprising respective HR code segments 215A-Y). As illustrated in FIG. 3A, HR FCN 214A may correspond to binary FCN 114A and the HR instructions 116A-F of the HR code segment 215A may be derived from EX instructions 116 of the EX code segment 115A, HR FCN 214Y may correspond to binary FCN 114Y and the HR instructions 116Q-X of the HR code segment 215Y may be derived from EX instructions 116 of the EX code segment 115Y, and so on.

Although examples of HR code 212 are described herein, the disclosure is not limited in this regard and could be adapted to represent, model, and/or characterize the behavior and/or functionality of a binary 111 (and/or EX code 112) using any suitable data in any suitable format and/or structure. By way of non-limiting example, in some embodiments, the HR code 212 generated for a binary 111 may comprise and/or correspond to a graph data structure, a tree data structure, or the like.

Figure 3B:
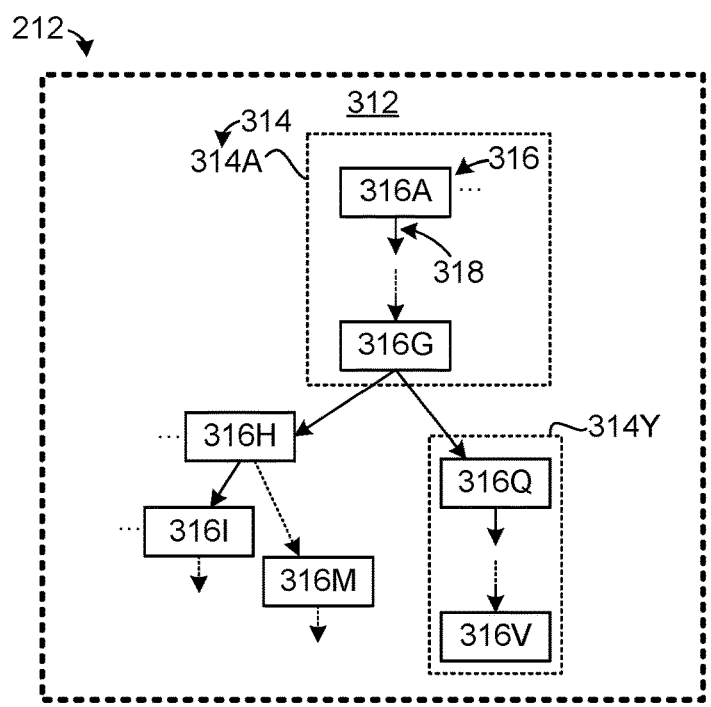
FIG. 3B illustrates another example of a functional representation of a binary.

FIG. 3B illustrates another example of HR code 212. In the FIG. 3B example, the HR code 212 may comprise and/or correspond to tree or graph 312. The HR code 212 may be generated for the binary 111 illustrated in FIG. 3A (e.g., a binary 111 comprising YFCN 114). In the FIG. 3B example, the graph 312 may comprise an ASG or the like.

As illustrated, the graph 312 may comprise a plurality of interconnected vertices or nodes 316 (e.g., nodes 316A through 316V), each comprising and/or corresponding to one or more instructions 216 of the HR code 212. The nodes 316 may be interconnected by edges 318 of the graph 312. The edges 318 may be configured to represent and/or correspond to logical control flow between nodes 316. The edges 318 may, therefore, correspond to logical control instructions 216 of the HR code 212. The graph 312 may be organized into one or function (FCN) subgraphs 314. An FCN subgraph 314 may comprise nodes 316 and/or edges 318 configured to model and/or represent the functional behavior of an FCN 114 of the binary 111. In the example illustrated in FIG. 3B, the graph 312 may comprise FCN subgraphs 314A through 314Y, each corresponding to a respective one of the FCN 114A through 114Y of the binary 111. The nodes 316 and/or edges 318 of FCN subgraph 314A may be configured to model and/or represent the functionality implemented by the executable code 112 of FCN 114A, the nodes 316 and/or edges 318 of FCN subgraph 314Y may be configured to model and/or represent the functionality implemented by the executable code 112 of FCN 114Y, and so on. Accordingly, FCN subgraph 314A may comprise and/or correspond to instructions 216A through 216K, FCN subgraph 314Y may comprise and/or correspond to instructions 216L-X, and so on.

In some embodiments, the code generator 210 may be configured to a) receive a binary 111, b) produce a graph 312 for the binary 111, and c) utilize the graph 312 to generate HR instructions 216 (an HR instruction sequence). The HR instructions 216 may be generated by traversing, walking, and/or otherwise visiting nodes 316 of the graph 312 via respective edges 318. As respective nodes 316 and/or edges 318 of the graph 316 are visited, instructions 216 corresponding to the respective nodes 316 and/or edges 318 may be appended to the HR instruction sequence.

The code generator 210 may be configured to reduce the degree to which the NDBS characteristics of binaries 111 affect the HR code 212 generated for the binaries 111. More specifically, the code generator 210 may be configured to produce HR code 212 that characterizes functional behavior as opposed to NDBS characteristics. The HR code 212 may be independent of one or more NDBS characteristics, such as the arrangement of code 112 within the binary 111, the arrangement of data within the binary 111, link order, static versus dynamic linking, format of the binary 111 (binary format), and so on. Therefore, the HR code 212 of binaries 111 that are configured to implement the same, or substantially similar, functionality may be the same, or substantially similar, despite differences between the NDBS characteristics of the binaries 111.

The code generator 210 may be further configured to produce HR code 212 having suitable statistical properties. As disclosed herein, the code generator 210 may produce HR code 212 having statistical properties that are suitable for ML language processing, such as NLP, machine translation, ML attention mechanisms, and/or the like. The HR code 212 may comprise and/or correspond to an HR language 311 and, as such, may exhibit statistical properties that are similar to, and/or compatible with, natural language corpora.

Referring back to FIG. 2, the CA module 110 may further comprise a machine-learning and/or machine-learned (ML) analysis engine 220. The ML analysis engine 220 may comprise logic configured to implement machine-learned translations (MLT) between HR code 212 derived from binaries 111 and semantic labels configured to characterize the functional behavior of respective FCN 114 of the binaries 111. The ML analysis engine 220 may be comprise ML data 230, which may be developed in one or more machine-learning and/or training procedures, as disclosed in further detail herein.

Figure 4:
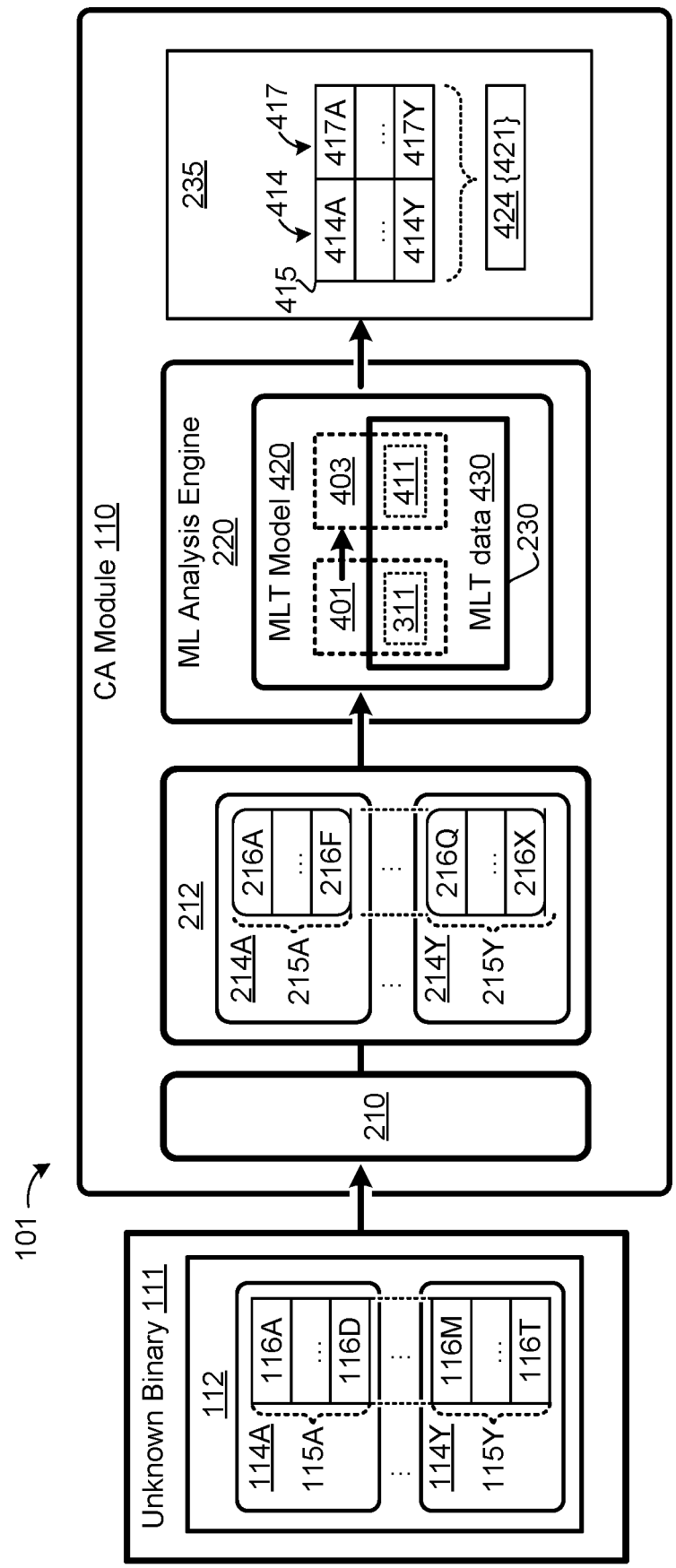
FIG. 4 illustrates an example of a machine analysis engine.

FIG. 4 illustrates an example of CA module 110 that comprises and/or is coupled to an ML analysis engine 220. The ML analysis engine 220 may comprise and/or be coupled to a machine-learned translation (MLT) model 420. The MLT model 420 may comprise logic configured to produce machine-learned translations between HR code 212 and a sequence of FCN labels 414 (a semantic FCN sequence 415 in the FCN CLS language 411). The FCN labels 414 of the semantic FCN sequence 415 may be configured to characterize and/or classify the functional behavior of respective binary FCN 114. In some implementations, the FCN labels 414 may comprise semantic information pertaining to respective FCN 114. The FCN labels 414 may, therefore, be referred to as semantic labels 414, function labels 414, semantic function labels 414, semantic FCN labels 414, or the like and the MLT model 420 may be referred to as an FCN MLT model 420, a first MLT model 420, or the like.

The FCN MLT model 420 may be configured to translate, transform, and/or otherwise, convert an input language 401 into an output language 403. The MLT model 420 may comprise and/or implement any suitable machine-learning and/or machine-learned algorithm or architecture, including, but not limited to, NLP, deep learning, a Deep Neural Network (DNN), a Recurrent Neural Network (RNN), a Long Short-Term Memory (LSTM) architecture, a sequence to sequence (Seq2Seq) architecture, a Transformer architecture, a Transformer network, and/or the like.

As disclosed in further detail herein, the MLT model 420 may comprise machine-learned translation (MLT) data 430 (or FCN MLT data 430, first MLT data 430, or the like). The MLT data 430 may be learned, developed, and/or refined in one or more machine-learning and/or training processes. The MLT data 430 may be adapted to configure the MLT model 420 to translate HR code 212 from the HR language 311 into a function reference or classification language (FCN CLS language 411); the HR language 311 and the FCN CLS language 411 may, therefore, comprise the input language 401 and output language 403 of the MLT model 420, respectively. The MLT data 430 may be adapted to configure the MLT model 420 to translate HR code 212 into function classification output data (CLS data 235). The CLS data 235 may comprise semantic FCN labels 414 (or simply FCN labels 414), which may comprise semantic information pertaining to respective FCN 114 of a binary 111. The FCN labels 414 may comprise any suitable information pertaining to an FCN 114 including, but not limited to, a name or other identifier of the FCN 114, a classification of the FCN 114 (e.g., a classification of the functionality implemented by the FCN 114), semantic information pertaining to the FCN 114, and/or the like. As disclosed herein, the binary 111 may be stripped of semantic information, such as debug symbols, function names, and so on. Determining FCN labels 414 for the binary 111 may, therefore, comprise reverse engineering semantic information stripped from the binary 111. In some embodiments, the CLS data 235 may further comprise machine translation (MT) metadata 417. The MT metadata 417 may comprise confidence values for respective FCN labels 414, the confidence values configured to quantify a confidence in the accuracy of the FCN labels 414 predicted for respective FCN 114.

In the FIG. 4 example, the executable code 112 of the binary 111 comprises a plurality of executable instructions 116 (e.g., comprises executable instructions 116A through 116T). The executable instructions 116 may comprise machine code instructions configured for execution on and/or within a specified computing architecture 108 (e.g., the architecture 108 implemented by the HPC processing resources 106A of the HPC 105). The executable instructions 116 may be arranged and/or organized in any suitable format or data structure within the binary 111 (and/or executable code 112). The executable instructions 116A through 116T may, for example, be arranged in a blob, a collection, a set, a list, a sequence, an ordered sequence, and/or the like. The executable instructions 116 may comprise, embody, and/or correspond to respective functions or functional units of the binary 111 (e.g., respective FCN 114). In the example illustrated in FIG. 4, the binary 111 comprises YFCN 114, each FCN 114 comprising and/or corresponding to respective executable instructions 116; FCN 114A comprises executable instructions 116A through 116D, FCN 114Y comprises executable instructions 116M through 116T, and so on.

The code generator 210 may be configured to derive HR code 212 from the binary 111, as disclosed herein. In the FIG. 4 example, the HR code 212 comprises HR FCN 214A-Y, each corresponding to a respective binary FCN 114A-Y. HR instructions 216A-F of HR code segment 215AA may be configured to model and/or represent the functional behavior of executable instructions 116A-D of binary FCN 114A, HR instructions 216Q-X of HR code segment 215Y may be configured to model and/or represent the functional behavior of executable instructions 116M-T of binary FCN 114Y, and so on.

In the FIG. 4 example, the ML analysis engine 220 may be configured to feed the HR code 212 (HR instructions 216A through 216X) into an input (or input layer) of the MLT model 420. Alternatively, the ML analysis engine 220 may be configured to feed respective HR code segments 215A-Y into the input (or input layer) of the MLT model 420.

The MLT model 420 may comprise and/or be coupled to MLT data 430, which may be adapted to configure the MLT model 420 to translate the HR language 311 to the FCN CLS language 411. In the FIG. 4 example, MLT model 420 translates HR code segments 214A through 214Y to FCN labels 414A through 414Y; FCN label 414A may comprise an MLT of HR instructions 216A through 216F of HR FCN 214A (which may be derived from executable instructions 116A through 116D of binary FCN 114A), FCN label 414Y may comprise an MLT of HR instructions 216Q through 216X of HR FCN 214Y (which may be derived from executable instructions 116M-T), and so on. The MLT model 420 may be further configured to produce MT metadata 417. The MT metadata 417 may be configured to quantify a confidence in the semantic FCN sequence 415 determined for the binary 111; the MT metadata 417A may quantify a confidence in the FCN label 414A assigned to FCN 114A, the MT metadata 417Y may quantify a confidence in the FCN label 414Y assigned to FCN 114Y, and so on.

As disclosed herein, the FCN labels 414 of the FCN CLS language 411 may comprise semantic information pertaining to respective binary FCN 114. The FCN labels 414 may comprise names or other information configured to capture the semantic and/or role of the FCN 114 within the binary 111. The FCN labels 414 may correspond to a vocabulary of the FCN CLS language 411 (an FCN vocabulary). The vocabulary of the FCN CLS language 411 may include the set of FCN labels 414 the MLT model 420 has been trained to identify within HR code 212 (per the MLT data 430).

In some embodiments, the CLS data 235 assigned to a binary 111 may further comprise one or more binary classification labels (binary CLS labels 424). The binary CLS labels 424 may be configured to characterize a functional behavior and/or functionality of a binary 111 based, at least in part, on the FCN labels 414 assigned to FCN 114 of the binary 111 (e.g., FCN labels 414A-Y in the FIG. 4. example). The binary CLS label 424 assigned to a binary 111 may indicate whether the binary 111 comprises malware 135 and/or is configured to implement unauthorized functionality. Alternatively, or in addition, the binary CLS labels 424 may be configured to characterize respective computational classes or types, as disclosed in further detail herein.

Figure 5:
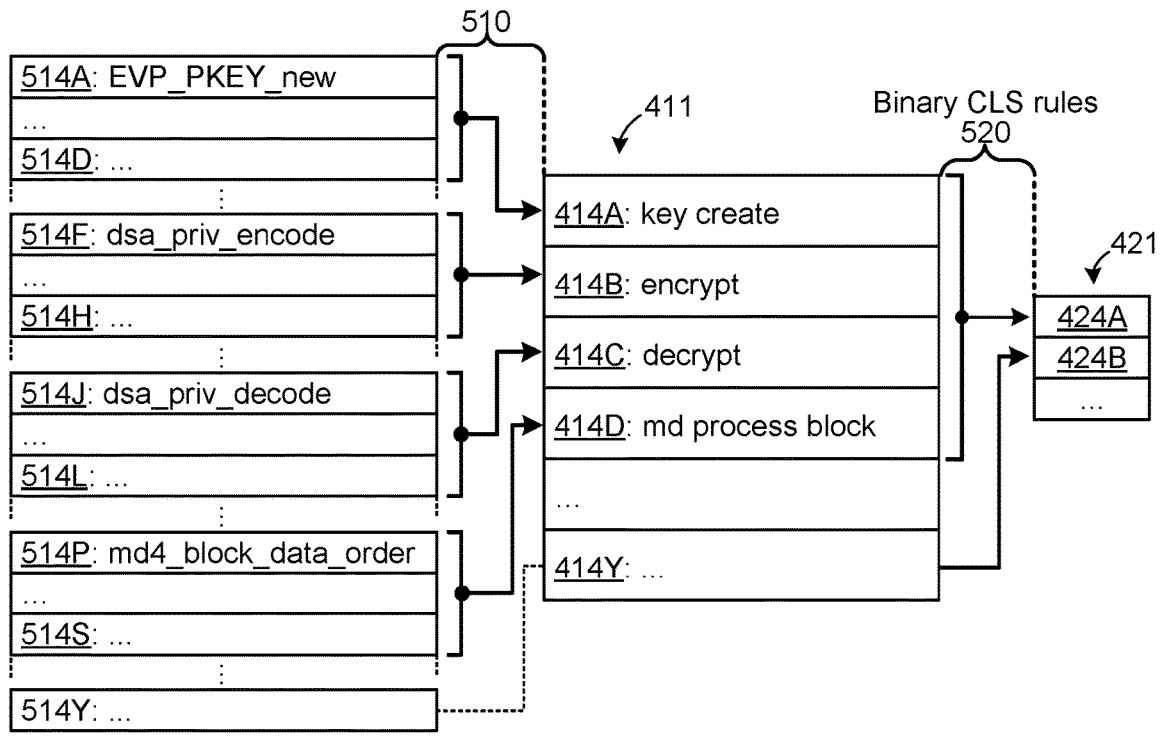
FIG. 5 illustrates an example of machine-learned translations configured to translate human-readable code derived from respective functions of a binary to corresponding semantic labels.

In some embodiments, the binary CLS labels 424 correspond to a binary classification language or vocabulary (a binary CLS language 421 or vocabulary), which may enumerate the set of binary CLS labels 424 (and corresponding FCN label sequences) the ML analysis engine 220 is capable of distinguishing. As illustrated in FIG. 5, the binary CLS language 421 may comprise a "malware" binary CLS label 424A, which may be assigned to binaries 111 determined to comprise FCN 114 configured to implement unauthorized functionality (e.g., binaries 111 that translate to FCN labels 414 characteristic of malware 135).

FIG. 5 illustrates an example of a FCN CLS language 411 implemented by the MLT model 420. The vocabulary of the FCN CLS language 411 may include and/or correspond to a plurality of function names (FCN names 514). As disclosed in further detail herein, the FCN names 514 may be learned in a machine-learning process. The FCN names 514 may, for example, be included in training data used to train the MLT model 420. The FCN names 514 may comprise debugging symbols or other semantic information. As such, FCN names 514 may be removed, stripped, or even obfuscated in the binaries 111 received and/or analyzed by the CA module 110.

In the FIG. 5 example, the FCN CLS language 411 may include FCN names 514 indicative of malware 135, such as FCN names 514 utilized in Ethereum cryptocurrency mining algorithm(s), which may include, but are not limited to, FCN name 514A ("EVP_PKEY_new") corresponding to key creation, FCN name 514F ("dsa_priv_encode") corresponding to encryption functionality, FCN name 514J ("dsa_priv_decode") corresponding to decryption functionality, FCN name 514P ("md4_block_data_order") corresponding to block process functionality, and so on. Although particular examples of FCN names 514 are described herein, the disclosure is not limited in this regard. The MLT model 420 may be configured to learn and/or utilize any FCN CLS language 411 having any vocabulary corresponding to FCN 114 characteristic of any type of functional behavior (e.g., any type of malware 135, non-malware, or the like). For example, in the FIG. 5 example, the FCN CLS language 411 may include FCN names 514 characteristics of other types of cryptocurrency mining malware 135 including, but not limited to, Zcash, Bitcoin, Steelmit, Ripple, DigiByte, Moreno, Siacoin, Litecoin, Dogecoin, NEM, Syscoin, Augur, Dash, Hatch, ByteCoin, BelaCoin, IbryCoin, Radium, Decred, Einsteinium, Gridcoin, Vertcoin, Dashcoin, Potcoin, Peercoin, Namecoin, Nautiluscoin, Expanse, PinkCoin, FoldingCoin, Navcoin, Viacoin, DNotes, Vcash, and/or the like (not shown in FIG. 5 to avoid obscuring details of the illustrated embodiments).

In some implementations, the FCN names 514 learned by the MLT model 420 may comprise FCN labels 414 of the FCN CLS language 411. In other words, the MLT model 420 may be trained to translate HR code 212 derived from executable instructions 116 of respective binary FCN 114 to FCN labels 414, the FCN labels 414 comprising FCN names 514 assigned to the corresponding FCN 114. Binaries 111 that translate to CLS data 235 comprising one or more FCN labels 414 (or FCN names 514) associated with malware 135 may be blocked from execution on the HPC 105, whereas binaries 111 that translate to CLS data 235 free from FCN labels 414 (or FCN names 514) associated with malware 135 may be permitted to proceed to execution on the HPC 105.

In some embodiments, the ML analysis engine 220 may be configured to normalize the FCN labels 414 utilized in the FCN CLS language 411. As illustrated in FIG. 5, the ML analysis engine 220 may comprise and/or implement FCN normalization rules 510 (and/or a FCN normalization layer), which may be configured to map FCN names 514 associated with FCN 114 configured to implement same or similar functionality, semantics and/or roles to respective FCN labels 414. The FCN labels 414 may, therefore, comprise normalized semantic descriptors of binary FCN 114 configured to implement same or similar functionality in different types of binaries 111 (and/or malware 135). For example, the MLT model 420 may learn FCN names 514 for a plurality of FCN 114 configured to implement "key creation" functionality in different types of cryptocurrency malware 135; FCN name 514A ("EVP_PKEY_new") may correspond to key creation functionality in Ethereum mining algorithms, FCN name 514D may correspond to "key creation" functionality in Zcash mining algorithms, and so on. In response, the FCN normalization rules 510 may be configured to map the plurality of FCN names 514A through 514D to a normalized "key creation" FCN label 414A. As illustrated in FIG. 5, the FCN normalization rules 510 may be further configured to map FCN names 514F-H pertaining to encryption functionality to a normalized "encryption" FCN label 414B, map FCN names 514J-L pertaining to decryption functionality to a normalized "decryption" FCN label 414C, map FCN names 514P-S pertaining to block process calls to a normalized "md process block" FCN label 414D, and so on.

In some embodiments, the ML analysis engine 220 may comprise and/or be coupled to binary classification (binary CLS) rules 520, which may be configured to map and/or associate respective FCN labels 414 (and/or FCN names 514) with binary CLS labels 424 of the binary CLS language 421. As illustrated in FIG. 5, FCN labels 414A through 414D may be indicative of cryptocurrency mining malware 135 and, as such, may be mapped to the "malware" binary CLS label 424A by the binary CLS rules 520. Alternatively, or in addition, the binary CLS rules 520 may be configured to associate FCN names 514 with respective binary CLS labels 424. In the FIG. 5 example, FCN names 514A to 514D, 514F to 514H, 514J to 514L, and 514P to 514S may be indicative of cryptocurrency mining malware 135 and, as such, may be mapped to the "malware" binary CLS label 424A by the CLS rules 520. In some implementations, the binary CLS rules 520 may be further configured to associate FCN names 514 and/or FCN labels 414 of FCN 114 determined to implement authorized functionality (are free from malware 135) with a "clean" binary CLS label 424B.

In some implementations, the MT metadata 417 may be further configured to indicate a confidence in the binary CLS labels 424 assigned to respective binaries 111. The ML metadata 417 may be configured to quantify a probability that the binary CLS label 424 assigned to a binary 111 is accurate based, at least in part, on ML metadata 417 of the FCN labels 414 from which the binary CLS label 424 was determined. For example, the ML metadata 417 may be configured to quantify a confidence in assignment of the "malware" binary CLS label 424A to a binary 111 based, at least in part, on confidence values determined for the FCN labels 414 used to assign the "malware" binary CLS label 424A to the binary 111 (e.g., confidence values of FCN labels 414 associated with malware 135).

Figure 6:
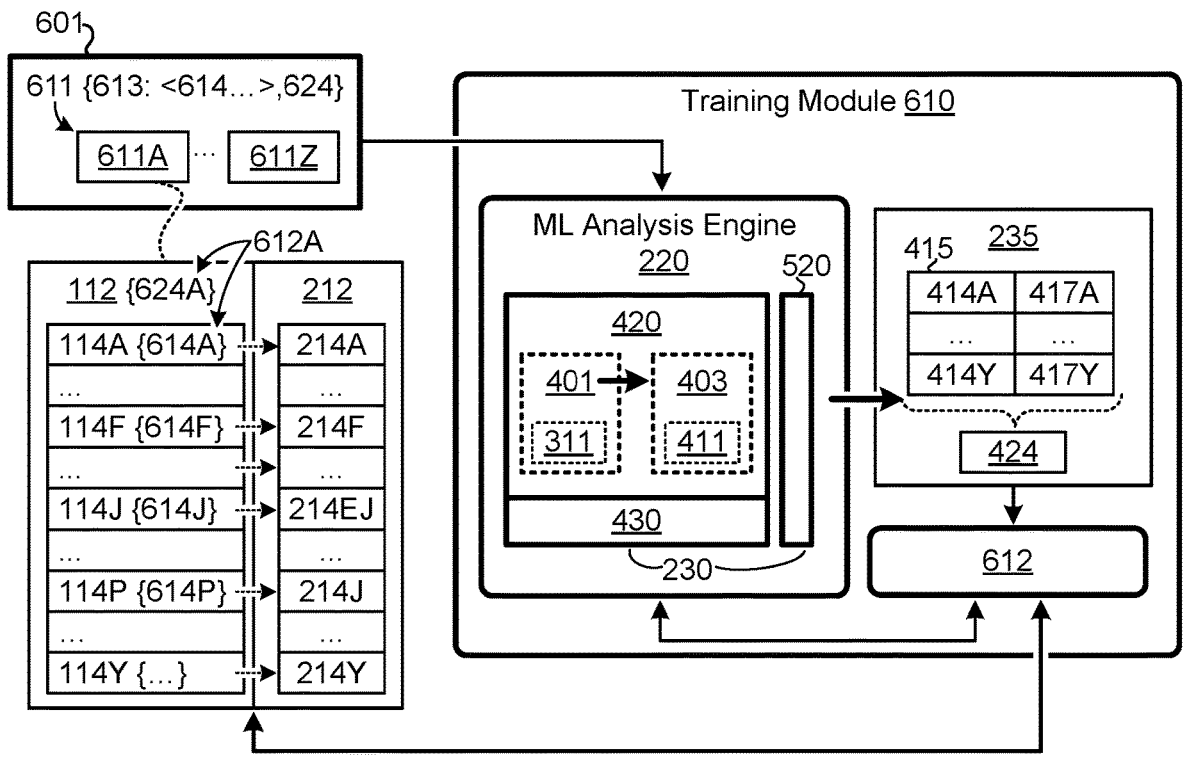
FIG. 6 illustrates an example of a training module.

As disclosed herein, the MLT model 420 may comprise and/or be coupled to MLT data 430. The MLT data 430 may be learned and/or refined in one or more machine-learning and/or training process(es). FIG. 6A illustrates an example of a training module 610 configured to cause the MLT model 420 to learn and/or refine MLT data 430 for translating HR code 212 to FCN labels 414. The training module 610 may be configured for operation on computing resources, such as the computing resources 102 illustrated in FIG. 1. The computing resources 102 may be embodied and/or implemented by one or more HW component(s) 104, such as a computing device 104A, appliance 104B, embedded device 104C, peripheral device, and/or the like. In some embodiments, aspects of the training module 610 may comprise and/or be implemented by computer-readable code stored on a non-transitory storage medium.

The training module 610 may comprise and/or be coupled to a dataset 601. The dataset 601 may comprise one or more training binaries 611 (e.g., training binaries 611A through 611Z). In some implementations, training of the MLT model 420 may be driven by a dataset 601 comprising a library comprising many disassembled FCN 114 with debugging symbols (10 million or more). The training binaries 611 may comprise EX code 112, as disclosed herein (e.g., may comprise executable programs, libraries, firmware, and/or the like). In contrast to unknown or stripped binaries 111, the training binaries 611 may comprise semantic data 613 (debugging symbols and/or the like). The semantic data 613 may comprise known classification information pertaining to respective training binaries 611 and/or FCN 114, such as training FCN labels 614, training binary CLS labels 635, and so on. The training FCN labels 614 may comprise names, identifiers, debug symbols, and/or other semantic information pertaining to respective FCN 114. As illustrated, the semantic data 613A of the training binary 611A may comprise training FCN labels 614A through 614Y, which may comprise semantic information pertaining to FCN 114A through 114Y, respectively. In some implementations, the training FCN labels 614 may comprise FCN names 514; training FCN label 614A may comprise FCN name 514A ("EVP_PKEY_new"), training FCN label 614F may comprise FCN name 514F ("dsa_priv_encode"), training FCN label 614J may comprise FCN name 514J ("dsa_priv_decode"), training FCN label 614P may comprise FCN name 514P ("md4_block_data_order"), and so on. Alternatively, or in addition, the training FCN labels 614 may comprise FCN labels 414; training FCN label 614A may comprise FCN label 414A ("key create"), training FCN label 614F may comprise FCN label 414B ("encrypt"), training FCN label 614J may comprise FCN label 414C ("decrypt"), training FCN label 614P may comprise FCN label 414D ("md process block"), and so on.

In some implementations, the training binaries 611 may further comprise known classification information, such as training binary CLS labels 635. The training binary CLS labels 635 may correspond to a binary CLS language 421, as disclosed herein. The training binary CLS labels 635 may identify training binaries 611 that comprise and/or are configured to implement unauthorized functionality (e.g., malware 135). Alternatively, or in addition, the training binary CLS labels 635 may be configured to identify FCN 114 (and/or training FCN labels 614) that are characteristic of respective binary CLS labels 424 (and/or training binary CLS labels 635). For example, the training binary CLS label 635A of training binary 611A may indicate whether the training binary 611A comprises malware 135. Alternatively, or in addition, the training binary CLS labels 635 may identify FCN 114 and/or training FCN labels 614 that are characteristic of malware 135 (e.g., characteristic of the "malware" binary CLS label 424A).

In some embodiments, the dataset 601 may further comprise HR code 212 for respective training binaries 611. Alternatively, the HR code 212 for respective training binaries 611 be produced by the code generator 210 as needed (code generator 210 not shown in FIG. 6 to avoid obscuring details of the illustrated examples).

The training module 610 may be configured to implement machine-learning training iterations, epochs, or the like. Implementing an iteration of a machine-learning procedure may comprise retrieving a training binary 611 from the dataset 601, inputting HR code 212 derived from the training binary 611 into the ML analysis engine 220 and configuring the MLT model 420 to produce an MLT of the HR code 212 (e.g., produce CLS data 235 for the training binary 611). The training module 610 may further comprise an evaluation module 612, which may be configured to determine an error between the CLS data 235 translated from the training binary 611 and known CLS data 235 of the training binary 611. More specifically, the evaluation module 612 may be configured to determine an error between the FCN labels 414 predicted for respective FCN 114 of the training binary 611 and the known training FCN labels 614 of the training binary 611. In the FIG. 6 example, the evaluation module 612 may be configured to quantify error between the FCN labels 414A through 414Y determined the FCN 114 of the training binary 611A and the known training FCN labels 614A through 614Y of the training binary 611A. The training module 610 may be further configured to refine the MLT data 430 in accordance with the determined error.

In some implementations, the training module 610 may be further configured to train the ML analysis engine 220 to translate binaries 111 to binary CLS labels 424. The training module 610 may train the ML analysis engine 220 to learn CLS rules 520 that accurately map FCN names 514 and/or FCN labels 414 to corresponding binary CLS 424. For example, the training module 610 may be configured to train the ML analysis engine 220 to map FCN labels 414A through 414Y (and/or FCN names 514A . . . D, 514F . . . H, 514J . . . L, 514P . . . S) to the "malware" binary CLS label 424A. The evaluation module 612 may be further configured to determine a CLS error between binary CLS labels 424 assigned to training binaries 611 (based on the FCN labels 414 determined for the training binaries 611) and the known, training BCLS labels 635 of the training binaries 111. The training module 610 may utilize the CLS error to learn and/or refine the CLS rules 520.

The training module 610 may implement any suitable training scheme or procedure. In some embodiments, the training module 610 is configured to implement a Train, Validate, Test (TVT) training procedure. The training module 610 may split the dataset 601 into canonical Train, Validate, and Test sets, each comprising a respective subset of the dataset 601. The Train set may comprise about 80% and the Validate and Test sets may comprise about 10%, respectively. The dataset 601 may be used to develop and/or refine MLT data 430 to translate HR FCN 214 into FCN labels 414 that accurately characterize the functional behavior of the corresponding FCN 114 (FCN labels 414 that match the training FCN labels 614). The training module 610 may utilize the Validate and Test sets to validate and test the translations produced by the MLT model 420 per the MLT data 430. The ML data 230 of the ML analysis engine 220, including the MLT data 430, may be maintained on a non-transitory storage medium. The MLT data 430 may be loaded from the non-transitory storage medium to configure the MLT model 420 to implement translations between the HR language 311 and FCN CLS language 411, as disclosed herein. Alternatively, the ML data 230 may be incorporated into hardware component(s) 104 configured to implement aspects of the CA module 110. For example, the ML data 230, including the MLT data 430, may be incorporated into a hardware component 104 configured to implement aspects of the ML analysis engine 220 (e.g., the MLT model 420), such as circuitry, logic, digital logic, logic circuitry, programmable logic, programmable logic circuitry, an IC, an ASIC, an FPGA, a chip, a board, a PCB, and/or the like. For example, the MLT model 420 may be implemented in hardware, and the MLT data 430 may be incorporated into a design of the hardware. In another example, the MLT model 420 may be implemented in programmable hardware, such as an FPGA, and the MLT data 430 may be incorporated into firmware of the programmable hardware (e.g., may be incorporated into a firmware bitstream of the FPGA, or the like).

Figure 7A:
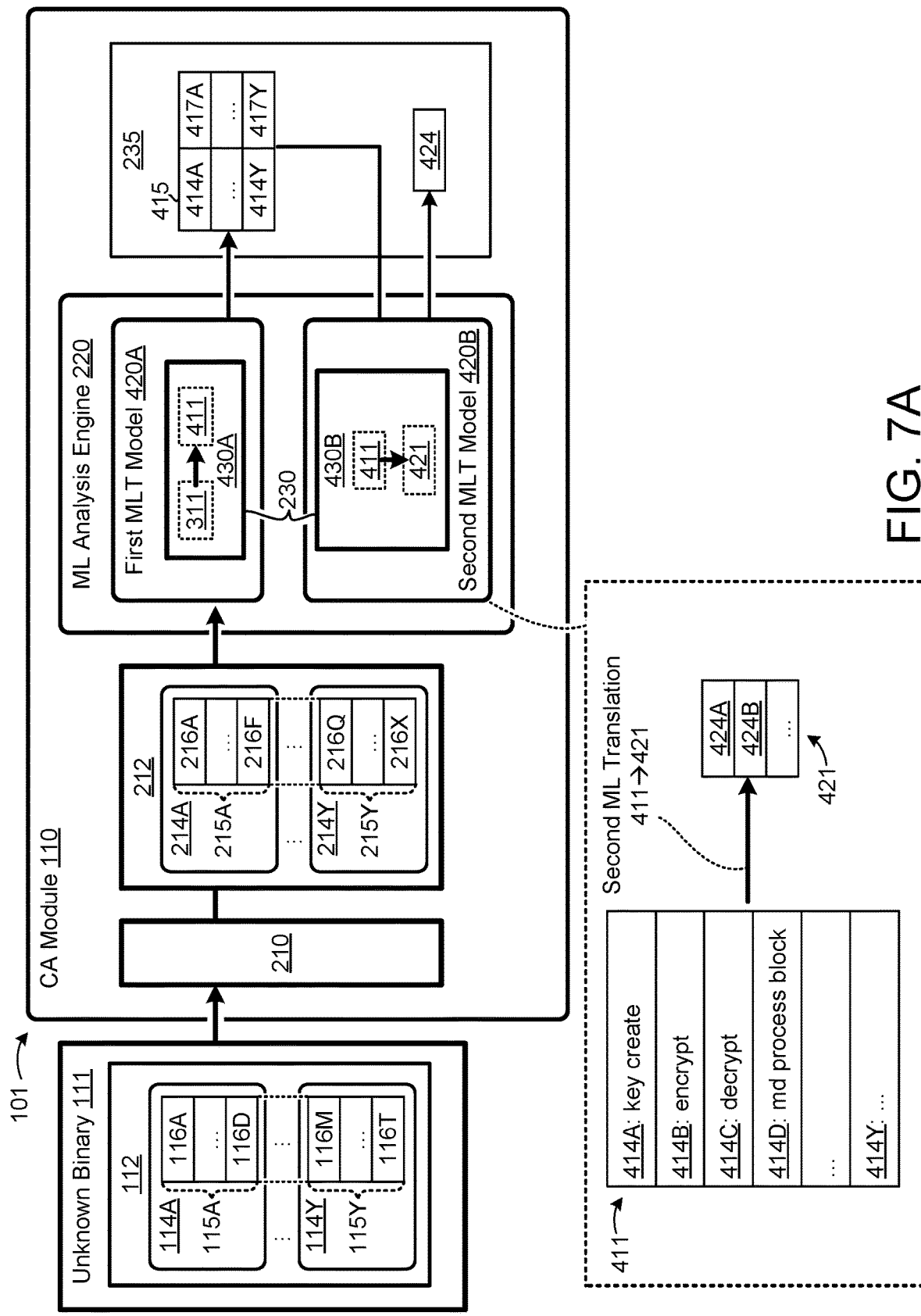
FIG. 7A illustrates another example of an apparatus configured to implement aspects of binary code analysis.

FIG. 7A illustrates another example of an apparatus 101 configured to implement aspects of binary code analysis (e.g., aspects of a CA module 110). In the FIG. 7A example, the ML analysis engine 220 may comprise a first MLT model 420A configured to translate HR code 212 into a series of FCN labels 414 per MLT data 430A, as disclosed herein. As illustrated in FIG. 7A, the first MLT model 420 may be configured to translate HR FCN 214A-Y into a sequence of FCN labels 414A-Y, each FCN label 414A-Y corresponding to a respective FCN 114 of the unknown, stripped binary 111. In some implementations, the ML analysis engine 220 produces an FCN label 414 for each FCN 114 of the binary 111. Alternatively, the ML analysis engine 220 may be configured to produce FCN labels 414 for a subset of the FCN 114 of the binary 111 (e.g., may ignore one or more FCN 114).

In some embodiments, the ML analysis engine 220 may further comprise a second machine-learned translation (MLT) model 420B. The second MLT model 420B may be configured to translate FCN labels 414 into binary CLS labels 424; the FCN CLS language 411 may comprise the input language 401 of the second MLT model 420B and the binary CLS language 421 may comprise the output language 403 of the second MLT model 420B. The second MLT model 420B may comprise and/or implement any suitable machine-learning and/or machine-learned algorithm or architecture, as disclosed herein. The second MLT model 420B may replace the CLS rules 520 described above in conjunction with FIGS. 5 and 6.

In the FIG. 7A example, the second MLT model 420B is configured to translate the FCN labels 414A-Y to a binary CLS label 424. The binary CLS label 424 may indicate whether unauthorized functionality was detected within the binary 111, as disclosed herein. In other words, the second MLT model 420B may be configured to translate sequences of FCN labels 414 that are characteristic of malware 135 to the "malware" binary CLS label 424A. Alternatively, or in addition, the second MLT model 420B may be configured to translate sequences of FCN labels 414 that are characteristic of authorized functionality to the "clean" binary CLS label 424B. The ML analysis engine 220 may, therefore, comprise a two-step, two-stage, or two-layer ML translation, including a first translation layer (a first MLT model 420A) configured to translate HR code 212 of the HR language 311 to FCN CLS labels 414 of the FCN CLS language 411 and a second translation layer (a second MLT model 420B) configured to translate the FCN CLS labels 414 of the FCN CLS language 411 to binary CLS labels 424 of the binary CLS language 421.

Figure 7B:
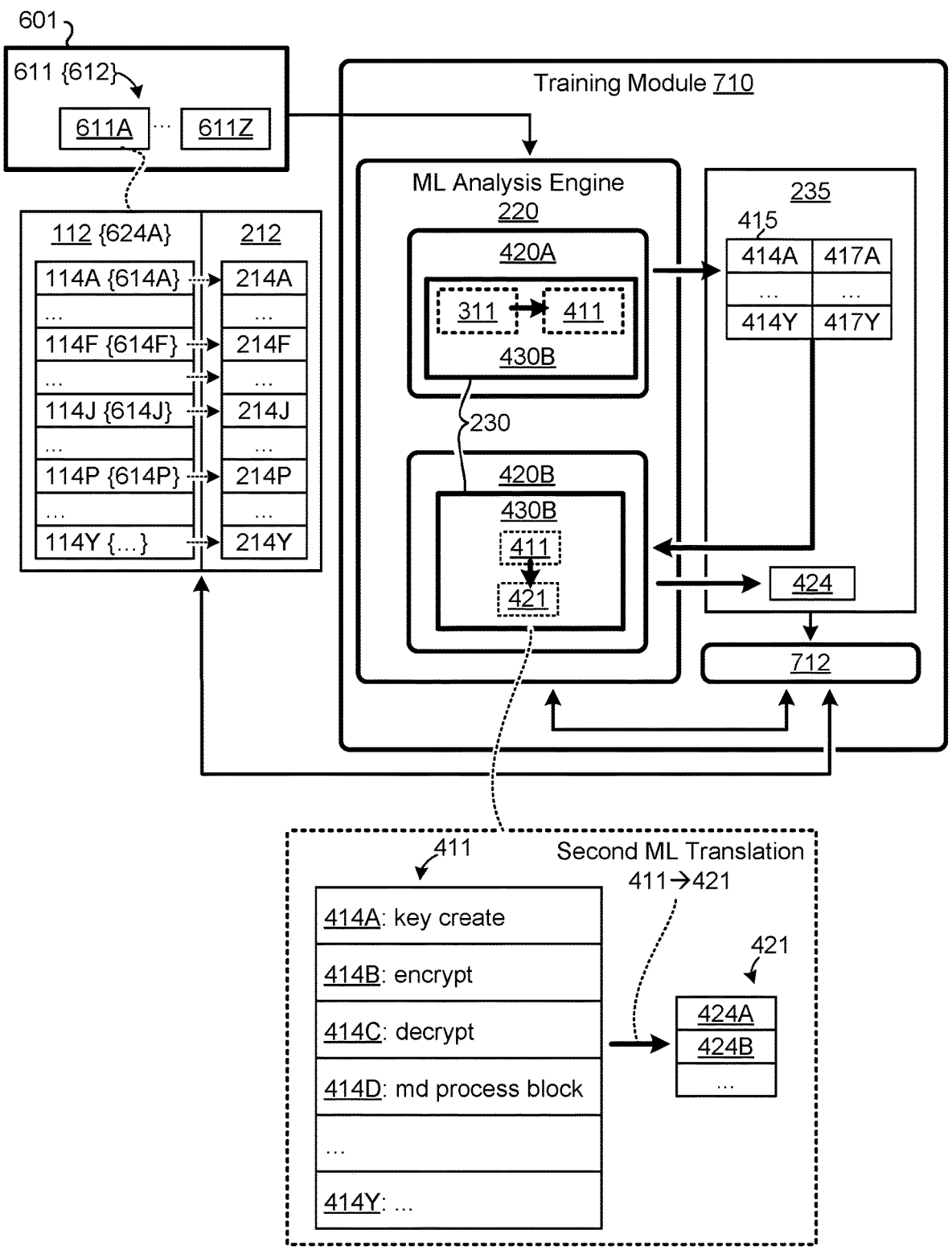
FIG. 7B illustrates another example of a training module.

The second MLT model 420B may comprise second MLT data 430B, which may be adapted to configure the second MLT model 420B to translate FCN labels 414 to binary CLS labels 424 (translate the FCN CLS language 411 to the binary CLS language 421). FIG. 7B illustrates another example of a training module 710. The training module 710 may comprise and/or be coupled to a dataset 601 comprising training binaries 611. The training module 710 may be configured to train the first MLT model 420A to translate training labels 614 of the training binaries 111 to FCN labels 414, as disclosed herein.

In the FIG. 7B embodiment, the training module 710 may be further configured to train the second MLT model 420B to translate sequences of FCN labels 414 to binary CLS labels 424 corresponding to the known training binary CLS labels 635. The training module 710 may be configured to implement any suitable machine-learning training procedure, as disclosed herein.

In some implementations, the training module 710 may implement training iterations involving the first MLT model 420A and the second MLT model 420B (joint training). A joint training iteration may comprise translating HR code 212 to a sequence of FCN labels 414 by use of the first MLT model 420A and using the second MLT model 420B to translate the sequence of labels 414 output by the first MLT model 420 into a binary CLS label 424. The evaluation module 712 may determine an error between the FCN labels 414 and the known training labels 614 of the training binary 111 and may refine the first MLT data 430 accordingly. The evaluation module 712 may be further configured to determine an error between binary CLS labels 424 predicted by the second MLT model 420B and known training binary CLS labels 635 and refine the second MLT data 430B accordingly.

Alternatively, or in addition, the first MLT model 420A and the second MLT model 420B may be trained in separate, independent training iterations or processes. A training iteration that involves the second MLT model 420B (and is independent of the first MLT model 420A) may comprise translating the known training labels 614 of a training binary 611 to a binary CLS label 424, determining an error between the binary CLS label 424 and the known training binary CLS label 635, and refining the second MLT data 430B accordingly. The ML data 230, including the first MLT data 430A and the second MLT data 430B, may be stored on a non-transitory storage medium for use in configuring other instances of the ML analysis engine 220. Alternatively, or in addition, the ML data 230, including the first MLT data 430A and the second MLT data 430B, may be incorporated into hardware configured to implement aspects of the ML analysis engine 220, as disclosed herein.

Figure 8A:
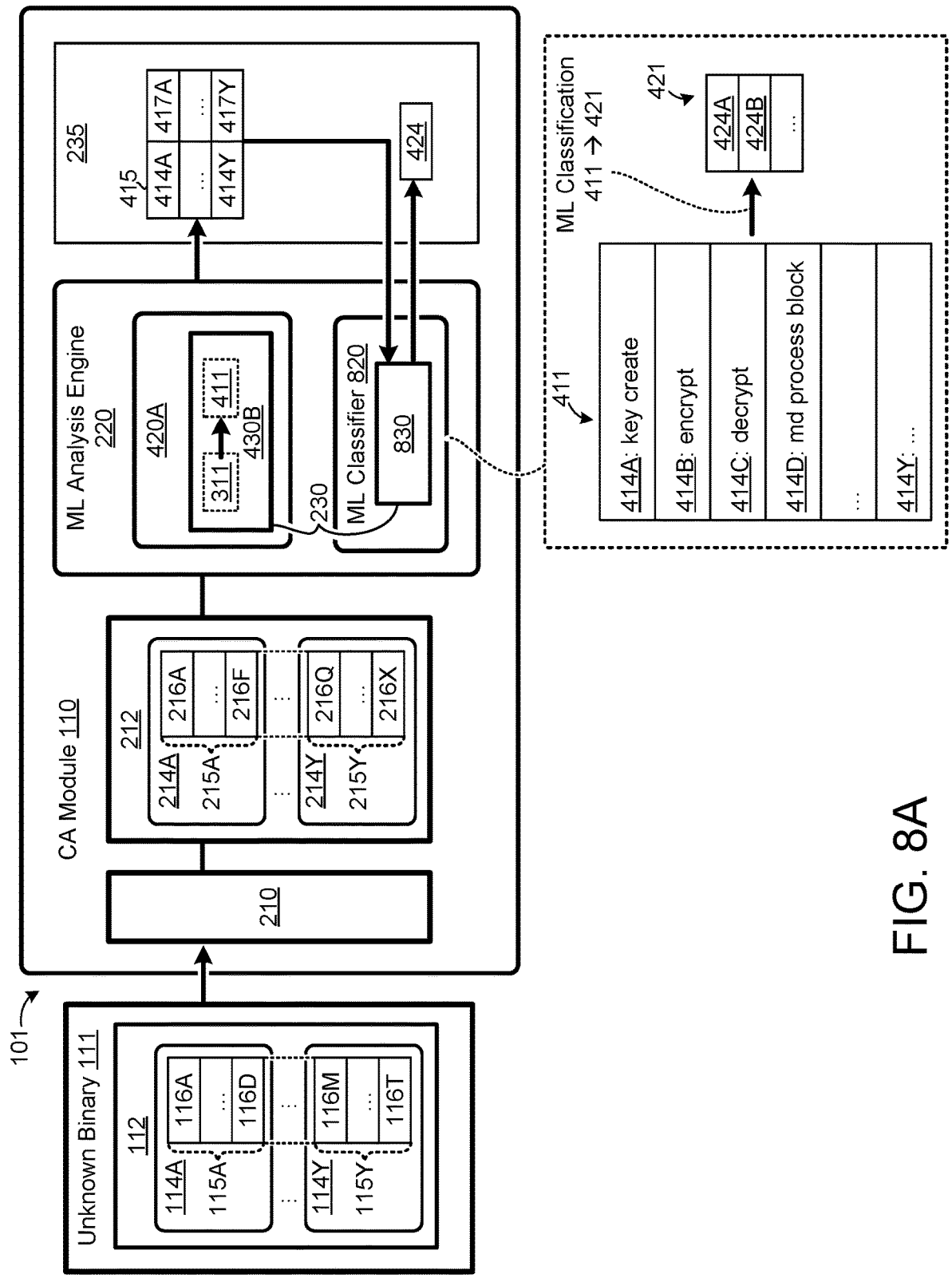
FIG. 8A illustrates another example of an apparatus configured to implement aspects of binary code analysis.

FIG. 8A illustrates another of an apparatus 101 configured to implement aspects of a CA module 110 and/or binary code analysis, as disclosed herein. In the FIG. 8A embodiment, the ML analysis engine 220 may comprise a first or FCN MLT model 420A and a machine-learned (ML) classifier 820. The FCN MLT model 420A may comprise MLT data 430A adapted to configure the MLT model 420 to translate HR code 212 to FCN labels 414, as disclosed herein (translate the HR language 311 to the FCN CLS language 411).

The ML classifier 820 may be configured to assign binary CLS labels 424 to binaries 111 based on the FCN labels 414 determined for the binaries 111. The ML classifier 820 may implement any suitable ML classification algorithm or architecture including, but not limited to, an autoencoder, a deep autoencoder, a binary classifier, logistic regression, Naïve Bayes classification, K-nearest neighbor, a decision tree, a decision forest, a support vector machine, an ANN, and/or the like.

The ML data 230 of the ML analysis engine 220 may comprise machine-learned classification (MLC) data 830. The MLC data 830 may configure the ML classifier 820 to assign binary CLS labels 424 to FCN labels 424 characteristic of the functional behavior associated with the respective binary CLS labels 424. The MLC data 830 may be developed and/or refined in one or more machine-learning training processes, as disclosed in further detail herein.

Figure 8B:
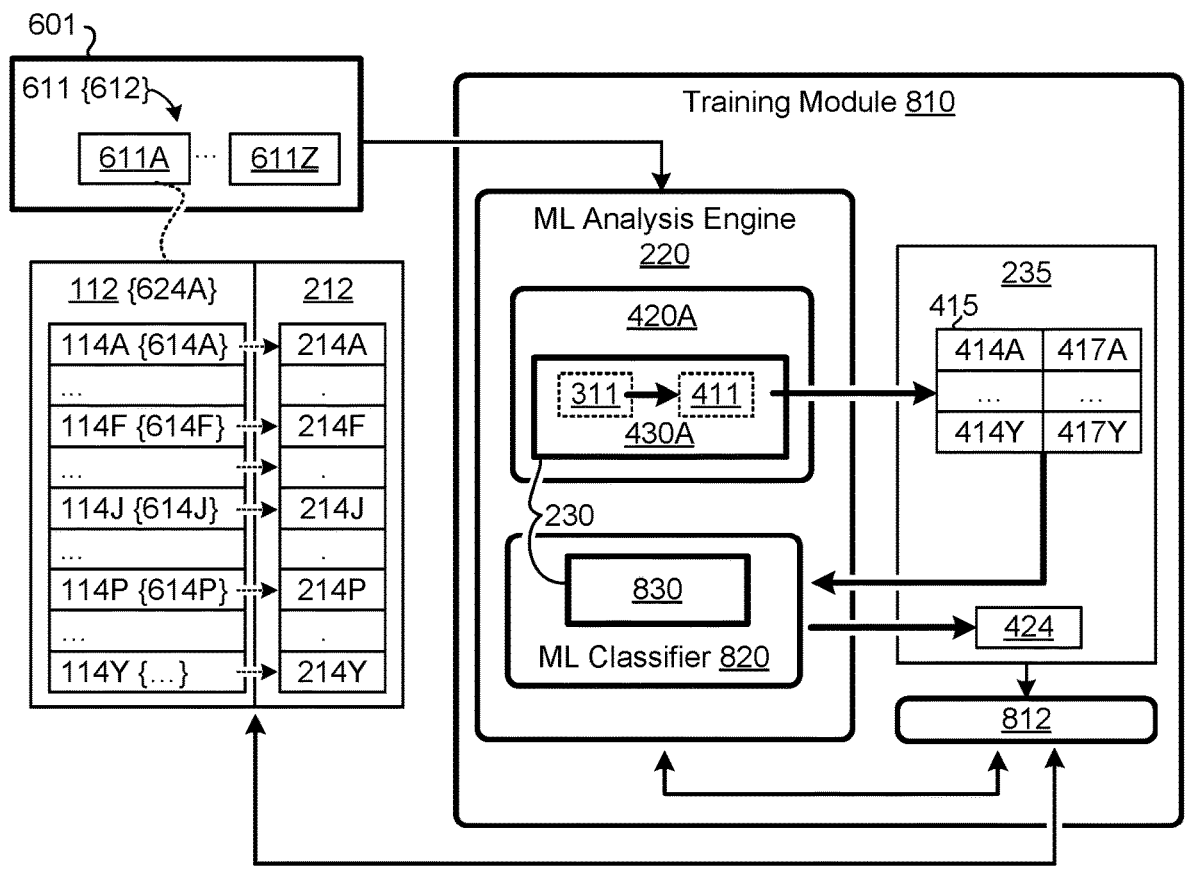
FIG. 8B illustrates another example of a training module.

FIG. 8B illustrates another example of a training module 810. The training module 810 may comprise and/or be coupled to a dataset 601 comprising training binaries 111, as disclosed herein. The training module 810 may be configured to train the MLT model 420A to translate training labels 614 of the training binaries 111 to FCN labels 414, as disclosed herein. In the FIG. 8B embodiment, the training module 810 may be further configured to train the ML classifier 820 to assign binary CLS labels 424 to binaries 111 based on the FCN labels 414 determined for the binaries 111. The training module 810 may be configured to implement any suitable machine-learning training procedure including, but not limited to, TVT, cross validation, dropout, and/or the like. The training module 810 may implement one or more training iterations.

In some implementations, the training iterations may involve the MLT model 420 and the ML classifier 820 (joint training). A joint training iteration may comprise translating HR code 212 to a sequence of FCN labels 414 by use of the first, FCN MLT model 420A and using the ML classifier 820 to assign a binary CLS label 424 to the sequence of FCN labels 414 output by the MLT model 420A. The evaluation module 812 may determine an error between the FCN labels 414 and the known training labels 614 of the training binary 111 and may refine the MLT data 430A accordingly. The evaluation module 812 may be further configured to determine an error between binary CLS labels 424 predicted by the ML classifier 820 and known training binary CLS labels 635 and refine the MLC data 830 accordingly.

Alternatively, or in addition, the MLT model 420 and the ML classifier 820 may be trained in separate, independent training iterations or processes. A training iteration that involves the ML classifier 820 (and is independent of the MLT model 420A) may comprise assigning a CLS label 414 to the known training labels 614 of a training binary 611, determining an error between the binary CLS label 424 and the known training binary CLS label 635 of the training binary 611, and refining the MLC data 830 accordingly. The ML data 230, including the MLT data 430A and the MLC data 830, may be stored on a non-transitory storage medium for use in configuring other instances of the ML analysis engine 220. Alternatively, or in addition, the ML data 230, including the MLT data 430A and the MLC data 830, may be incorporated into hardware configured to implement aspects of the ML analysis engine 220, as disclosed herein.

Referring back to FIG. 2, the CA module 110 may be configured to receive a binary 111 for execution on the HPC 105. The functional behavior of the binary 111 may be unknown. Moreover, the binary 111 may be stripped of extraneous semantic information, as disclosed herein (the binary 111 may comprise an unknown, stripped binary 111). In response, the CA module 110 may a) generate HR code 212 for the binary 111 (e.g., by use of the code generator 210) and b) translate the HR code 212 into CLS data 235 (e.g., by use of the ML analysis engine 220 configured per the ML data 230 developed in one or more previously implemented training processes). The HR code 212 may be translated into semantic FCN labels 414, as disclosed herein. In the FIG. 2 example, the HR code 212 derived from the binary 111 may be translated into a sequence of Y FCN labels 414, each corresponding to a respective one of YFCN 114 of the binary 111 (e.g., FCN labels 414A through 414Y corresponding to FCN 114A through 414Y, respectively). The translation may be implemented by an MLT model 420 configured in accordance with MLT data 430, as disclosed herein.

In some implementations, the ML analysis engine 220 may be further configured to assign a binary CLS 424 to the binary 111. The binary CLS 424 may be assigned based on the FCN labels 414A through 414Y. In some implementations, the binary CLS 424 may be assigned based on binary CLS rules 520, as illustrated in the FIG. 5 example. A "malware" binary CLS 424A may be assigned to the binary 111 in response to determining that one or more of the FCN labels 414A through 414Y are associated with unauthorized functionality (e.g., malware 135).

In some embodiments, the binary CLS label 424 of the CLS data 235 may be assigned by a second MLT model 420B of the ML analysis engine 220 (e.g., as illustrated in FIGS. 7A and/or 7B). The second MLT model 420B may be configured to the FCN labels 414A through 414Y to a binary CLS label 424 (e.g., the MLT model 420B may be configured to translate the semantic FCN labels 414 of the FCN CLS language 411 to binary CLS labels 424 of the binary CLS language 431 per MLT data 430B). Alternatively, or in addition, the binary CLS label 424 may be assigned by an ML classifier 830 (e.g., as illustrated in FIGS. 8A and/or 8B). The ML classifier 820 may assign the binary CLS label 424 based on the semantic FCN labels 414A through 414Y (per MLC data 830).

The CA module 110 may further comprise policy logic 240. The policy logic 240 may be configured to determine and/or implement one or more actions 245 pertaining to a binary 111 based, at least in part, on the CLS data 235 determined for the binary 111. The policy logic 240 may comprise rules for determining and/or implementing actions 245 pertaining to binaries 111 determined to comprise malware 135, binaries 111 determined to be clean, and/or the like. A binary 111 comprising malware 135 may be identified based on the semantic FCN translation determined for the binary (e.g., FCN labels 414), the binary CLS 424 assigned to the binary 111, and/or the like, as disclosed herein.

The policy logic 240 may be configured to determine and/or implement actions 245A pertaining to binaries 111 that are authorized for execution on the HPC 105 (AUTH actions 245A). The AUTH actions 245A pertaining to a binary 111 submitted by a user 103 (AUTH actions 245A{111,103}) may include, but are not limited to: permitting the binary 111 to proceed to execution on the HPC 105, notifying the HPC 105 that execution of the binary 111 is authorized, notifying the HPC 105 that the binary 111 has been validated as clean, notifying the administrator 107 that the binary 111 is authorized for execution, notifying the user 103 that the binary 111 is authorized for execution, transferring the binary 111 to the HPC 105, configuring the HPC 105 to execute the binary 111, queueing the binary 111 for execution on the HPC 105 (e.g., appending the binary 111 to an execution queue), recording that the binary 111 submitted by the user 103 is authorized for execution on a non-transitory computer-readable storage medium (e.g., a log maintained within the NV storage resources 102C), and/or the like.

The policy logic 240 may be further configured to determine and/or implement actions 245B pertaining to binaries 111 that are not authorized for execution on the HPC 105 (BLOCK actions 245B). The BLOCK actions 245B pertaining to a binary 111 submitted by a user 103 (BLOCK actions 245B{111,103}) may include, but are not limited to: blocking the binary 111 from being executed on the HPC 105, preventing the binary 111 from being transferred to the HPC 105, maintaining the binary 111 in NV storage resources 102C (e.g., quarantining the binary 111), notifying an administrator 107 that an attempt to execute unauthorized functionality (e.g., malware 135) on the HPC 105 was detected, notifying the administrator 107 that the user 103 attempted to execute malware 135 on the HPC 105, notifying the user 103 that the binary 111 is not authorized for execution on the HPC 105, revoking HPC access privileges from the user 103, marking the binary 111 as malware 135, recording that the binary 111 submitted by the user 103 is authorized for execution on a non-transitory computer-readable storage medium (e.g., a log maintained within NV storage resources 102C), and/or the like.

As illustrated above, the CA module 110 may determine whether the binary 111 is configured to implement unauthorized functionality through static analysis. More specifically, the CA module 110 may detect unauthorized functionality in binaries 111, such as malware 135, prior to execution (or emulated execution) of the binaries 111.

The FCN 114 implemented by many programs may fall into distinct categories or classes of computing functionality (computational CLS). As used herein, a computational CLS refers to a distinct computing paradigm, category, class, or motif. The ML translation engine 220 may be configured to translate FCN labels 414 of the FCN CLS language 411 to binary CLS labels 424 corresponding to respective computational CLS.

Figure 9A:
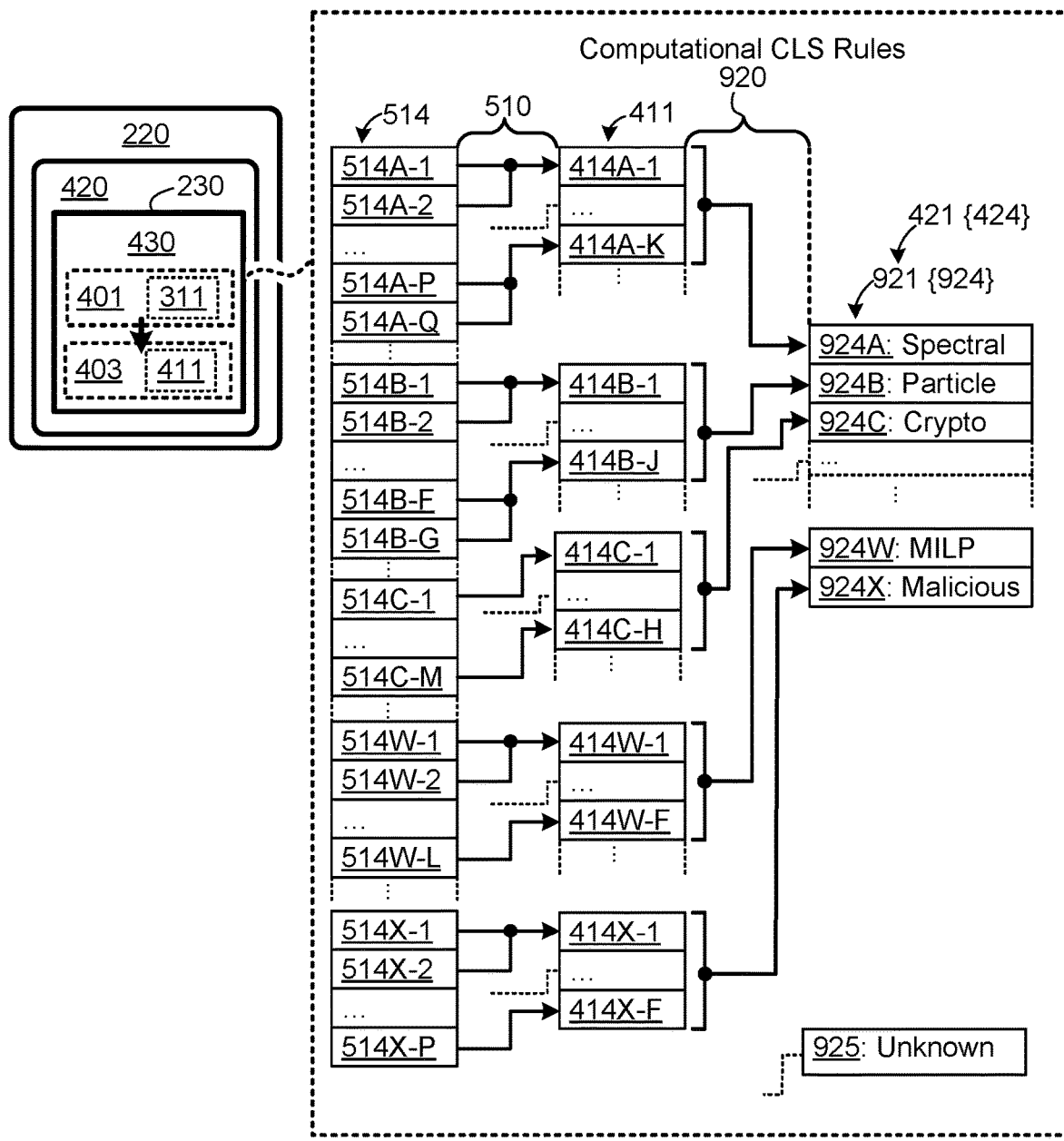
FIG. 9A illustrates an example of a machine-learned analysis engine configured to determine computational classes of unknown, stripped binaries.

Accordingly, as illustrated in FIG. 9A, the binary CLS labels 424 of the binary CLS language 421 may comprise and/or be embodied by a computational CLS language 921. The computational CLS language 921 may be configured to characterize respective computational CLS (by respective computational CLS labels 924, or simply computational CLS 924). In the FIG. 9A example, binaries 111 comprising FCN 114 that translate to FCN labels 414, such as "key creation," "encryption," decryption," and/or "md process block" may be characteristic of a "cryptography" or "cryptocurrency" computational CLS 924 (e.g., may be assigned a "crypto" computational CLS 924C, as disclosed in further detail herein).

Figure 9B:
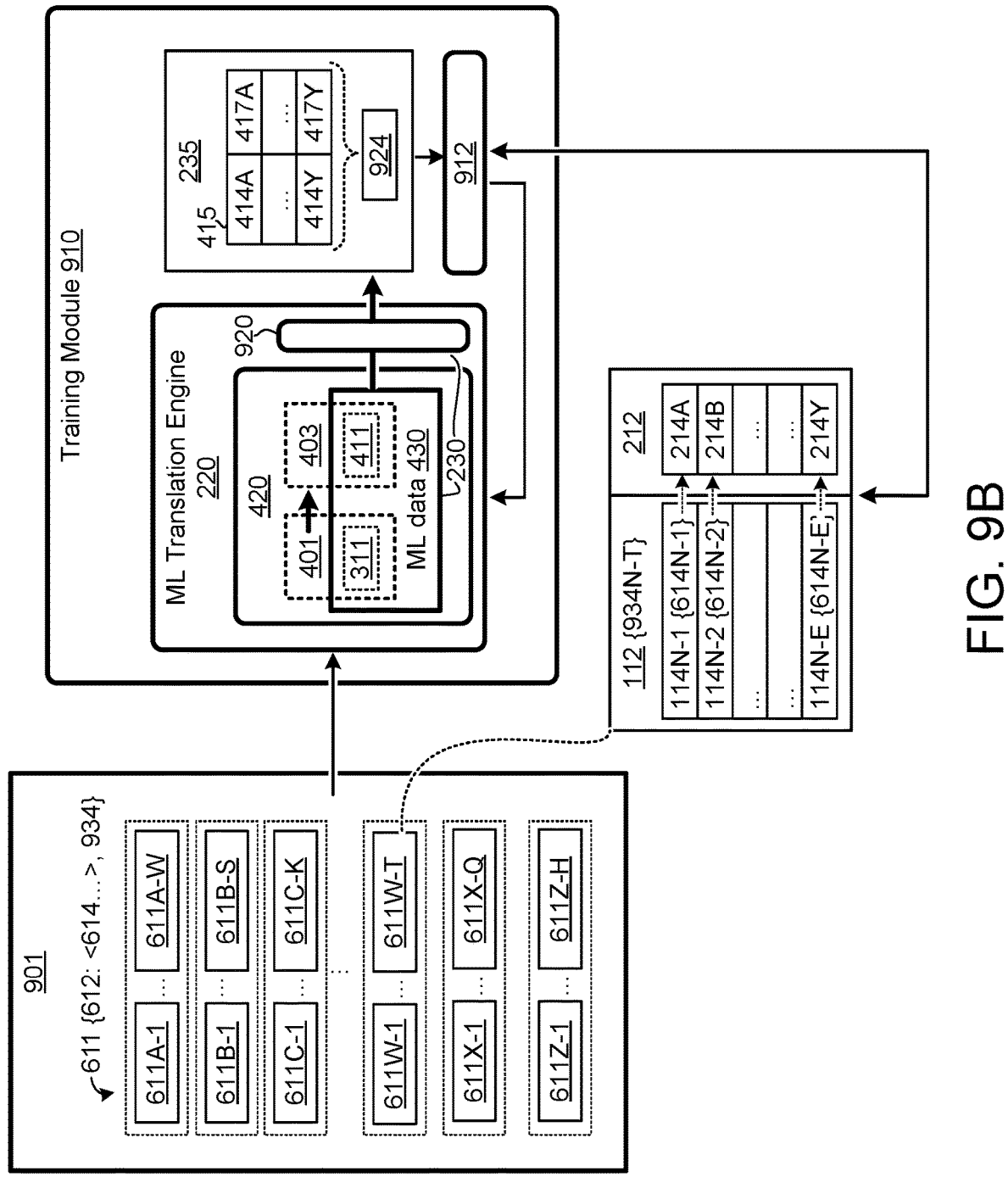
FIG. 9B illustrates another example of a training module.

As illustrated in FIG. 9B, the ML analysis engine 220 may be trained to assign computational CLS 924 to an unknown, stripped binary 111 based on the FCN labels 414 assigned to the binary 111 (e.g., based on FCN labels 414A-Y). The ML analysis engine 220 may be configured to distinguish computational CLS pertaining to any suitable type of computing functionality, paradigm, or motif, including, but not limited to, spectral methods (e.g., Fast Fourier Transform computations), particle methods (e.g., computation of electrostatic forces on N particles), finite element methods, finite difference methods, dense linear algebra, sparse linear algebra, operations on structured grids (e.g., $A_{new}(i,j)=4A(i,j)-A(i-1,j)-A(i+1,j)-A(i,j-1)-A(i,j+1)$ or the like), cryptography, machine learning, simulated annealing, Integer Linear Programming (ILP), Mixed Integer Linear Programming (MILP), and/or the like.

In the FIG. 9A example, the computational CLS language 921 may comprise computational CLS labels 924A-X, each configured to represent a respective computational CLS, including, but not limited to: a "spectral" computational CLS label 924A configured to characterize FCN 114 and/or binaries 111 configured to implement aspects of spectral analysis, a "particle" computational CLS label 924B configured to characterize FCN 114 and/or binaries 111 configured to implement aspects of particle analysis, a "crypto" computational CLS label 924C configured to characterize FCN 114 and/or binaries 111 configured to implement aspects of cryptography, an "MILP" computational CLS label 924W configured to characterize FCN 114 and/or binaries 111 configured to implement aspects of MILP, and so on. In some embodiments, the ML analysis engine 220 may be further configured to identify binaries 111 configured to implement malicious functionality, such as malware, cryptocurrency mining malware, intrusion malware, backdoor software components, computer viruses, and/or the like. Binaries 111 determined to implement malicious functionality may be assigned a "malware" or "malicious" label 924X. In some implementations, the computational CLS language 921 may further comprise an "unknown" computational CLS label 925, which may represent binaries 111 having unknown or uncategorized computational CLS (a computational CLS separate and/or distinct from other computational CLS 924A-X). Alternatively, binaries 111 having an unknown or uncategorized computational CLS may be assigned the "malicious" computational CLS label 924X.

In some embodiments, the ML analysis engine 220 may comprise and/or implement computational CLS rules 920. The computational CLS rules 920 may be configured to map, translate, and/or otherwise associate FCN labels 414 of the FCN CLS language 411 with computational CLS labels 924 of the computational CLS language 921. As illustrated in the FIG. 9A example, the computational CLS rules 920 may be configured to: map FCN labels 414A-1 through 414A-K characteristic of "spectral" computation to the "spectral" computational CLS 924A, map FCN labels 414B-1 through 414B-J characteristic of "particle" computation to the "particle" computational CLS 924B, map FCN labels 414C-1 through 414C-H characteristic of "cryptography" computation to the "crypto" computational CLS 924C, map FCN labels 414W-1 through 414W-F characteristic of "MILP" computation to the "MILP" computational CLS label 924W, map FCN labels 414X-1 through 414X-Q characteristic of "malicious" code to the "malicious" computational CLS label 924X, and so on. The computational CLS rules 920 may be further configured to map FCN labels 414 associated with unknown or unclassified functionality to the "unknown" computational CLS label 924Z. The ML analysis engine 220 may, therefore, be configured to implement a two-state or two-layer translation, comprising a first translation from HR code 212 to FCN labels 414 (from the HR language 311 to the FCN CLS language 411) and a second translation from FCN labels 414 to computational CLS labels 924 (from the FCN CLS language 411 to the computational CLS language 921).

In some implementations, the ML analysis engine 220 may be configured to normalize FCN names 514 (e.g., convert FCN names 514 to FCN labels 414) by use of FCN normalization rules 510. The FCN normalization rules 510 may be configured to map and/or associate FCN names 514 of FCN 114 having compatible semantics to respective FCN labels 414, as disclosed herein. In the FIG. 9A example, FCN names 514A-1 and 514A-2 may have compatible semantics and, as such, the normalization rules 510 may map FCN names 514A-1 and 514A-2 to FCN label 414A-1, FCN names 514A-P and 514A-Q may be mapped to FCN label 414A-K, FCN names 514B-1 and 514B-2 may be mapped to FCN label 414B-1, FCN names 514B-F and 514B-G may be mapped to FCN label 414B-J, FCN names 514C-1 and 514C-M may be mapped to FCN labels 414C-1 and 414C-H, respectively, FCN names 514W-1 and 514W-2 may be mapped to FCN label 414W-1, FCN name 514W-L may be mapped to FCN label 414W-F, FCN names 514X-1 and 514X-2 may be mapped to FCN label 414X-1, FCN name 514X-P may be mapped to FCN label 414X-F, and so on.

FIG. 9B illustrates an example of a training module 910 configured to train the ML analysis engine 220 to translate HR code 212 to computational CLS labels 924 that accurately characterize the functional behavior of the respective binaries 111 (and/or FCN 114 of the respective binaries 111). The training module 910 may comprise and/or be coupled to a dataset 901 comprising a plurality of training binaries 611. The training binaries 611 may comprise semantic data 613, which may include training FCN labels 614, training binary CLS labels 624, and/or the like, as disclosed herein. In the FIG. 9B example, the semantic data 613 may further comprise training computational CLS labels 934, which may identify training binaries 611 (and/or FCN 114 of respective training binaries 611) that are characteristic of specified computational CLS. The training binaries 611 may include, but are not limited to, a) training binaries 611A-1 through 611A-W characteristic of the "spectral" computational CLS 924A, b) training binaries 611B-1 through 611B-S characteristic of the "particle" computational CLS 924B, c) training binaries 611C-1 through 611C-K characteristic of the "crypto" computational CLS 924C, d) training binaries 611W-1 through 611W-T characteristic of the "MILP" computational CLS 924W, and so on. In some embodiments, the dataset 901 may further include training binaries 611 that comprise FCN 114 characteristic of the "malicious" computational CLS 924X and/or the "unknown" computational CLS 925. In the FIG. 9B example, the dataset 901 may include "malicious" training binaries 611X-1 through 611X-Q and "unknown" training binaries 611Z-1 through 611Z-H.

As illustrated in the FIG. 9B example, the semantic data 613 of training binary 611W-T comprises training FCN names 614W-1 through 614W-E corresponding to FCN 114W-1 through 114W-E, respectively. The semantic data 613 of the training binary 611W-T may further comprise a training computational CLS label 934W-T indicating that the training binary 611W-T (and/or binary FCN 114A-E and corresponding FCN names 514W-1 through 514W-E) are characteristic of the "MILP" computational CLS 924W. The training binary 611W-T may comprise other FCN 114 having FCN names 514 that are not characteristic of the "MILP" computational CLS or "MILP" computational CLS 924W (not shown in FIG. 9B to avoid obscuring details of the illustrated examples).

The training module 910 may configure the ML analysis engine 220 to learn and/or refine MLT data 430 of the MLT model 420, as disclosed herein. The training may be based on error(s) between predicted FCN labels 414A-Y and/or computational CLS labels 924 and known training FCN labels 614 and/or training computational CLS 934 determined by the evaluation module 912. In some embodiments, the training module 910 may be further configured to train the ML analysis engine 220 to associate FCN labels 414 (and/or FCN names 514) with computational CLS labels 924 of respective computational CLS. For example, the training module 610 may be configured to train the ML analysis engine 220 to learn computational CLS rules 920 configured to map FCN labels 414 of FCN 114 that are characteristic of respective computational CLS to corresponding computational CLS labels 924. In the FIG. 9A example, the ML analysis engine 220 may comprise computational CLS rules 920 configured to translate FCN labels 414A-1 through 414A-K (and/or FCN names 514A-1 . . . A-Q) characteristic of the "spectral" computational CLS to the "spectral" computational CLS label 924A, translate FCN labels 414B-1 through 414B-J (and/or FCN names 514B-1 . . . B-G) characteristic of the "particle" computational CLS to the "particle" computational CLS label 924B, translate FCN labels 414C-1 through 414C-H (and/or FCN names 514C-1 . . . B-G) characteristic of the "crypto" computational CLS to the "crypto" computational CLS label 924C, translate FCN labels 414W-1 through 414W-L (and/or FCN names 514W-1 through 514W-L) characteristic of the "MILP" computational CLS to the "MILP" computational CLS label 924W, and so on. The computational CLS rules 920 may be further configured to map FCN labels 414 (and/or FCN names 514) that are not associated with a defined computational CLS with the "unknown" computational CLS label 925. The ML data 230, including the MLT data 430A and the computational CLS rules 920, may be stored on a non-transitory storage medium for use in configuring other instances of the ML analysis engine 220. Alternatively, or in addition, the ML data 230, including the MLT data 430A and the computational CLS rules 920, may be incorporated into hardware configured to implement aspects of the ML analysis engine 220, as disclosed herein.

Figure 10A:
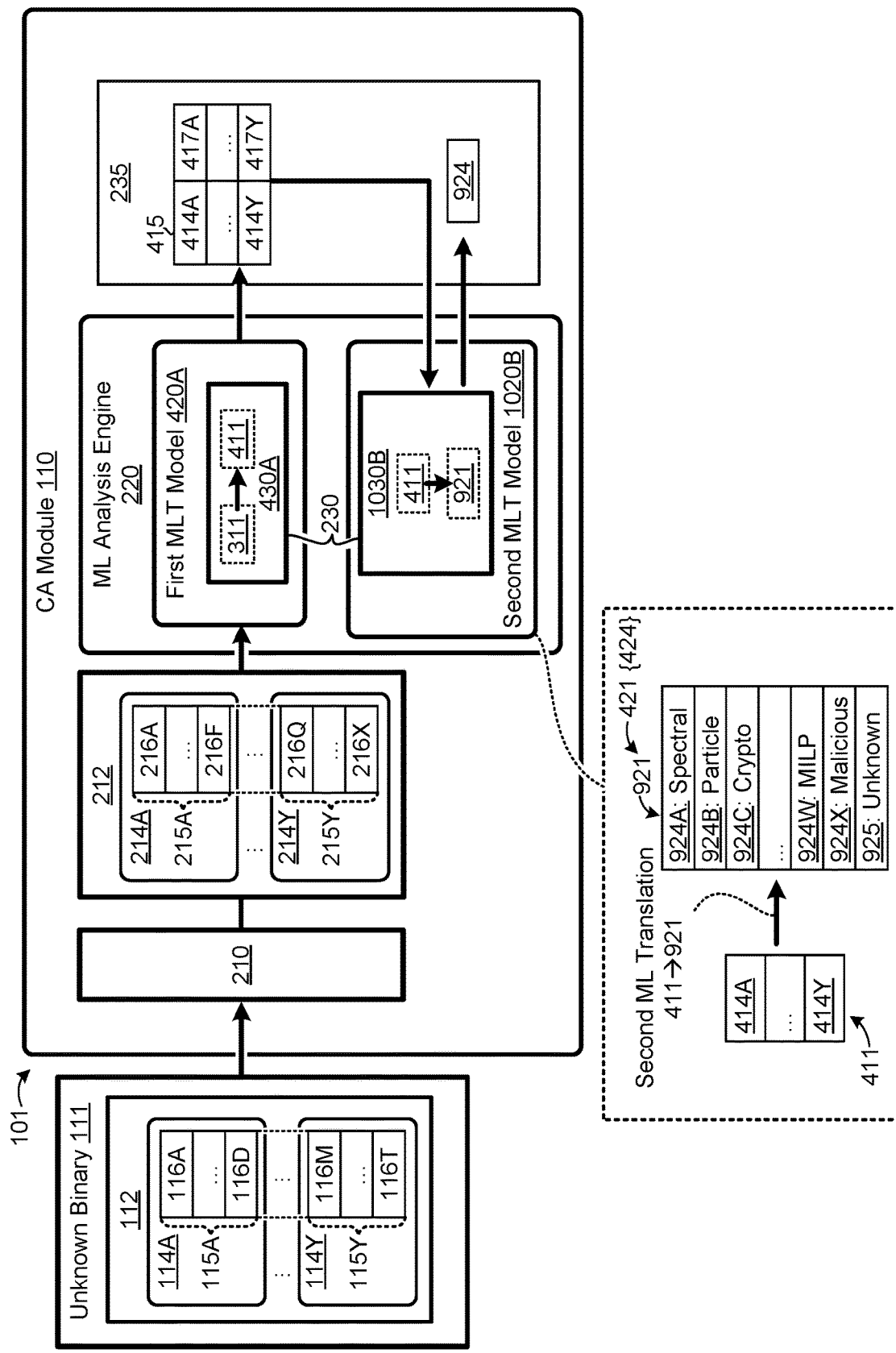
FIG. 10A illustrates an example of a coded analysis module comprising a first machine-learned translation model configured to translate human-readable code derived from unknown, stripped binaries to semantic function labels and a second machine-learned translation model configured to translate semantic function labels to semantic computational class labels.

FIG. 10A illustrates another example of an apparatus 101 configured to implement aspects of binary code analysis, as disclosed herein. In the FIG. 10A embodiment, the ML analysis engine 220 comprises a first MLT model 420A configured to translate HR code 212 to FCN labels 414, as disclosed herein. The ML analysis engine 220 may further comprise a second MLT model 1020B configured to translate FCN labels 414 to computational CLS labels 924 (e.g., translate the FCN CLS language 411 to the binary CLS language 421). In the FIG. 10A embodiment, the second MLT model 1020B may be referred to as a computational CLS MLT model 1020B or the like. The second MLT model 1020B may comprise and/or be configured in accordance with second MLT data 1030B. The second MLT data 1030B may be developed and/or refined in one or more machine-learning procedures, as disclosed herein.

Figure 10B:
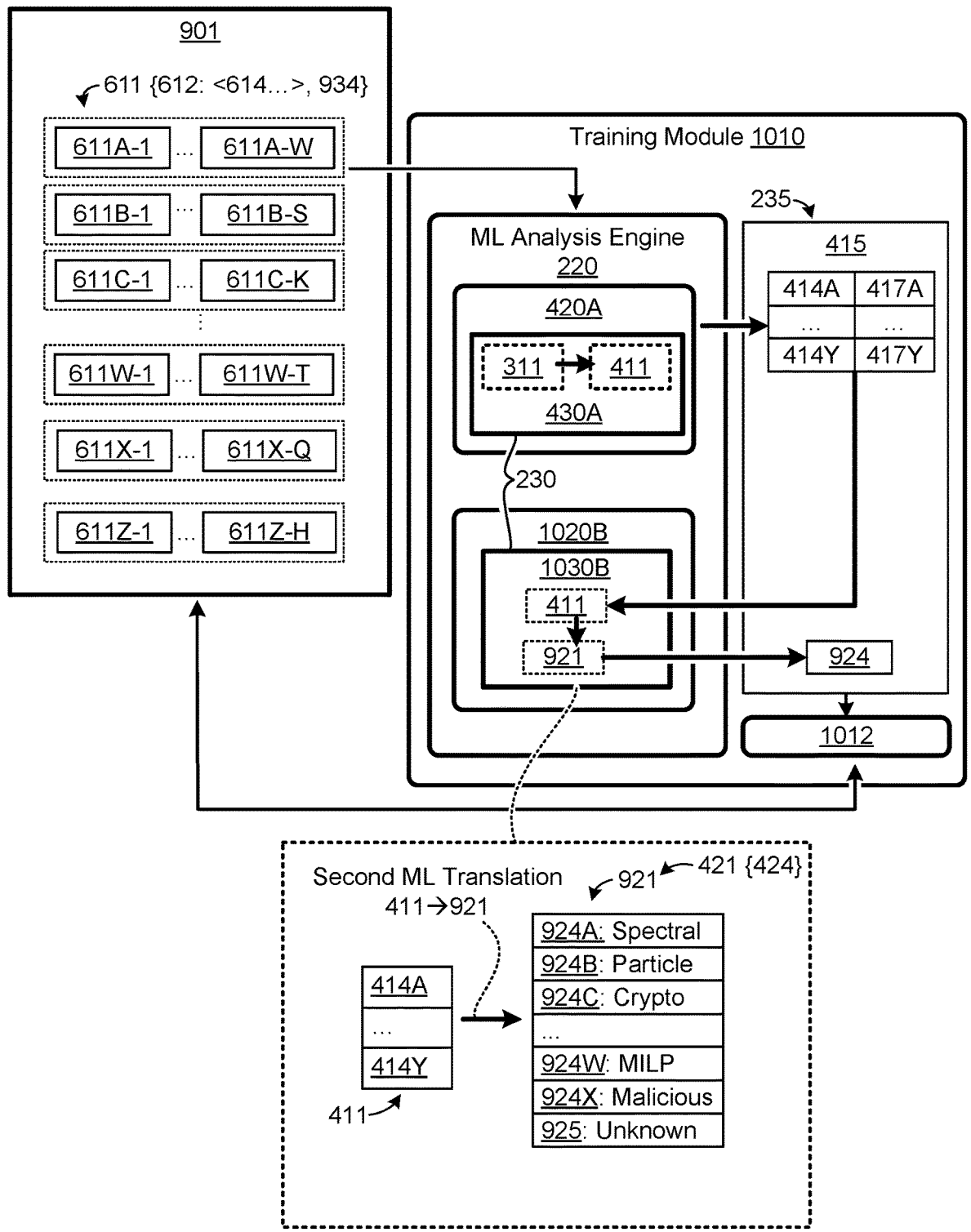
FIG. 10B illustrates another example of a training module.

FIG. 10B illustrates an example of a training module 1010. The training module 1010 may be configured to train the first MLT model 420A to translate HR code 212 to FCN labels 414, as disclosed herein. The training module 1010 may be further configured to train the second MLT model 1020B to translate FCN labels 414 of the FCN CLS language 411 to computational CLS labels 924 of the computational CLS language 921.

The training module 1010 may comprise and/or be coupled to a dataset 901 comprising training binaries 611 characteristic of respective computational CLS labels 924A-N, as disclosed herein. The dataset 901 may further include training binaries 611U-1 through 611U-Q pertaining to computational functionality separate and/or distinct from computational CLS labels 924A through 924X (e.g., "unknown" computational CLS label 925).

The training module 1010 may be configured to implement any suitable machine learning technique or procedure, such as a TVT procedure, training iterations, epochs, and/or the like. The training module 1010 may be configured to jointly train the first MLT model 420A and the second MLT model 1020B. Alternatively, the training module 1010 may be configured to train the first MLT model 420A and the second MLT model 1020B separately and/or independently. In some implementations, the training module 1010 may be configured to implement one or more joint training procedures or iterations and one or more separate training procedures or iterations. The training module 1010 may further comprise and/or be coupled to an evaluation module 1012, which may be configured to quantify error(s) between FCN labels 414 and known training FCN labels 614 and refine the first MLT data 430A (and/or first MLT model 420A) accordingly. The evaluation module 1012 may be further configured to quantify error(s) between computational CLS labels 924 and known training computational CLS labels 934 and refine the second MLT data 1030B (and/or second MLT model 1020B) accordingly.

Implementing a joint training iteration on the training binary 611N-1 may comprise: a) deriving HR code 212 from EX code 112 of the training binary 611N-1, b) causing the first MLT model 420A to translate the HR code 212 to a semantic FCN sequence 415 (e.g., a sequence of semantic FCN labels 414A through 414Y), c) causing the second MLT model 1020B to translate the semantic FCN sequence 415 to a computational CLS label 924, d) determining first error metrics quantifying error(s) between FCN labels 414A through 414Y predicted by the first MLT model 420A and corresponding training FCN labels 614W-1 through 614W-E) determining second error metrics quantifying error(s) between the computational CLS label 924 predicted by the second MLT model 1020B and the training computational CLS label 934W-T, d) refine the first MLT model 420A (and/or first MLT data 430A) per the first error metrics, and e) refine the second MLT model 1020B (and/or second MLT data 1030B) per the second error metrics.

The ML data 230, including the MLT data 430A and the second MLT data 1030B, may be stored on a non-transitory storage medium for use in configuring other instances of the ML analysis engine 220. Alternatively, or in addition, the ML data 230 may be incorporated into hardware configured to implement aspects of the ML analysis engine 220, as disclosed herein.

Figure 11A:
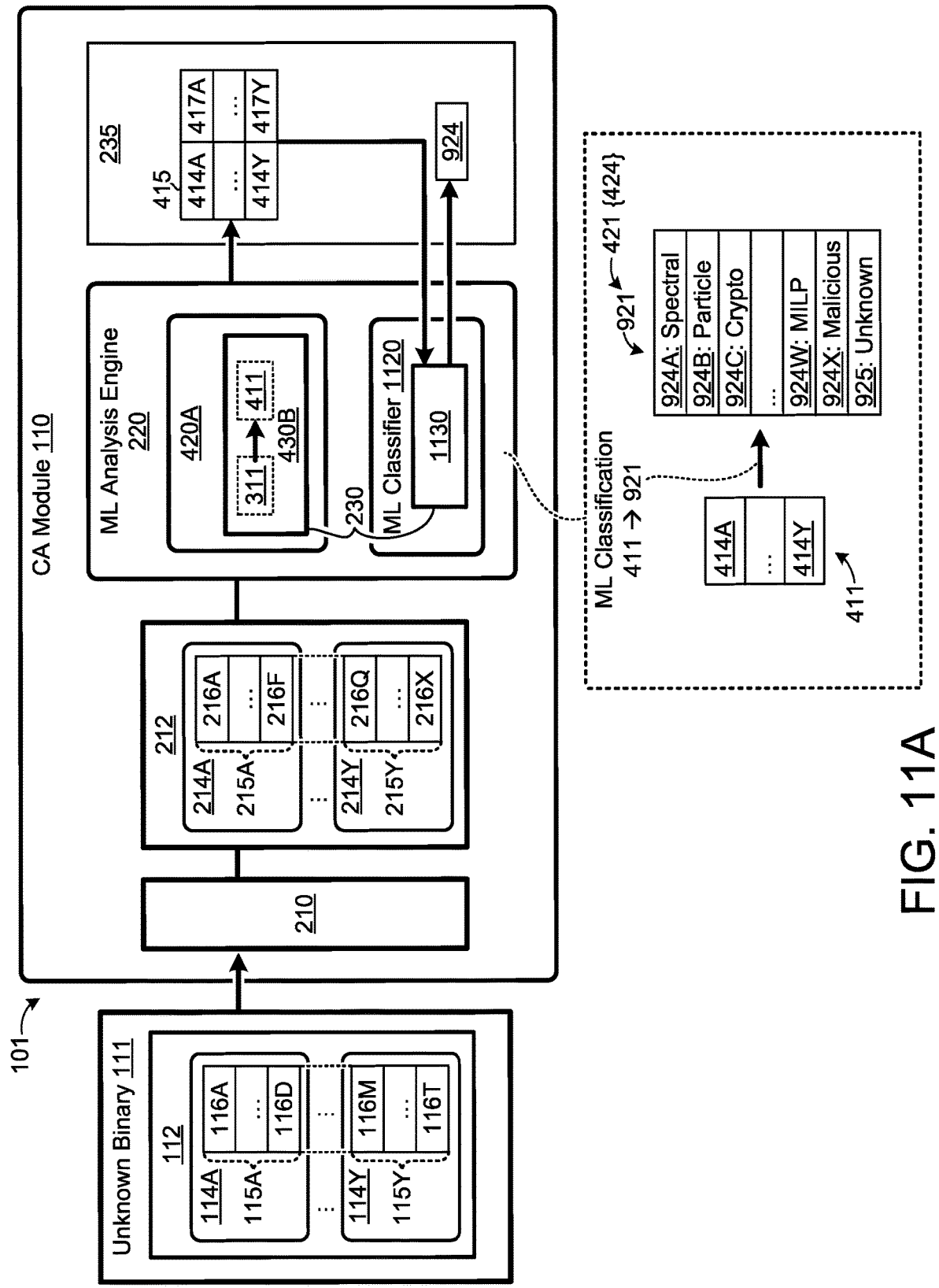
FIG. 11A illustrates an example of a code analysis module comprising a first machine-learned translation model configured to translate human-readable code derived from unknown, stripped binaries to semantic function labels and a machine-learned classifier configured to assign computational class labels to the unknown, stripped binaries based on the semantic function labels.

FIG. 11A illustrates another of an apparatus 101 configured to implement aspects of a CA module 110 and/or binary code analysis, as disclosed herein. In the FIG. 11A embodiment, the ML analysis engine 220 may comprise a first MLT model 420A and an ML classifier 1120. The MLT model 420A may comprise MLT data 430A adapted to configure the MLT model 420 to translate HR code 212 to FCN labels 414, as disclosed herein (translate the HR language 311 to the FCN CLS language 411).

The ML classifier 1120 may be configured to assign computational CLS labels 924 to binaries 111 based on the FCN labels 414 determined for the binaries 111. The ML classifier 1120 may implement any suitable ML classification algorithm or architecture, as disclosed herein. The ML data 230 of the ML analysis engine 220 may comprise MLC data 1130. The MLC data 1130 may configure the ML classifier 1120 to assign computational CLS labels 924 to sequences of FCN labels 424 that are characteristic of the functional behavior associated with the respective computational CLS labels 924. The MLC data 1130 may be developed and/or refined in one or more machine-learning training processes, as disclosed in further detail herein.

Figure 11B:
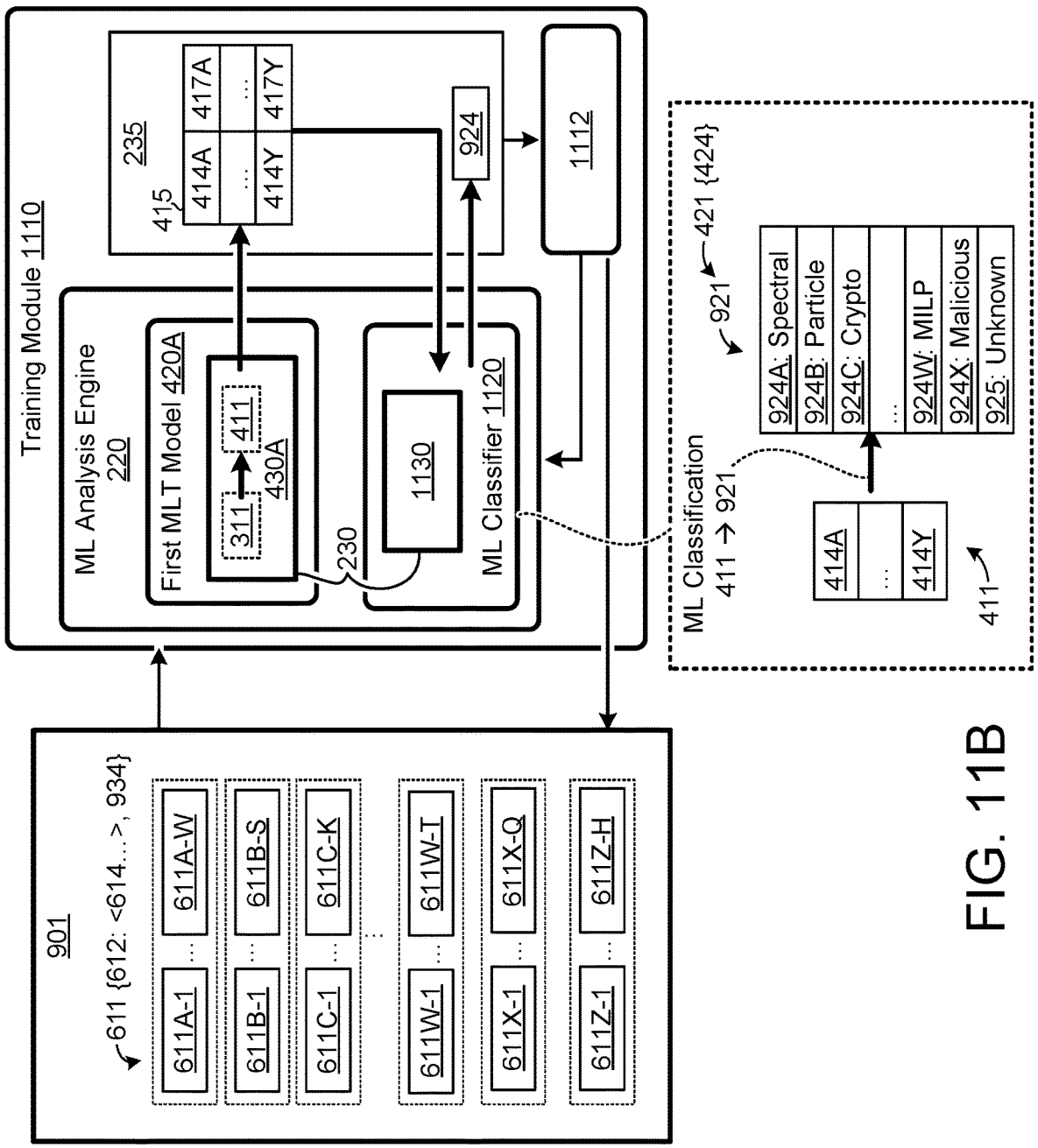
FIG. 11B illustrates another example of a training module.

FIG. 11B illustrates another example of a training module 1110. The training module 1110 may comprise and/or be coupled to a dataset 901 comprising training binaries 111, as disclosed herein. The training module 1110 may be configured to train the MLT model 420A to translate training labels 614 of the training binaries 111 to FCN labels 414, as disclosed herein. In the FIG. 11B embodiment, the training module 1110 may be further configured to train the ML classifier 1120 to assign computational CLS labels 924 to binaries 111 based on the FCN labels 414 determined for the binaries 111. The training module 1110 may be configured to implement any suitable machine-learning training procedure, as disclosed herein.

In some implementations, training module 1110 may be configured to implement joint training iterations. A joint training iteration may comprise translating HR code 212 to a sequence of FCN labels 414 by use of the first MLT model 420A, assigning a computational CLS label 924 to the FCN labels 414 by use of the ML classifier 1120, refining the first MLT model 420A (and/or first MLT data 430A) based on error(s) between the FCN labels 414 and training FCN labels 614 of the training binary 611 by use of an evaluation module 1112, refining the ML classifier 1120 (and/or MLC data 1130) based on error(s) between the computational CLS label 924 and training computational CLS label 934 of the training binary 611, and so on. Alternatively, or in addition, the first MLT model 420A and the ML classifier 1120 may be trained in separate, independent training iterations or processes. The resulting ML data 230, including the MLT data 430A and the MLC data 1130, may be stored on a non-transitory storage medium for use in configuring other instances of the ML analysis engine 220. Alternatively, or in addition, the ML data 230 may be incorporated into hardware configured to implement aspects of the ML analysis engine 220, as disclosed herein.

Referring back to FIG. 2, Referring back to FIG. 2, the CA module 110 may be configured to receive an unknown, stripped binary 111 for execution on the HPC 105. In response, the CA module 110 may a) generate HR code 212 for the binary 111, b) translate the HR code 212 into semantic labels (e.g., FCN labels 414), and c) assign a binary CLS label 424 to the binary 111 based, at least in part, on the FCN labels 414. The binary CLS label 424 may be configured to characterize a computational CLS of the binary 111. The binary CLS label 424 may, for example, comprise a computational CLS label 924, as disclosed herein. In some implementations, the computational CLS label 924 may be assigned based on computational CLS rules 920 (e.g., as illustrated in FIGS. 9A and/or 9B).

In some embodiments, the computational CLS label 924 may be assigned based on a translation between the FCN labels 414 determined for the binary 111 and a computational CLS label 924. The translation may be determined by a second MLT model 420A configured to translate FCN labels 414 of an FCN CLS language 411 to computational CLS labels 924 of a computational CLS language 921, as disclosed herein (e.g., as illustrated in FIGS. 10A and/or 10B). Alternatively, or in addition, the computational CLS label 924 may be assigned by an ML classifier 1120. The ML classifier 1120 may be configured to assign computational labels 924 to binaries 111 based on the semantic FCN labels 414 determined for the binaries 111 per MLC data 1130, as disclosed herein (e.g., as illustrated in FIGS. 11A and/or 11B).

The policy logic 240 of the CA module 110 may be configured to determine and/or implement one or more actions 245 pertaining to the binary 111 based, at least in part, on the CLS data 235 determined for the binary 111. The policy logic 240 may comprise rules for determining and/or implementing actions 245 pertaining to binaries 111 based, at least in part, on the computational CLS 924 assigned to the binaries 111. The policy logic 240 may determine whether execution of a binary 111 is "blocked" or "authorized" based on the computational CLS 924 of the binary 111. The policy logic 240 may determine and/or implement actions 245 pertaining to "blocked" binaries 111, as disclosed herein. For example, the actions 245 for "blocked" binaries 111 may be the same or similar to the actions 245 determined and/or implemented for "malware" binaries 111 and the actions 245 for "authorized" binaries 111 may be same or similar to the actions 425 determined and/or implemented for "clean" binaries 111, as disclosed herein.

As illustrated above, the CA module 110 may determine whether the binary 111 is configured to implement unauthorized functionality through static analysis. More specifically, the CA module 110 may detect unauthorized functionality in binaries 111, such as malware 135, prior to execution (or emulated execution) of the binaries 111.

Figure 12A:
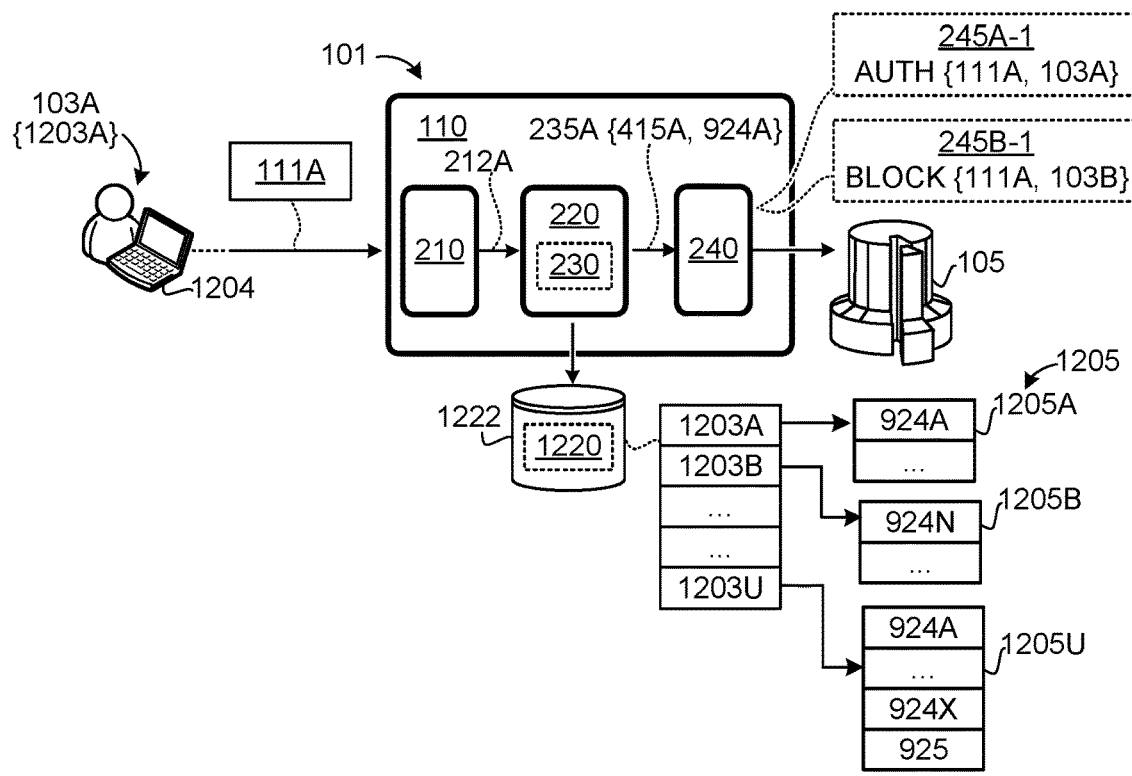
FIGS. 12A-C illustrate examples of devices configured to control execution of binaries based on computational classifications of the binaries.

FIG. 12A illustrates another example of an apparatus 101 configured to implement aspects of binary code analysis, as disclosed herein. The apparatus 101 may comprise a CA module 110. The CA module 110 may be implemented on and/or embodied by one or more hardware component(s) 104 (e.g., as illustrated in FIG. 1), the HPC 105, a user or client computing device, computer-readable instructions stored on a non-transitory storage medium, and/or the like.

As disclosed herein, one or more users 103 may be authorized to execute binaries 111 on the HPC 105. In the FIG. 12A example, the users 103 may be authorized to execute binaries 111 in specified computational CLS 924. The authorized computational CLS 924 of respective users 103 may be specified by any suitable means, including, but not limited to, a list, a table, an access control list (ACL), an execution control list (ECL), and/or the like. In some implementations, user identifiers (UID) 1203 may comprise and/or be associated with user metadata (UMD) 1205, which may be configured to indicate computational CLS 924 (if any) users 103 are authorized to execute on the HPC 105. The UMD 1205 may be maintained in a datastore 1222, such as a directory, user directory, user store, database, non-transitory computer-readable storage medium, and/or the like.

In the FIG. 12A example, UDM 1205A may authorize user 103A (UID 1203A) to execute binaries 111 in the "spectral" computational CLS 924A. The user 103A may not, however, be authorized to execute binaries 111 in other computational CLS 924B-X. Other users 103 may be assigned UMD 1205 granting different execution privileges. For example, UMD 1205B may authorize user 103B (UID 1203B) to execute binaries 111 in the "MILP" computational CLS 924W, UMD 1205U may authorize user 103U (UID 1203U) to execute binaries 111 in any of the computational CLS 924A through 924X, and so on. The UMD 1205U may be further configured to authorize execution of binaries 111 assigned the "unknown" computational CLS label 925. Alternatively, in some embodiments, the policy logic 240 may be configured to block execution of binaries 111 assigned the "malicious" and/or "unknown" computational CLS labels 924X and/or 925 regardless of the UMD 1205 of the user 103.

The CA module 110 may be configured to determine whether to permit execution of binaries 111 submitted by respective users 103 based on a) the computational CLS 924 predicted for the binaries 111 by the CA module 110, and b) the UMD 1205 of the respective users 103. In the FIG. 12A example, the CA module 110 may receive a binary 111A for execution. The binary 111A may be associated with the user 103A (e.g., may be submitted by the user 103A through a computing device 1204, such as an access node, client computer, or the like. In response to receiving the binary 111A, the CA module 110 may be configured to: a) generate HR code 212A from the binary 111A, b) translate the HR code 212A of the binary 111A into CLS data 235A, and c) determining whether to permit execution of the binary 111A by the user 103A based on the CLS data 235A and the UMD 1205A of the user 103A.

The HR code 212A may be produced by a code generator 210 of the CA module 110, as disclosed herein (e.g., by disassembling, decompiling, converting, normalizing, and/or otherwise deriving the HR code 212A from EX code 112 of the binary 111A). The HR code 212A may comprise one or more HR FCN 214, each HR FCN 214 comprising an HR code segment 215 derived from the EX code segment 115 of a respective binary FCN 114 of the binary 111A.

The ML analysis engine 220 of the CA module 110 may be configured translate the HR code 212A into the CLS data 235A in accordance with ML data 230, as disclosed herein. The ML analysis engine 220 may be configured to translate the binary 111A into a semantic FCN sequence 415A comprising semantic FCN labels 414, each FCN label 414 comprising semantics of a respective FCN 114 of the binary 111A. The semantic FCN sequence 415A may be produced by an MLT model 420 in accordance with MLT data 430 (or a first MLT model 420A in accordance with first MLT data 430A); the HR code segment 215 of each HR FCN 214 of the HR code 212A may be translated to a respective FCN label 414 of the semantic FCN sequence 415A (each FCN label 414 comprising semantic information pertaining to a respective binary FCN 114 of the binary 111A).

The ML analysis engine 220 may be further configured to translate the binary 111A to a computational CLS language 921 (e.g., translate the semantic FCN sequence 415A of the binary 111A to a computational CLS label 924). As disclosed herein, the ML analysis engine 220 may be configured to translate the binary 111A to the computational CLS language 921 by one or more of: applying computational CLS rules 920 to the semantic FCN sequence 415A of the binary 111A (e.g., as illustrated in FIGS. 9A and/or 9B), translating the semantic FCN sequence 415A to the computational CLS language 921 by use of a second MLT model 1020B configured per second MLT data 1030B (e.g., as illustrated in FIGS. 10A and/or 10B), classifying the semantic FCN sequence 415A by use of a ML classifier 1120 configured per MLC data 1130 (e.g., as illustrated in FIGS. 11A and/or 11B), and/or the like. In the FIG. 12A example, the binary 111A is translated to the "spectral" computational CLS 924A.

The policy logic 240 may determine whether to permit execution of the binary 111A based on the computational CLS 924A and the UMD 1205A of the user 103A. In the FIG. 12A example, the UMD 1205A authorizes the user 103A to execute binaries 111 in the "spectral" computational CLS 924A and, as such, the policy logic 240 may determine that execution of the binary 111A by the user 103A is authorized. In response, the policy logic 240 may implement one or more AUTH actions 245A-1 {111A, 103A}, as disclosed herein.

Authorization to execute the binary 111A by respective users 103 may be based, at least in part, on the UMD 1205 of the respective users 103. In the FIG. 12A example, the user 103B may submit the binary 111A for execution on the HPC 105. However, since the UMD 1205B of the user 103B does not authorize execution of binaries 111 in the "spectral" computational CLS 924A, the policy logic 240 may block execution of the binary 111A by the user 103B, e.g., the policy logic 240 may implement one or more BLOCK actions 245B-1 {111A, 103B} in response to submission of the binary 111A by user 103B, as disclosed herein.

Figure 12B:
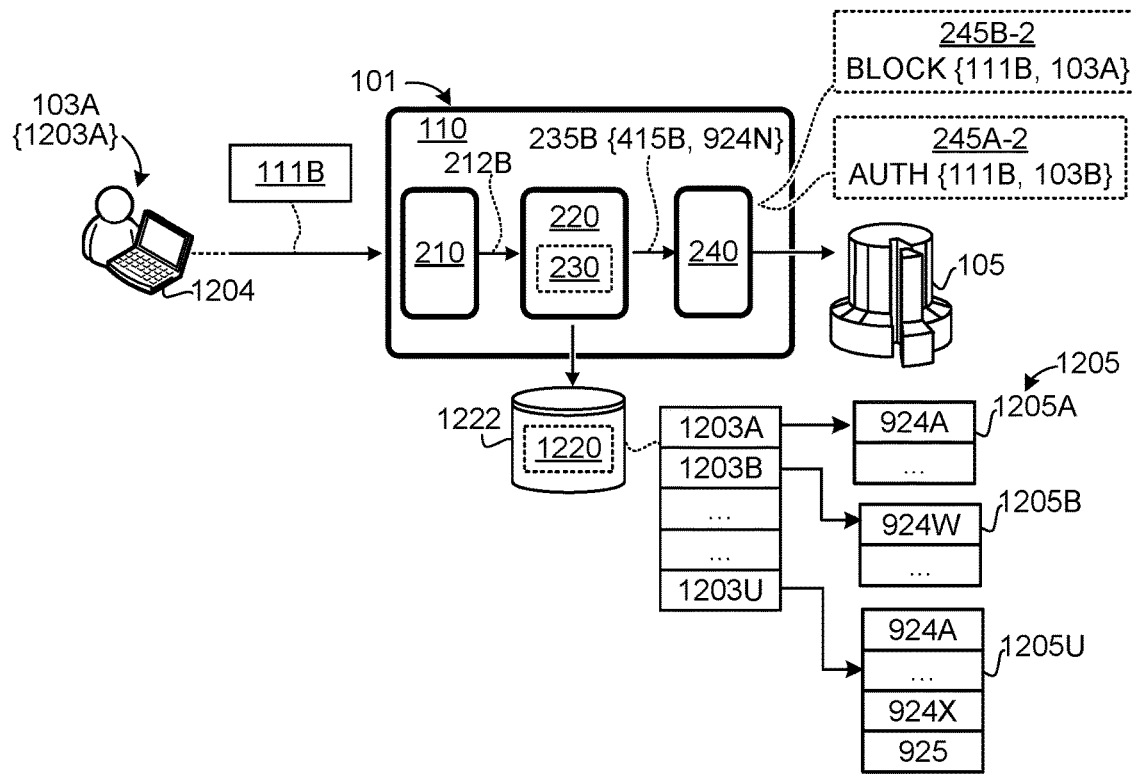

FIG. 12B illustrates another example of an apparatus 101 configured to implement aspects of binary code analysis. In the FIG. 12B example, the user 103A submits a different binary 111B for execution on the HPC 105. In response, the CA module 110 may translate the binary 111B to the "particle" computational CLS 924B, as disclosed herein (per CLS data 235A and semantic FCN sequence 415B). Since the UMD 1205A does not authorize execution of binaries 111 in the "MILP" computational CLS 924W, the policy logic 240 may block execution of the binary 111B by the user 103A, the policy logic 240 may implement one or more BLOCK actions 245B-2 in response to submission of the binary 111B by the user 103A. By contrast, the policy logic 240 may authorize execution of the same binary 111B by user 103B or 103U since the UMD 1205B and 1205U authorizes the users 103B and 103U to execute binaries 111 in the "MILP" computational CLS 924W, e.g., the policy logic 240 may implement one or more AUTH actions 245A-2 {111B, 103B} in response to submission of the binary 111B for execution by user 103B.

Figure 12C:
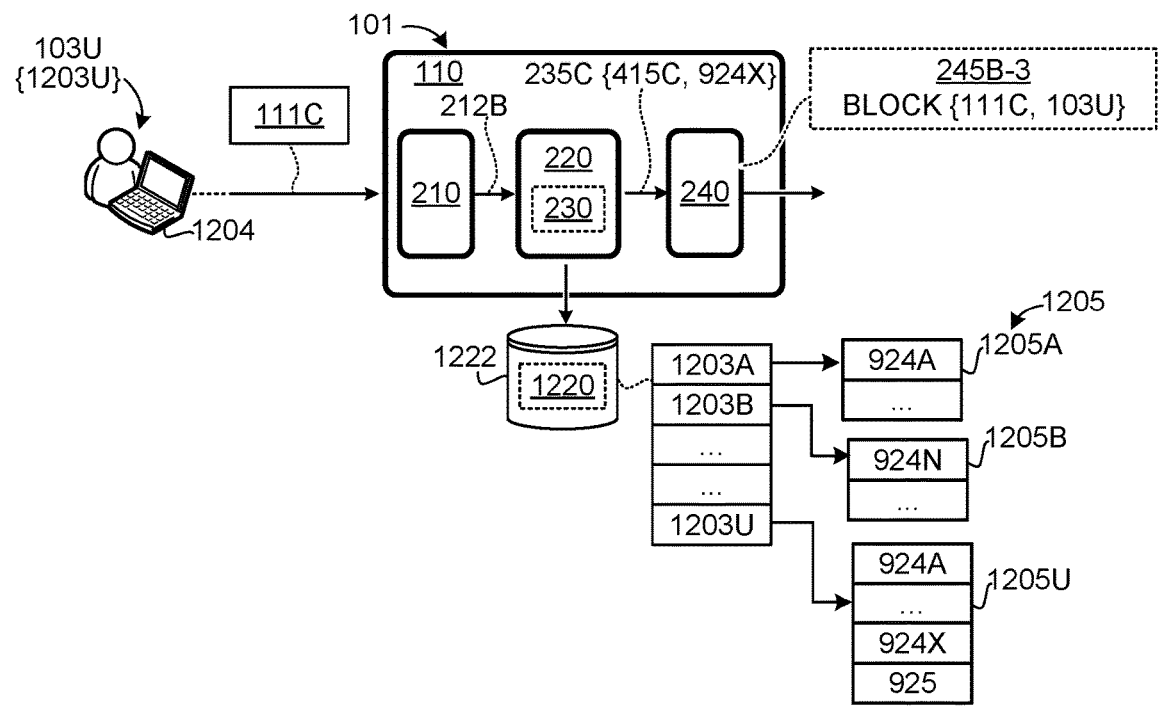

FIG. 12C illustrates another example of an apparatus 101 configured to implement aspects of binary code analysis, as disclosed herein. In the FIG. 12C example, the CA module 110 may receive a binary 111C from user 103U (UID 1203U). In response, the CA module 110 may translate the binary 111C to CLS data 235C. The CLS data 235C may comprise a semantic FCN sequence 415C, which may be translated to the "malicious" computational CLS label 924X. In some embodiments, the policy logic 240 may block execution of the binary 111C regardless of the UMD 1205U of the user 103U, e.g., may implement one or more BLOCK actions 245B-3 {111C, 103U} even through the UMD 1205U authorizes execution of "malicious" binaries 111 by the user 103U.

Figure 13:
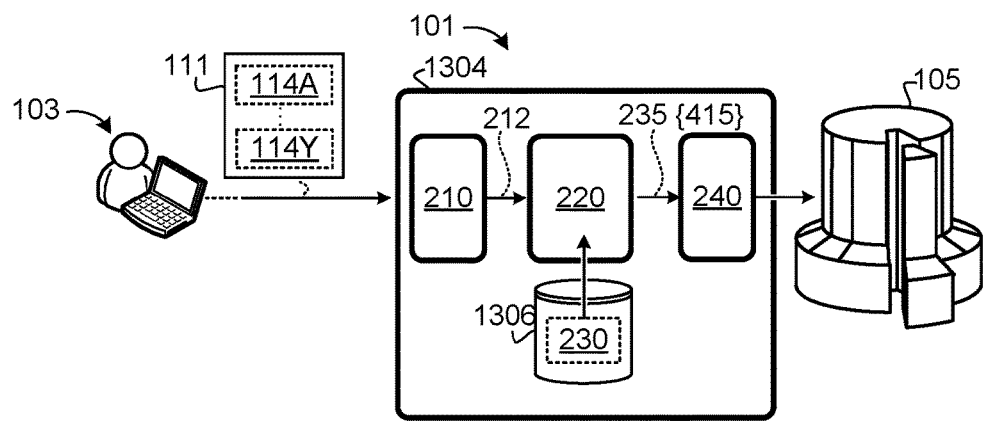
FIGS. 13-14C illustrate further examples of devices configured to implement aspects of binary code analysis.

FIG. 13 illustrates another example of an apparatus 101 configured to implement aspects of binary code analysis, as disclosed herein. The apparatus 101 may comprise and/or be implemented on an access node 1304 of the HPC 105. The access node 1304 may be configured to receive binaries 111 for execution on the HPC 105. The access node 1304 may comprise a code generator 210, ML analysis engine 220, and policy logic 240. In response to receiving an unknown binary 111 for execution on the HPC 105 (e.g., a stripped binary 111), the code generator 210 may be configured to disassemble the binary 111 into HR code 215, the ML analysis engine 220 may be configured to translate the HR code 215 into CLS data 235, and the policy logic 240 may be configured to determine and/or implement one or more actions 245 pertaining to the binary 111 based on the CLS data 235, such as one or more AUTH actions 245A, BLOCK actions 245B, or the like, as disclosed herein.

The CLS data 235 may comprise a semantic FCN sequence 415. The semantic FCN sequence 415 may be determined by a first translation of the binary 111 from an HR language 311 to a FCN CLS language 411. The first translation may be implemented by an MLT model 420 configured in accordance with MLT data 430 (and/or a first MLT model 420A configured in accordance with first MLT data 430A), as disclosed herein. The first translation of the binary 111 may comprise a series of semantic FCN labels 415A-Y, each FCN label 415A-Y configured to characterize the functional behavior of a respective FCN 114A-Y of the binary 111.

In some implementations, the policy logic 240 may determine whether to permit execution of the binary 111 based on the FCN labels 114A-Y of the semantic FCN sequence 415. The policy logic 240 may block execution of the binary 111 in response to determining that one or more of the FCN labels 114A-Y is associated with malware 135 (e.g., in response to translating the binary 111 and/or corresponding HR code 212 to an FCN label 214 associated with malware 135).

In some embodiments, the policy logic 240 may determine whether to permit execution of the binary 111 based on a binary CLS label 424 assigned to the binary 111 (e.g., based on a second translation of the binary 111 from the FCN CLS language 411 to the binary CLS language 421). The ML analysis engine 220 may translate the binary 111 to a binary CLS label 424 by one or more of a) binary CLS rules 520 (e.g., as illustrated in FIGS. 5 and/or 6), b) a second MLT model 420B configured per second MLT data 1030B (e.g., as illustrated in FIGS. 7A and/or 7B), c) an ML classifier 820 configured per MLC data 830 (e.g., as illustrated in FIGS. 8A and/or 8B), and/or the like. The policy logic 240 may be configured to block execution of the binary 111 in response to translating the binary 111 to a "malware" binary CLS label 424A (and may authorize execution of the binary 111 otherwise). Alternatively, the policy logic 240 may be configured to authorize execution of the binary 111 in response to translating the binary 111 to a "clean" binary CLS label 424B (and may block execution of the binary 111 otherwise.

In some embodiments, the policy logic 240 may determine whether to permit execution of the binary 111 based on a computational CLS label 424 assigned to the binary 111 and/or UMD 1205 of a user 103 associated with the binary, as disclosed herein. The ML analysis module 220 may be configured to translate the binary 111 to a computational CLS label 924 (e.g., implement a second translation from the FCN CLS language 411 to the computational CLS language 921). The binary 111 may be translated to a computational CLS label 924 by one or more of: a) computational CLS rules 920 (e.g., as illustrated in FIGS. 9A and/or 9B), b) by a second MLT model 1020B configured per second MLT data 1030B (e.g., as illustrated in FIGS. 10A and/or 10B), by an ML classifier 1120 configured per MLC data 1130 (e.g., as illustrated in FIGS. 11A and/or 11B), and/or the like. The policy logic 240 may determine whether to block execution of the binary 111 (e.g., implement one or more AUTH actions 245A or BLOCK actions 245B) based on the computational CLS 924 of the binary 111 and UMD of the user 103 associated with the binary 111, as disclosed herein (e.g., as illustrated in FIGS. 12A, 12B, and/or 12C).

As illustrated in FIG. 13, the ML analysis engine 220 may comprise and/or be coupled to ML data 230. The ML data 230 may be developed and/or refined in a previously implemented machine learning process, as disclosed herein. The ML data 230 may be maintained on non-transitory storage 1306 of the access node 1304. The ML data 230 may comprise one or more of: normalization rules 510, binary CLS rules 520, MLT data 430, MLC data 830, first MLT data 430A, computational CLS rules 920, second MLT data 1030B, MLC data 1130, and/or the like. In some implementations, aspects of the ML data 230 may be incorporated into hardware of the access node 1304, such as logic and/or circuitry configured to implement aspects of the ML analysis module 220.

Figure 14A:
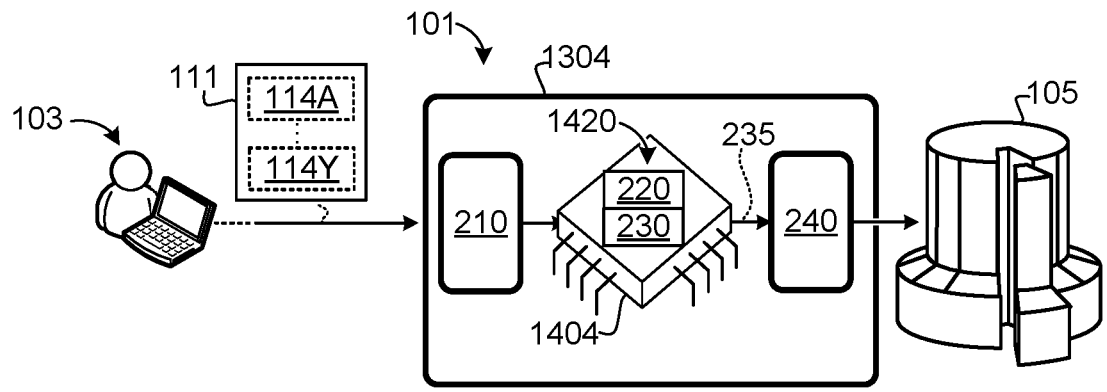

FIG. 14A illustrates another example of an apparatus 101 configured to implement aspects of binary code analysis. The apparatus 101 may comprise an access node 1404, as disclosed herein. In the FIG. 14A embodiment, aspects of the ML analysis engine 220 may be implemented on and/or within hardware 1404. In other words, the hardware 1404 may comprise, implement, and/or embody a hardware ML (HW ML) analysis engine 1420. The hardware 1404 may include, but is not limited to, circuitry, logic, digital logic, logic circuitry, programmable logic, programmable logic circuitry, an IC, an ASIC, an FPGA, a chip, a board, a PCB, and/or the like. The HW ML analysis engine 1420 may comprise and/or be coupled to ML data 230, as disclosed herein. The ML data 230 may be incorporated into the hardware 1404 of the HW ML analysis engine 1420.

The HW ML analysis engine 1420 may comprise one or more of: normalization rules 510, binary CLS rules 520, an MLT model 420, MLT data 430, a first MLT model 420A, first MLT data 430A, a second MLT model 420B, second MLT data 430B, an ML classifier 820, MLC data 830, computational CLS rules 920, a second MLT model 1020B, second MLT data 1030B, an ML classifier 1120, MLC data 1130, and/or the like.

In response to receiving an unknown and/or stripped binary 111, the code generator 210 may derive HR code 212 from the binary, the HW ML analysis engine 1420 may determine CLS data 235 for the binary 111, and the policy logic 240 may determine whether to permit the binary 111 to proceed to execution on the HPC 105 based on the determined CLS data 235 (e.g., implement one or more actions 245 pertaining to the binary 111), as disclosed herein.

Figure 14B:
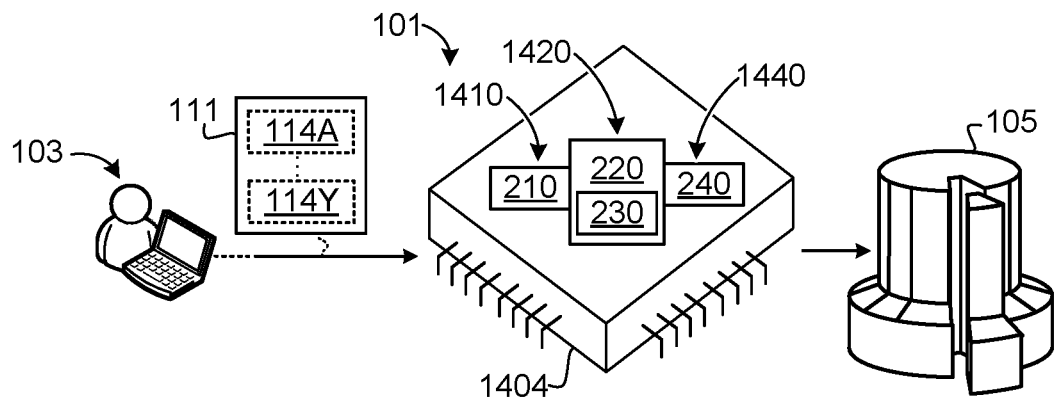

As illustrated in FIG. 14A, aspects of the code generator 210 and/or policy logic 240 may be implemented on computing resources of the access node 1304. For example, aspects of the code generator 210 and/or policy logic 240 may be implemented by computer-readable instructions stored on a non-transitory storage medium. The disclosure is not limited in this regard, however. As illustrated in FIG. 14B, aspects of the code generator 210 and/or policy logic 240 may be implemented in hardware. For example, the hardware 1404 may comprise, implement, and/or embody a hardware (HW) code generator 1410, which may be configured to implement aspects of a code generator 210, as disclosed herein, and/or hardware (HW) policy logic 240, which may be configured to implement aspects of the policy logic 240, as disclosed herein.

Figure 14C:
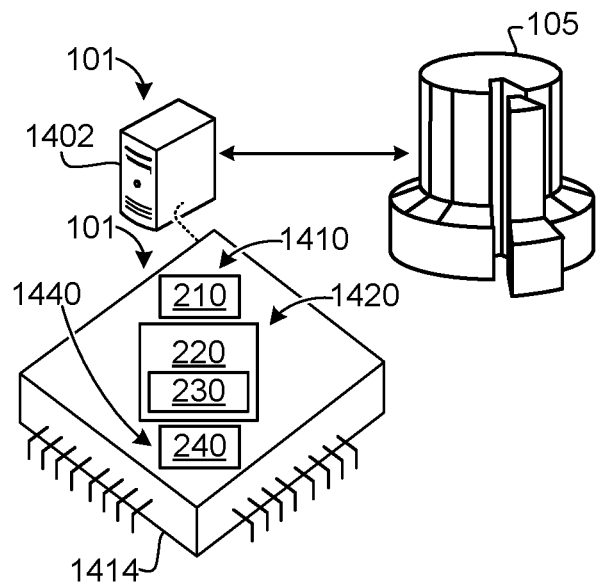

FIG. 14C illustrates another example of an apparatus 101 configured to implement aspects of binary code analysis. In the FIG. 14C embodiment, a HW code generator 1410, HW ML analysis engine 1420, and/or HW policy logic 1440 may be implemented on and/or within a hardware (HW) component 1414. The HW component 1414 may be incorporated and/or embedded within a computing device 1402. The HW component 1414 may comprise a chip, board, PCD, expansion board, peripheral device, such as a USB device 104D, an interface or expansion card 104E, or the like. In some implementations, the HW component 1414 may be embedded and/or coupled to one or more of an FSB, back-side bus, host bridge, Northbridge, Southbridge, system bus, AGP channel, I/O controller, I/O bus, PCI bus, PCIe bus, serial ATA bus, USB controller, IEEE 1394 bus, network interface, and/or other infrastructure of the computing device 1402.

The hardware 1414 may be configured to evaluate binaries 111 prior to execution on the HPC 105, which may comprise blocking execution of selected binaries 111 as disclosed herein.

Figure 15:
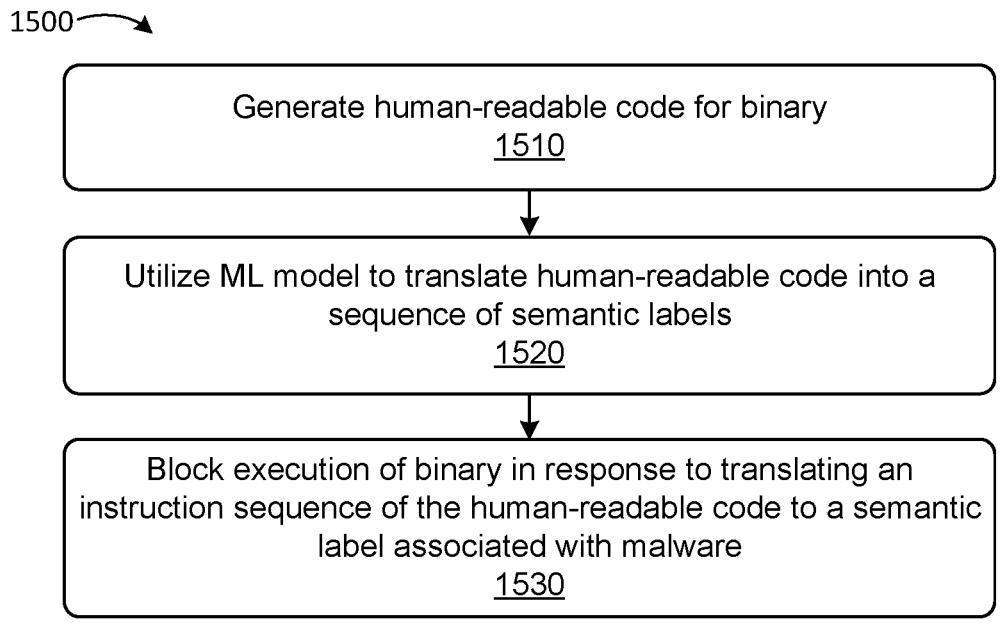
FIGS. 15-18 are flow diagrams illustrating examples of methods for binary code analysis.

FIG. 15 is a flow diagram illustrating an example of a method 1500 for binary code analysis. Step 1510 may comprise generating HR code 215 for a binary 111. The binary 111 may have unknown functional behavior. The binary 111 may be stripped of semantic information, such as debug symbols and/or the like (e.g., the binary 111 may comprise an unknown, stripped binary 111). Step 1510, and other steps of the method 1500, may be comprise static analysis operations, which may be completed prior to execution (or emulated execution) of the binary 111.

In some implementations, step 1510 may comprise disassembling the binary 111 into a higher-level programming language, such as ASM code, intermediate code, source code, an AST, an ASG, and/or the like. The HR code 215 may correspond to an HR language 311 configured to exhibit properties that are similar to and/or are compatible with natural language corpora. The HR language 311 may be configured to be compatible with ML techniques, such as deep-learning, NLP, DNN, RNN, vocabulary-based ML translation architectures, ML transformer architectures, and/or the like.

Step 1520 may comprise utilizing an ML model to translate the HR code 212 into a sequence of semantic labels (e.g., a semantic FCN sequence 415). Step 1520 may comprise translating HR code segments 215 into respective FCN labels 414, each HR code segment 215 comprising HR instructions 216 derived from an EX code segment 115 of a respective FCN 114 of the binary 111. For example, the binary 111 may comprise YFCN 114 and the semantic FCN sequence 415 may comprise YFCN labels 414, each FCN label 414A through 414Y configured to characterize a functional behavior of a respective one of the FCN 114A through 114Y of the binary 111. In some embodiments, step 1520 may comprise determining a semantic FCN labels 424 for each FCN 114 of the binary 111 such that the semantic FCN sequence 415 of the binary 111 covers all (or substantially all) of the FCN 114 implemented by the binary 111.

The translation of step 1120 may be implemented by an MLT model 420 configured in accordance with MLT data 430 (and/or a first MLT model 420A configured in accordance with first MLT data 430A). The MLT model 420 may be trained to translate HR code 212 from an HR language 311 to an FCN CLS language 411, as disclosed herein.

Step 1530 may comprise blocking execution of the binary 111 based, at least in part, on the translation of the binary 111 to the sequence of semantic labels of step 1520. Step 1530 may comprise blocking execution of the binary 111 in response to one or more of: a) translating HR code 212 of the binary 111 (and/or an HR code segment 215 derived from a FCN 114 of the binary 111) to a FCN label 414 that is associated with unauthorized functionality, such as malware 135 (e.g., as illustrated in FIGS. 4, 5, and/or 6), b) mapping a FCN label 414 of the binary to a "malware" binary CLS label 424A by binary CLS rules 520 (e.g., as illustrated in FIGS. 5 and/or 6), c) translating the sequence of semantic FCN labels 414 to a "malware" binary CLS label 424A (or failing to translate the FCN labels 414 to a "clean" binary CLS label 424B) by use of a second MLT model 420B configured in accordance with second MLT data 430B (e.g., as illustrated in FIGS. 7A and/or 7B), d) assigning a "malware" binary CLS label 424A to the FCN labels 414 of the binary 111 by use of a ML classifier 820 configured in accordance with MLC data 830 (e.g., as illustrated in FIGS. 8A and/or 8B), e) translating the sequence of semantic FCN labels 414 to a computational CLS 924 the user 103 is not authorized to execute by computational CLS rules 920 (e.g., as illustrated in FIGS. 9A, 9B, 12A, 12B, and/or 12C), f) translating the sequence of semantic FCN labels 414 to a computational CLS 924 the user 103 is not authorized to execute by a second MLT model 1020B configured in accordance with second MLT data 1030B (e.g., as illustrated in FIGS. 10A, 10B, 12A, 12B, and/or 12C), g) translating the sequence of semantic FCN labels 414 to a computational CLS 924 the user 103 is not authorized to execute by an ML classifier 1120 configured in accordance with MLC data 1130 (e.g., as illustrated in FIGS. 11A, 11B, 12A, 12B, and/or 12C), and/or the like. Blocking execution of the binary 111 may comprise implementing one or more BLOCK actions 245B, as disclosed herein.

Figure 16:
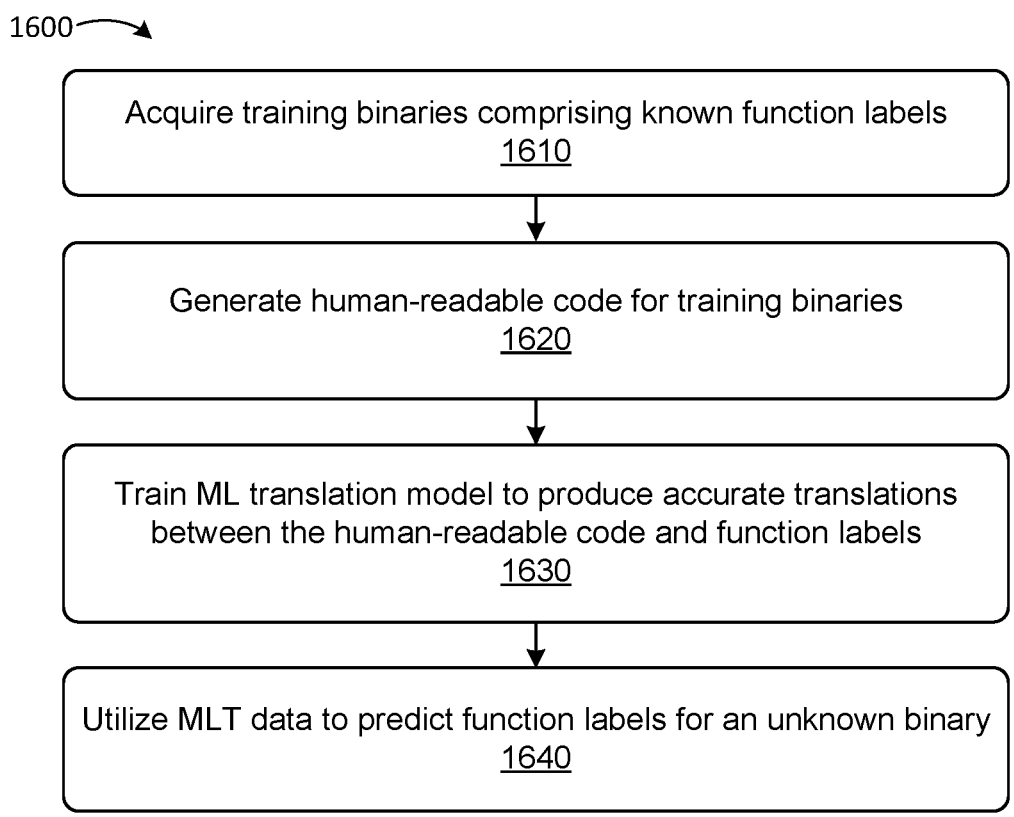

FIG. 16 is a flow diagram illustrating an example of another method 1600 for binary code analysis. Step 1610 may comprise acquiring training binaries 611, the training binaries 611 comprising and/or associated with semantic data 613, such as debug symbols or the like. The semantic data 613 may comprise information pertaining to respective FCN 114 of the training binaries 611, such as FCN names 514, FCN labels 414 and/or the like. In some embodiments, step 1610 may comprise utilizing the FCN names 514 as FCN labels 414 of the FCN CLS language 411. Alternatively, or in addition, step 1610 may comprise normalizing one or more FCN names 514 of one or more of the training binaries 611. Step 1610 may comprise applying one or more normalization rules 510 configured to map FCN names 514 to FCN labels 414, as disclosed herein. The normalization rules 510 may be configured to associate a plurality of FCN names 514 for FCN 114 that implement same or similar functionality in different binaries 111 (and/or having same or similar functional behavior in the binaries 111) to a common, normalized FCN label 414. The semantic data 613 of the training binaries 611 may comprise and/or reference training binary CLS labels 624, which may indicate known binary CLS labels 424 of the training binaries 611 (and/or respective FCN 114 of the training binaries 611). Alternatively, or in addition, the semantic data 613 may comprise and/or reference training computational CLS labels 934, which may indicate known computational CLS 924 of the training binaries 611 (and/or respective FCN 114 of the training binaries 611).

Step 1620 may comprise generating HR code 212 for the training binaries 611, as disclosed herein.

Step 1630 may comprise training an MLT model 420 to produce accurate translations from the HR language 311 to the FCN CLS language 411. Step 1630 may comprise learning, developing and/or refining MLT data 430 adapted to configure the MLT model 420 predict FCN labels 414 that accurately reproduce the training FCN labels 614 of respective training binaries 611. Step 1630 may comprise implementing one or more machine learning and/or training procedures, epochs, iterations, and/or the like (e.g., one or more TVT training procedures). Step 1630 may further comprise storing the MLT data 430 in non-transitory storage for use in configuring instances and/or implementations of the MLT model 420. In some embodiments, step 1630 may comprise incorporating the MLT data 430 into a hardware implementation of an ML analysis engine, as disclosed herein. Step 1640 may comprise utilizing the MLT data 430 learned at step 1630 to predict FCN labels 414 for unknown and/or stripped binaries 111. Step 1640 may comprise configuring an MLT model 420 to implement the MLT data 430. Step 1640 may further comprise utilizing the MLT model 420 configured in accordance with the MLT data 430 to translate HR code 212 derived from a binary 111 to a semantic FCN sequence 415 comprising a plurality of FCN labels 414, each FCN label 414 of the plurality of FCN labels 414 configured to characterize the functional behavior of a respective FCN 114 of the binary 111. Step 1640 may further comprise determining whether to permit execution of the binary 111 based on the translation of the binary 111 to the FCN CLS language 411, as disclosed herein.

Figure 17:
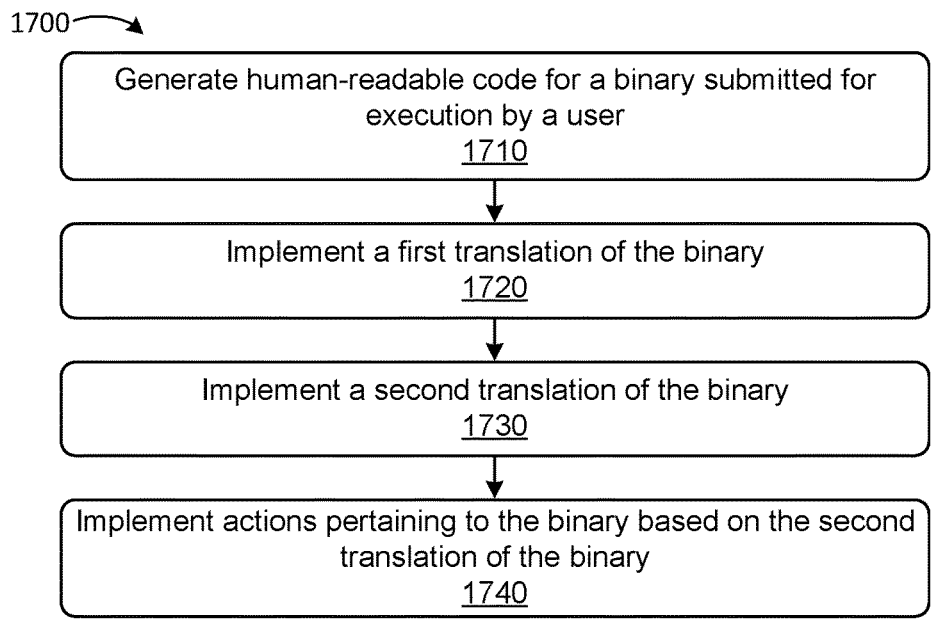

FIG. 17 is a flow diagram of an example of a method 1700 for binary code analysis. Step 1710 may comprise determining HR code 212 for an unknown and/or stripped binary 111, as disclosed herein. The binary 111 may be submitted for execution on an HPC 105 by a user 103. Steps of the method 1700 may be comprise static analysis operations, which may be completed prior to execution (or emulated execution) of the binary 111.

Step 1720 may comprise implementing a first translation of the binary 111. The first translation may comprise translating HR code 212 generated for the binary 111 from the HR language 311 to an FCN CLS language 411. The first translation may comprise a semantic FCN sequence 415 comprising a plurality of FCN labels 414, each FCN label 414 configured to characterize the functionality of a respective FCN 114 of the binary 111.

Step 1730 may comprise implementing a second translation of the binary 111. The second translation may comprise translating the semantic FCN sequence 415 of the binary 111 to one or more of a binary CLS label 424 of a binary CLS language 421 and a computational CLS label 924 of a computational CLS language 921, as disclosed herein. Step 1730 may be implemented by one or more of: binary CLS rules 520, a second MLT model 420B configured per second MLT data 430B, a ML classifier 820 configured per MLC data 830, a second MLT model 1020B configured per second MLT data 1030B, an ML classifier 1120 configured per MLC data 1130, and/or the like.

Step 1740 may comprise implementing one or more actions 245 pertaining to the binary 111 based on the second translation of the binary 111.

In some implementations, Step 1740 may comprise determining to block execution of the binary 111 in response translating the binary 111 to a "malware" binary CLS label 424A and/or translating the binary 111 to a binary CLS label 424 other than a "clean" binary CLS label 424B. Alternatively, step 1740 may comprise determining that execution of the binary 111 is authorized in response translating the binary 111 to the "clean" binary CLS label 424B and/or a binary CLS label 424 other than the "malware" CLS label 424A.

In some implementations, Step 1740 may comprise determining to authorize execution of the binary 111 in response translating the binary 111 to an authorized computational CLS 924 of the user 103 (per UMD 1205 of the user 103), as disclosed herein. Alternatively, step 1740 may comprise determining to block execution of the binary 111 in response to one or more of: a) translating the binary 111 to a computational CLS 924 for which the user 103 has not been authorized (per the UMD 1205 of the user 103), b) translating the binary 111 to the "malicious" computational CLS 924X, c) translating the binary 111 to the "unknown" computational CLS 925, or the like.

Step 1740 may further comprise implementing one or more AUTH actions 245A in response to determining that the binary 111 is authorized for execution or implementing one or more BLOCK actions 245B in response to determining that the binary 111 is not authorized for execution, as disclosed herein.

Figure 18:
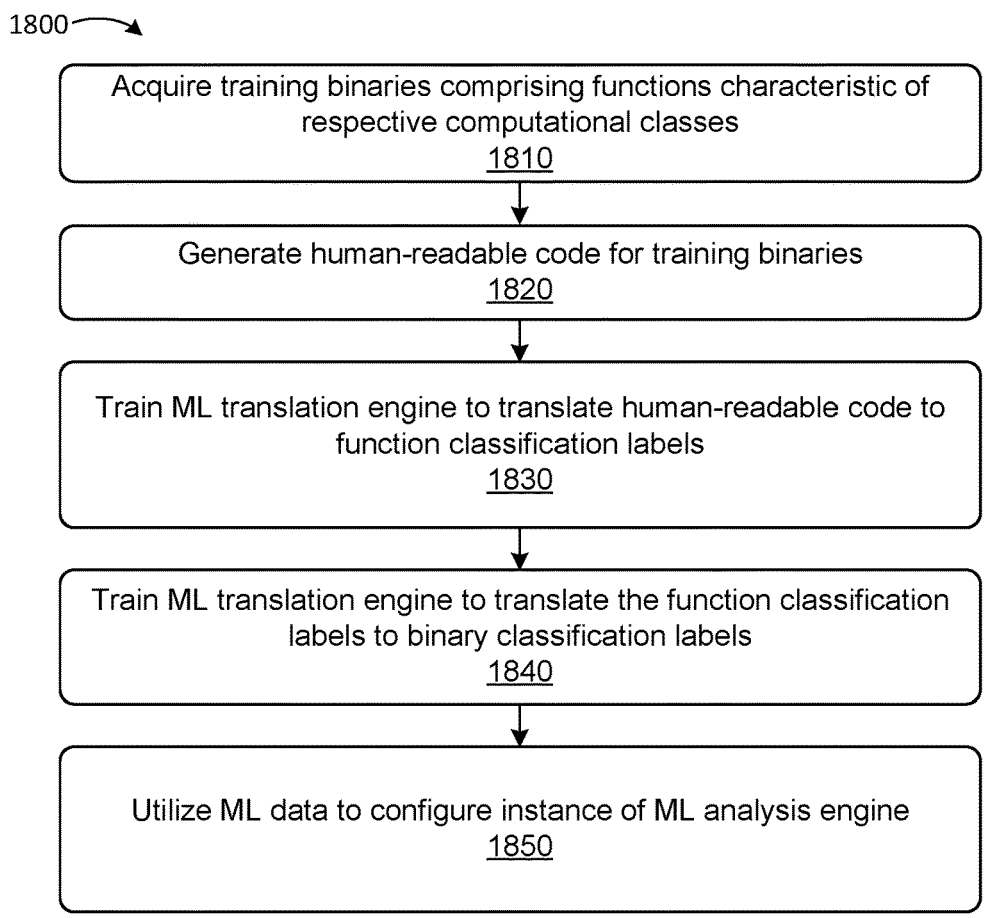

FIG. 18 is a flow diagram illustrating an example of another method 1800 for binary code analysis. Step 1810 may comprise acquiring training binaries 611 and step 1820 may comprise generating HR code 212 for the training binaries 611, as disclosed herein. The training binaries 611 may comprise FCN 114 known to be characteristic of respective computational CLS 924. The training binaries 611 may include, but are not limited to: a) training binaries 611A-1 through 611A-W characteristic of the "spectral" computational CLS 924A, b) training binaries 611B-1 through 611B-S characteristic of the "particle" computational CLS 924B, c) training binaries 611C-1 through 611C-K characteristic of the "crypto" computational CLS 924C, d) training binaries 611W-1 through 611W-T characteristic of the "MILP" computational CLS 924W, and so on. In some embodiments, the dataset 901 may further include training binaries 611 that comprise FCN 114 characteristic of the "malicious" computational CLS 924X and/or the "unknown" computational CLS 925. In the FIG. 9B example, the dataset 901 may include "malicious" training binaries 611X-1 through 611X-Q and "unknown" training binaries 611Z-1 through 611Z-H.

Step 1830 may comprise training an ML analysis engine 220 to translate HR code 212 to function classification labels (e.g., semantic FCN labels 414 of the FCN CLS language 411). Step 1830 may comprise learning MLT data 430 of an MLT model 420 and/or learning first MLT data 430A of a first MLT model 430A, as disclosed herein.

Step 1840 may comprise training the ML analysis engine 220 to translate the function classification labels (the FCN CLS language 411) to binary classification labels. The binary classification labels may comprise one or more of binary CLS labels 424 of the binary CLS language 421 and computational CLS labels 924 of the computational CLS language 921. Step 1840 may comprise training and/or developing one or more of binary CLS rules 520, MLT data 430, first MLT data 430A, MLC data 830, computational CLS rules 920, second MLT data 1030B, MLC data 1130, and/or the like, as disclosed herein.

Step 1850 may comprise utilizing the ML data 230 developed in steps 1810 through 1840 to configure an instance of an ML analysis engine 220, as disclosed herein. Step 1850 may comprise storing the ML data 230 on a non-transitory storage, such as non-transitory storage 1306 of an access node 1304 of an HPC 105, or the like. Alternatively, step 1850 may comprise incorporating the ML data 230 into a hardware implementation of the ML analysis engine 220, such as an HW ML analysis engine 1420, as disclosed herein.

Step 1850 may further comprise utilizing the ML analysis engine 220 to implement aspects of binary code analysis. Step 1850 may comprise translating unknown and/or stripped binaries 111 to semantic FCN sequences 415, binary CLS labels 424, computational CLS labels 924, and/or the like. Step 1850 may further comprise determining whether to permit execution of respective binaries 111 based on the translations of the binaries 111, as disclosed herein.

Disclosed herein are embodiments of a method for binary code analysis. Some implementations of the disclosed method may be configured to detect unauthorized functionality within binaries 111 having unknown functional behavior (e.g., unknown binaries 111). Embodiments of the disclosed method may comprise generating human-readable code (212) for a binary (111), the binary (111) configured for execution on a high-performance computing system (105), wherein the human-readable code (212) comprises one or more instruction sequences (215) corresponding to respective functions (114) of the binary (111). The method may further comprise utilizing a machine-learned translation (MLT) model (420) to translate instruction sequences (215) of the human-readable code (212) to respective labels (414), the labels (414) configured to characterize functional behavior of corresponding functions (114) of the binary (111) and blocking execution of the binary (111) on the high-performance computing system (105) in response to an instruction sequence (215) of the human-readable code (212) translating to a label (414) associated with malware (135).

Some implementations of the method may further comprise blocking execution of the binary (111) on the high-performance computing system (105) in response to translating an instruction sequence (215) of the human-readable code (212) to a label (414) associated with cryptocurrency mining malware (135).

In some embodiments, the human-readable code (212) may comprise a plurality of functional units (214), each functional unit (214) comprising a respective instruction sequence (215), each instruction sequence (215) comprising human-readable instructions derived from a respective function (114) of the binary (111). The method may further comprise translating the human-readable code (212) generated for the binary (111) into a plurality of labels (414), each label (414) configured to characterize functional behavior of a respective function (114) of a plurality of functions (114) implemented by the binary (111) and permitting the binary (111) to proceed to execution on the high-performance computing system (105) in response to determining that none of the labels (414) of the plurality of labels (414) are associated with unauthorized functionality.

In some implementations, generating the human-readable code (212) may comprise disassembling the binary (111) into assembly language code. Alternatively, or in addition, generating the human-readable code (212) may comprise deriving from the binary (111) one or more of ASM code, raw ASM, symbolic code, symbolic machine code, intermediate language code, architecture-specific intermediate language code, formal language code, programming language code, low-level programming language code, LLIL code, programming language code, source code, a syntax tree, an AST, an ASG, and/or the like. The human-readable code (212) may comprise and/or correspond to a sequence of human-readable instructions (216).

In some implementations, the method may further comprise training the MLT model (420) to translate instruction sequences (215) derived from functions (114) having known functional behaviors to training FCN labels (614) configured to characterize the known functional behaviors. Alternatively, or in addition, the method may further comprise training the MLT model (420) to translate instruction sequences (215) derived from functions (114) configured to implement unauthorized functionality to training labels (614) associated with malware (135). The training labels (614) may comprise debug symbols.

In some embodiments, the method may further comprise training the MLT model (420) to translate instruction sequences (215) derived from functions (114) having known function names to labels (414) corresponding to the known function names. The method may further comprise training the MLT model (420) to translate the known function names to respective classification labels (424), the classification labels (424) including one or more classification labels (424) associated with malware (135).

Disclosed herein are embodiments of a device or apparatus (101). The apparatus (101) may be configured to implement aspects of binary code analysis, as disclosed herein. The apparatus (101) may be configured to implement binary code analysis operations configured for detection of binaries (111) that are configured to implement unauthorized functionality, e.g., the apparatus (101) may be configured to detect malware (135) within binaries (111). Embodiments of the disclosed apparatus (101) may comprise a code generator (210) configured to produce human-readable code (212) for a binary (111), the human-readable code (212) comprising an instruction sequence (215) derived from executable code (115) of a function (114) of the binary (111). The apparatus (101) may further comprise a machine-learned translation (MLT) model (420) configured to translate the instruction sequence (215) to a semantic label (414); and policy logic (240) configured to block execution of the binary (111) in response to determining that the instruction sequence (215) derived from the executable code (115) of the function (114) translates to a semantic label (414) associated with unauthorized functionality.

In some implementations, the policy logic (240) may be further configured to block execution of the binary (111) in response to determining that the instruction sequence (215) derived from the executable code (115) of the function (114) translates to a semantic label (414) associated with cryptocurrency mining malware (135). Conversely, the policy logic (240) may be configured to authorize execution of the binary (111) in response to determining that the instruction sequence (215) derived from the executable code (115) of the function (114) translates to a semantic label (414) that is not associated with unauthorized functionality.

The human-readable code (212) produced by the code generator (210) may comprise one or more of ASM code, raw ASM, symbolic code, symbolic machine code, intermediate language code, architecture-specific intermediate language code, formal language code, programming language code, low-level programming language code, LLIL code, programming language code, source code, a syntax tree, an AST, an ASG, and/or the like. In some implementations, the code generator (210) may be configured to disassemble the binary (111) into a sequence of human-readable instructions (216).

In some embodiments, the apparatus (101) may further comprise a training module (610). The training module (610) may be configured to train the MLT model (420) to translate instruction sequences (215) derived from functions (114) having known functional behaviors to training labels (614) configured to characterize the known functional behaviors. The training module (610) may be configured to train the MLT model (420) to translate instruction sequences (215) derived from functions (114) configured to implement unauthorized functionality to training labels (614) associated with malware (135). The training module (610) may be configured to train the MLT model (420) to translate instruction sequences (215) derived from functions (114) having known function names to semantic labels (414) corresponding to the known function names.

In some implementations, the MLT model (420) may be implemented in hardware (804), such as circuitry, logic, digital logic, logic circuitry, programmable logic, programmable logic circuitry, an IC, an ASIC, an FPGA, a chip, a board, a PCB, and/or the like. The machine-learned translation data (230) configured to cause the MLT model (420) to translate human-readable code (212) to corresponding labels (414) may be incorporated into the hardware (804). Alternatively, or in addition, the MLT model (420) may be implemented in programmable hardware (804), and the machine-learned translation data (230) configured to cause the MLT model (420) to translate human-readable code (212) to corresponding semantic labels (414) is incorporated into firmware of the programmable hardware (804).

Disclosed herein are embodiments of a non-transitory computer-readable storage medium comprising instructions configured for execution by a processor, the instructions configured to cause the processor to implement operations for binary code analysis. The operations may comprise generating human-readable code (212) for a binary (111), the human-readable code (212) comprising an instruction sequence (215) corresponding to executable code (115) of a function (114) of the binary (111); utilizing a machine-learned translation (MLT) model (420) to translate the instruction sequence (215) corresponding to the executable code (115) to a label (414) configured to characterize functional behavior of the function (114) of the binary (111); and blocking execution of the binary (111) in response to determining that the label (414) is associated with malware (135). The operations may further comprise blocking execution of the binary (111) in response to determining that the label (414) is associated with cryptocurrency mining malware.

In some implementations, the operations may further comprise translating the human-readable code (212) generated for the binary (111) into a plurality of labels (414), each label (414) configured to characterize functional behavior of a respective one of a plurality of functions (114) of the binary (111); and permitting the binary (111) to proceed to execution on a high-performance computing system (105) in response to determining that the plurality of labels (414) do not include a label (414) associated with malware (135).

For the flow charts and flow diagrams described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, or some combination thereof. The methods may be realized using one or more of the apparatuses or components shown in FIGS. 1-10, the components of which may be further divided, combined, rearranged, and so on. The devices and components of these figures generally represent firmware or the actions thereof; hardware, such as electronic devices, packaged modules, IC chips, or circuits; software; or a combination thereof.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for binary code analysis have been described in language specific to certain features and/or methods, the subject of the appended claims is not necessarily limited to the specific features or methods described. Rather, the specific features and methods are disclosed as example implementations for binary code analysis.

We claim:

1. A method for binary code analysis, comprising:
generating human-readable code for a binary, the binary configured for execution on a high-performance computing system, wherein the human-readable code comprises a plurality of functional units, each functional unit comprising a respective instruction sequence, each instruction sequence comprising human-readable instructions derived from a respective function of the binary;
utilizing a machine-learned translation (MLT) model to translate instruction sequences of the human-readable code generated for the binary to semantic labels, wherein the MLT model is trained to translate human-readable code derived from functions of training binaries having known functional behaviors to semantic labels of a function classification language comprising a plurality of semantic labels, the function classification language comprising one or more semantic labels configured to characterize binary functions configured to implement unauthorized functionality; and
blocking execution of the binary on the high-performance computing system in response to translation of an instruction sequence of the human-readable code generated for the binary to a semantic label of the one or more semantic labels configured to characterize binary functions configured to implement unauthorized functionality.

2. The method of claim 1,
further comprising detecting malware within the binary in response to translating an instruction sequence of the binary to a semantic label associated with malware.

3. The method of claim 1, wherein the binary is configured to implement a plurality of functions, the method further comprising:
translating each function of the binary to a respective semantic label learned by the MLT model; and
blocking execution of the binary on the high-performance computing system in response to one or more of the functions of the plurality of functions translating to a semantic label of the one or more semantic labels configured to characterize functions associated with malware.

4. The method of claim 1, wherein the semantic label is associated with cryptocurrency mining malware.

5. The method of claim 1, further comprising determining whether to block execution of the binary on the high-performance computing system through static analysis operations completed prior to one or more of execution of the binary and emulated execution of the binary.

6. The method of claim 1, wherein generating the human-readable code comprises disassembling the binary into one or more of assembly language code, raw assembly, symbolic code, symbolic machine code, intermediate language code, architecture-specific intermediate language code, formal language code, programming language code, low-level programming language code, low-level intermediate language code, source code, a syntax tree, an abstract syntax tree, and an abstract syntax graph.

7. The method of claim 1, further comprising training the MLT model to translate instruction sequences derived from functions configured to implement unauthorized functionality to training labels associated with malware.

8. The method of claim 7, wherein the training labels comprise debug symbols.

9. The method of claim 7, further comprising training the MLT model to translate known function names to respective function classifications, the function classifications including one or more function classifications associated with malware.

10. The method of claim 1, further comprising:
translating the semantic labels to a binary classification; and
blocking execution of the binary in response to determining that the binary classification is characteristic of malware.

11. The method of claim 1, wherein the binary is submitted for execution by a user, the method further comprising:
translating the semantic labels to a computational classification; and
determining whether to permit execution of the binary based on the computational classification of the binary and authorized computational classifications of the user.

12. An apparatus, comprising:
a processor coupled to a memory;
a code generator configured for operation on the processor to generate human-readable code for a binary, wherein the human readable code comprises a plurality of functional units, each functional unit comprising a respective instruction sequence, each instruction sequence comprising human-readable instructions derived from a respective function of the binary;
a machine-learned translation (MLT) model trained to translate instruction sequences of human-readable code derived from functions of training binaries having known functional behaviors to semantic labels of a function classification language comprising a plurality of semantic labels configured to characterize the known functional behaviors, the function classification language comprising one or more semantic labels configured to characterize binary functions configured to implement unauthorized functionality; and
policy logic configured to block execution of the binary on the high-performance computing system in response to translation of an instruction sequence of the binary to a semantic label of the one or more semantic labels configured to characterize binary functions configured to implement unauthorized functionality.

13. The apparatus of claim 12, wherein the policy logic is further configured to block execution of the binary in response to translation of the instruction sequence of the binary to a semantic label associated with cryptocurrency mining malware.

14. The apparatus of claim 12, wherein the policy logic is further configured to authorize execution of the binary in response to translating the instruction sequences of the human-readable code generated for the binary to semantic labels not associated with unauthorized functionality.

15. The apparatus of claim 12, wherein the human-readable code produced by the code generator comprises one or more of assembly language code, raw assembly, symbolic code, symbolic machine code, intermediate language code, architecture-specific intermediate language code, formal language code, programming language code, low-level programming language code, low-level intermediate language code, source code, a syntax tree, an abstract syntax tree, and an abstract syntax graph.

16. The apparatus of claim 12, further comprising a training module configured to train the MLT model to translate instruction sequences derived from functions having known functional behaviors to semantic labels of the function classification language.

17. The apparatus of claim 12, further comprising a training module configured to train the MLT model to translate instruction sequences derived from functions configured to implement unauthorized functionality to semantic labels of the function classification language configured to characterize binary functions configured to implement unauthorized functionality.

18. The apparatus of claim 12, further comprising a training module configured to train the MLT model to translate instruction sequences derived from functions having known function names to semantic labels of the function classification language corresponding to the known function names.

19. The apparatus of claim 12, wherein the MLT model is implemented in hardware, and wherein machine-learned translation data configured to cause the MLT model to translate human-readable code to corresponding semantic labels is incorporated into the hardware.

20. The apparatus of claim 12, wherein the MLT model is implemented in programmable hardware, and wherein machine-learned translation data configured to cause the MLT model to translate human-readable code to corresponding semantic labels is incorporated into firmware of the programmable hardware.

21. A non-transitory computer-readable storage medium comprising instructions configured for execution by a processor, the instructions configured to cause the processor to implement operations for binary code analysis, the operations comprising:
generating human-readable code for a binary, the binary configured for execution on a high-performance computing system, wherein the human-readable code comprises a plurality of functional units, each functional unit comprising a respective instruction sequence, each instruction sequence comprising human-readable instructions derived from a respective function of the binary;
utilizing a machine-learned translation (MLT) model to translate instruction sequences of the human-readable code generated for the binary to semantic labels, wherein the MLT model is trained to translate human-readable code derived from functions of training binaries having known functional behaviors to semantic labels of a function classification language comprising a plurality of semantic labels, the function classification language comprising one or more semantic labels configured to characterize binary functions configured to implement unauthorized functionality; and
blocking execution of the binary on the high-performance computing system in response to translation of an instruction sequence of the human-readable code generated for the binary to a semantic label of the one or more semantic labels configured to characterize binary functions configured to implement unauthorized functionality.

22. The non-transitory computer-readable storage medium of claim 21, wherein the semantic label is associated with cryptocurrency mining malware.

23. The non-transitory computer-readable storage medium of claim 21, the operations further comprising:
training the MLT model to translate human-readable code derived from functions of training binaries having known functional behaviors to semantic labels configured to characterize the known functional behaviors.

* * * * *